(12) United States Patent  
Ju et al.

(10) Patent No.: US 10,640,720 B2  
(45) Date of Patent: May 5, 2020

(54) PROCESS FOR GENERATING COOL FLAME AND FLAMELESS FUEL OXIDATION USING NON-EQUILIBRIUM PLASMA ACTIVATION

(71) Applicant: The Trustees of Princeton University, Princeton, NJ (US)

(72) Inventors: Yiguang Ju, Princeton, NJ (US); Sang Hee Won, Monmouth Juncton, NJ (US); Weiqi Sun, Princeton, NJ (US)

(73) Assignee: The Trustees of Princeton University, Princeton, NJ (US)

( * ) Notice: Subject to any disclaimer, the term of this patent is extended or adjusted under 35 U.S.C. 154(b) by 544 days.

(21) Appl. No.: 15/301,590

(22) PCT Filed: Apr. 3, 2015

(86) PCT No.: PCT/US2015/024248  
§ 371 (c)(1),  
(2) Date: Oct. 3, 2016

(87) PCT Pub. No.: WO2016/010596  
PCT Pub. Date: Jan. 21, 2016

(65) Prior Publication Data  
US 2017/0015921 A1 Jan. 19, 2017

Related U.S. Application Data

(60) Provisional application No. 61/975,411, filed on Apr. 4, 2014.

(51) Int. Cl.  
*C10L 10/00* (2006.01)  
*F23L 7/00* (2006.01)  
(Continued)

(52) U.S. Cl.  
CPC ............ *C10L 10/00* (2013.01); *F23C 99/001* (2013.01); *F23J 7/00* (2013.01); *F23L 7/007* (2013.01);  
(Continued)

(58) Field of Classification Search  
None  
See application file for complete search history.

(56) References Cited

U.S. PATENT DOCUMENTS

| 5,619,937 A * | 4/1997 | Linak | ..................... B01D 53/64 110/345 |
| 2005/0019578 A1* | 1/2005 | Bosteels | ............ B01D 53/9431 428/408 |

(Continued)

OTHER PUBLICATIONS

Zhan, Zhongliang et al., "Solid Oxide Fuel Cells Operated by Internal Partial Oxidation . . . ," Journal of Power Sources, vol. 155, pp. 353-357, 2006.

(Continued)

*Primary Examiner* — Avinash A Savani  
*Assistant Examiner* — Martha M Becton  
(74) *Attorney, Agent, or Firm* — Hunton Andrews Kurth LLP

(57) ABSTRACT

An exemplary embodiment can be an exemplary method, which can include, for example, generating a cool flame(s) using a plasma-assisted combustion, and maintaining the cool flame(s). The cool flame(s) can have a temperature below about 1050 Kelvin, which can be about 700 Kelvin. The cool flame(s) can be further generated using a heated counterflow burning arrangement and a an ozone generating arrangement. The heated counterflow burning arrangement can include a liquid fuel vaporization arrangement. The ozone generating arrangement can include a micro plasma dielectric barrier discharge arrangement. The plasma-as- (Continued)

sisted combustion can be generated using (i) liquid n-heptane, (i) heated nitrogen, and (iii) ozone.

24 Claims, 36 Drawing Sheets

(51) Int. Cl.
 *F23C 99/00* (2006.01)
 *F23J 7/00* (2006.01)
(52) U.S. Cl.
 CPC ............... *F23C 2900/99001* (2013.01); *F23C 2900/99005* (2013.01); *F23K 2401/10* (2013.01); *Y02E 20/342* (2013.01); *Y02E 20/344* (2013.01)

(56) References Cited

U.S. PATENT DOCUMENTS

| | | | |
|---|---|---|---|
| 2005/0208442 A1* | 9/2005 | Heiligers | F23B 7/00 431/1 |
| 2009/0151322 A1 | 6/2009 | Coates | |

OTHER PUBLICATIONS

McIntosh, Steven et al., "Direct Hydrocarbon Solid Oxide Fuel Cells," Chemical Review, vol. 104, pp. 4845-4865, Oct. 31, 2003.
Hanna, J. et al., "Fundamentals of Electro- and Thermochemistry in the Anode of . . . ," Progress in Energy and Combustion Science, vol. 40, pp. 74-111, 2014.
Wincewicz, Keegan C. et al., "Taxonomies of SOFC Material and Manufacturing Alternatives," Journal of Power Sources, vol. 140, pp. 280-296, 2005.
Kee, Robert J. et al., "Solid Oxide Fuel Cells: Operating Principles. Current Challenges, . . . ," Combust. Sci. and Tech., vol. 180, pp. 1207-1244, 2008.
Sun, Wenting et al., "In situ Plasma Activated Low Temperature Chemistry and the S-curve . . . ," Combustion and Flame, vol. 161, pp. 2054-2063, 2014.
Won, Sang Hee et al., "Self-Sustaning n-Heptane Cool Diffusion Flames Activated by Ozone," Proceedings of the Combustion Institute, vol. 35, pp. 881-888, 2015.
Zhang, Changbin et al., "Catalytic Performance and Mechanism of a . . . ," Applied Catalysis B: Environmental, vol. 65, pp. 37-43, 2006.
Imamura, Seiichiro et al., "Oxidative Decomposition of Formalfehyde on Silver-Cerium . . . ," Catalysis Letters, vol. 24, pp. 377-384, 1994.
Jeroro, Eseoghene et al., "Zn Modification of the Reactivity of . . . ," Journal of American Chemical Society, vol. 130, pp. 10199-10207, 2008.
Perkins, W.H. et al., "Some Observations on the Luminous Incomplete . . . ," Chemical Society, pp. 363-367, 1882.
Curran, H.J. et al., "A Comprehensive Modeling Study of n-Heptane Oxidation," Combustion and Flame, vol. 114, pp. 149-177, 1998.
Mehl, Marco et al., "Kinetic Modeling of Gasoline Surrogate Components and Mixtures . . . ," Proceedings of the Combustion Institute, vol. 33, pp. 193-200, 2011.
Lignola, P.G. et al., "Cool Flames," Prog. Energy Combust. Sci., vol. 13, pp. 75-96, 1987.
Dooley, Stephen et al., "A Jet Fuel Surrogate Formulated by Real Fuel Properties," Combustion and Flame, vol. 157, pp. 2333-2339, 2010.
Dooley, Stephen et al., "The Experimental Evaluation of a Methodology for Surrogate Fuel . . . ," Combustion and Flame, vol. 159, pp. 1444-1466, 2012.
Dooley, Stephen et al., "The Combustion Kinetics of a Synthetic Paraffinic Jet Aviation Fuel . . . ," Combustion and Flame, vol. 159, pp. 3014-3020, 2012.
Jahangirian, Saeed et al., "A Detailed Experimental and Kinetic Modeling Study of . . . ," Combustion and Flame, vol. 159, pp. 30-43, 2012.
Oshibe, Hiroshi et al., "Stabilized Three-Stage Oxidation of DME/air Mixture in a . . . ," Combustion and Flame, vol. 157, pp. 1572-1580, 2010.
Nayagam, Vedha et al., "Can Cool Flames Support Quasi-Steady Alkane Droplet Burning?," Combustion and Flame, vol. 159, pp. 3583-3588, 2012.
Farouk, Tanvir I. et al., "Isolated n-Heptane Droplet Combustion in Microgravity: "Cool Flames". . . ," Combustion and Flame, vol. 161, pp. 565-581, 2014.
Zhao, Peng et al., "The Role of Global and Detailed Kinetics in the First-Stage . . . ," Combustion and Flame, vol. 160, pp. 2352-2358, 2013.
Sun, Wenting et al., "Direct Ignition and S-Curve Transition by in situ Nano-Second . . . ," Proceedings of the Combustion Institute, vol. 34, pp. 847-855, 2013.
Ombrello, Timothy et al., "Flame Propagation Enhancement by Plasma Excitation . . . ," Combustion and Flame, vol. 157, pp. 1906-1915, 2010.
Vu, Tran Manh et al., "Stability Enhancement of Ozone-Assisted Laminar Premixed . . . ," Combustion and Flame, vol. 161, pp. 917-926, 2014.
Dardin, V.J. et al., "Partial Oxidation of Propane Initiated by Ozone," Chem. Process Design Develop., vol. 4, No. 1, pp. 61-66, Jan. 1965.
Caprio, V. et al., "Ozone Activated Low Temperature Combustion of Propane . . . ," Combustion Science and Technology, vol. 35, pp. 215-224, 1984.
Report of the Basic Energy Sciences Workshop on Basic Research Needs for Clean and Efficient Combustion of 21st Century Transportation Fuels, pp. 1-208, Oct. 29-Nov. 1, 2006.
Dec, John E. "Advanced Compression-Ignition Engines-Understanding . . . ," Proceedings of the Combustion Institute, vol. 32, pp. 2727-2742, 2009.
Reitz, Rolf D. "Directions in Internal Combustion Engine Research," Combustion and Flame, vol. 160, pp. 1-8, 2013.
Won, Sang Hee et al., "Kinetic Effects of Toluene Blending on the Extinction . . . ," Combustion and Flame, vol. 157, pp. 411-420, 2010.
Won, Sang Hee et al., "Kinetic Effects of Aromatic Molecular Structures on . . . ," Proceedings of the Combustion Institute, vol. 33, pp. 1163-1170, 2011.
Won, Sang Hee et al., "A Radical Index for the Determination of the Chemical . . . ," Combustion and Flame, vol. 159, pp. 541-551, 2012.
Lefkowitz, Joseph K. et al., "Uncertainty Assessment of Species Measurements in Acetone . . . ," Proceedings of the Combustion Institute, vol. 34, pp. 813-820, 2013.
Ju, Yiguang et al., "On the Extinction Limit and Flammability Limit of Non-Adiabatic . . . ," J. Fluid Mech. vol. 342, pp. 315-334, 1997.
Sohn, C.H. et al., "Structure and Acoustic-Pressure Response of Hydrogen-Oxygen Diffusion . . . ," Combustion and Flame, vol. 115, pp. 299-312, 1998.
Ju, Yiguang et al., "Multi-Timescale Modeling of Ignition and Flame Regimes of . . . ," Proceedings of the Combustion Institute, vol. 33, pp. 1245-1251, 2011.
Sun, Wenting et al., "A Path Flux Analysis Method for the Reduction of Detailed . . . ," Combustion and Flame, vol. 157, pp. 1298-1307, 2010.
Dooley, S. et al., "51st AIAA Aerospace Science Meeting . . . ," Jan. 7-10, 2013, vol. 1 of 20, Grapevine, Texas, AIAA 2013-0158.
Dooley, Stephen et al., Methly Butanoate Inhibition of n-Heptane Diffusion Flames Through an . . . , Combustion and Flame, vol. 159, pp. 1371-1384, 2012.
Dievart, Pascal et al., "A Kinetic Model for Methyl Decanoate Combustion," Combustion and Flame, vol. 159, pp. 1793-1805, 2012.
Davy, Humphry "Some New Experiments and Observations on the Combustion of Gaseous . . . ," Philisophical Transactions of the Royal Society, vol. 107, pp. 77-82, 1817.

(56) References Cited

OTHER PUBLICATIONS

Molina, L.T. et al., "Absolute Absorption Cross Sections of Ozone in the . . . ," Journal of Geophysical Research, vol. 91, No. D13, pg.

Katuski, Masahi et al., "The Science and Technology of Combustion in Highly . . . ," 27th Symposition on Combustion/The Combustion Institute, vol. 27, No. 2, pp. 3135-3146, 1998.

Fuse, R. et al., "NOx Emission from High-Temperature Air/Methane . . . ," International Journal of Thermal Sciences, vol. 41, Issue No. 7, pp. 693-698, 2002.

Wada, T. et al., "An Instability of Diluted Lean Methane/Air Combustion: . . . ," Combust. Sci. and Tech. vol. 183, pp. 1-19, 2011.

Kosarev, I.N. et al., "Kinetics of Ignition of Saturated Hydrocarbons by Nonequilibrium . . . ," Combustion and Flame, vol. 154, pp. 569-586, 2008.

Ombrello, Timothy et al., "Flame Propagation Enhancement by Plasma Excitation . . . ," Combustion and Flame, vol. 157, pp. 1916-1928, 2010.

Lefkowitz, Joseph K. et al., "In situ Species Diagnostics and Kinetic Study of Plasma . . . ," Proceedings of the Combustion Institute, vol. 35, pp. 3505-3512, 2015.

Bowman, C.T. et al., "Spectroscopy and Kinetics of Combustion Gases at High Temperatures," The Gas Research Institute, pp. 1-70, 1989.

Aleksandrov, Nikolay L. et al., "Mechanism of Ignition by . . . ," Proceedings of the Combustion Institute, vol. 32, pp. 205-212, 2009.

Correale, G. et al., "Nanosecond-Pulsed Plasma Actuation in Quiescent Air and Laminar . . . ," Journal of Phys. D: Appl, Phys., vol. 47, pp. 1-12, 2014.

Michelis, T. et al., "Disturbance Introduced into a Laminar Boundary Layer . . . ," 51st AIAA Aerospace Sciences Meeting, pp. 1-18, Janua.

Curran, H.J. et al., "A Comprehensive Modeling Study of Iso-Octane Oxidation," Combustion and Flame, vol. 129, pp. 253-280, 2002.

Brown, Peter N. et al., "VODE, A Variable-Coefficient Ode Solver," SIAM Journal on Scientific and Statistical Computing, vol. 10, pp. 1038-1051, Jun. 1988.

Brown, Peter N. et al., "VODE: A Veriable-Coefficient Ode Solver," SIAM Journal Sci. Stat. Comput., vol. 10, No. 5, pp. 1038-1051, Sep. 1989.

Lam, Sau H. "Model Reductions with Special CSP Data," Combustion and Flame, vol. 160, pp. 2707-2711, 2013.

MAAS, U. et al., "Simplifying Chemical Kinetics: Intrinsic Low-Dimensional Manifolds . . . ," Combustion and Flame, vol. 88, pp. 239-264, 1992.

Gou, Xiaolong et al., "A Dynamic Multi-Timescale Method for Combustion Modeling . . . ," Combustoin and Flame, vol. 157, pp. 1111-1121, 2010.

Lu, Tianfeng et al., "Dynamic Stiffness Removal for Direct Numerical Simulations," Combustion and Flame, vol. 156, pp. 1542-1551, 2009.

Bendtsen, Anders Broe et al., "Visualization Methods in Analysis of Detailed Chemical . . . ," Computers and Chemistry, vol. 25, pp. 161-170, 2001.

Lu, Tianfeng et al., "A Directed Relation Graph Method for Mechanism Reduction," Proceedings of the Combustion Institute, vol. 30, pp. 1333.

Desjardins-Pepiot, P. et al., "An Efficient Error-Propagation-Based Reduction Method for Large . . . ," Combustion and Flame, vol. 154, pp. 67-81, 2008.

Sun, Weiqi et al., "Multi-Scale Modeling of Dynamics and Ignition to Flame . . . ," Proceedings of the Combustion Institute, vol. 35, pp. 1049-1056, 2015.

Williams, F.A."Elementary Derivation of the Multicomponent Diffusion Equation," American Journal of Physics, vol. 26, No. 7, pp. 467-469, Oct. 1958.

Curtiss, Charles F. et al., "Transport Properties of Multicomponent . . . ," The Journal of Chemical Physics, vol. 17, No. 6, pp. 550-555, Jun. 1949.

Lam, S.H."Multicomponent Diffusion Revisited," Physics of Fluids, vol. 18, No. 073101, pp. 1-8. 2006.

Wilke, C.R. "A Viscosity Equation for Gas Mixtures," The Journal of Chemical Physics, vol. 18, No. 4, Apr. 1950.

Smooke, Mitchell D. "The Computation of Laminar Flames," Proceedings of the Combustion Institute, vol. 34, pp. 65-98, Jan. 2013.

Xin, Yuxuan et al., "A Reduced Multicomponent Diffusion Model," Combustion and Flame, vol. 162, pp. 68-74, 2015.

Kee, R. et al., "Perspectives," Sandia National Laboratories Report, SAND85-8240, pp. 1-28, 2012.

Kee, R. et al., "Transport: A Software Package for the Evaluation of Gas-Phase, . . . " Chemkin Collection Release 3.6, pp. 1-51, Septmeber 2000.

Chen, Zheng "Studies on the Initiation, Propagation, and Extinction of Premxed Flames," A Dissertation to the Faculty of Princeton University, pp. 1-245, Jan. 2009.

Chen, Zheng et al., Effects of Lewis Number and Ignition Energy of the Determination . . . , Proceedings of the Combustion Institute, vol. 32, pp. 1253-1260, 2009.

Burke, Michael P. et al., "Effect of Cylindrical Confinement on the Determination . . . ," Combustion and Flame, vol. 156, pp. 771-779, 2009.

Chen, Zheng "On the Extraction of Laminar Flame Speed and Markstein . . . ," Combustion and Flame, Vo. 158, pp. 291-300, 2011.

Qin, Xiao et al., "Measurements of Burning Velocities of Dimenthyl Ether and Air . . . ," Proceedings of the Combustion Institute, vol. 30, pp. 233-240, 2005.

Pilla, Guillaume et al., "Stablization of a Turbulent Premixed Flame Using a . . . ," IEEE Transactions on Plasma Science, vol. 34, No. 6, pp. 2471-2477, Dec. 2006.

Sun, Wenting et al., "Direct Ignition and S-Curve Transition by in situ Nano-Second Pulsed . . . ," Proceedings of the Combustion Institute, vol. 34, pp. 847-855, 2013.

Mintusov, E. et al., "Mechanism of Plasma Assisted Oxidation and Ignition of Ethylene-Air . . . ," Proceedings of the Combustion Institute, vol. 32, pp. 3181-3188, 2009.

Ombrello, Timothy et al., "Kinetic Ignition Enghancement of H2 . . . ," IEEE Transactions on Plasma Science, vol. 36, No. 6, pp. 2924-2932, Dec. 2008.

Bozhenkov, S.A. et al., "Nanoscond Gas Discharge Ignition of . . . ," Combustion and Flame, vol. 133, pp. 133-146, 2003.

Uddi, Mruthunjaya et al., "Atomic Oxygen Measurements in Air and Air/Fuel . . . ," Proceedings of the Combustion Institute, vol. 32, pp. 929-936, 2009.

Kim, Wookyung et al., "The Role of in Situ Reforming in Plasma Enhanced Ultra . . . ," Combustion and Flame, vol. 157, pp. 374-383, 2010.

Sun, Wenting et al., "Effects of Non-Equilibrium Plasma Discharge on Counterflow . . . ," Proceedings of the Combustion Institute, vol. 33, pp. 3211-3218, 2011.

49th Aerospace Sciences Meeting Including the New Horizons Forum and Aerospace Exposition, Orlando, Florida, pp. 2011-1212, Jan. 4-7, 2011.

Sun, Wenting et al., "Kinetic Effects of Non-Equilibrium Plasma-Assisted Methane . . . ," Combustion and Flame, vol. 159, pp. 221-229, 2012.

Starik, A.M. et al., "On the Influence of Singlet Oxygen Molecules on the Speed . . . ," Combustion and Flame, vol. 157, pp. 313-327, 2010.

Rao, Xing et al., "Combustion Dynamics for Energetically Enhanced Flames Using . . . ," Proceedings of the Combustion Institute, vol. 33, pp. 3233-3240, 2011.

Bao, Ainan et al., "Ignition of Ethylene-Air and Methane-Air Flows by Low-Temperature . . . ," IEEE Transactions on Plasma Science, vol. 35, No. 6, pp. 1628-1638, Dec. 2007.

Wu, L. et al., "Plasma-Assisted Ignition Below Self-Ignition Threshold in Methane, Ethane, Propane . . . ," Proceedings of the Combustion Institute, vol. 33, pp. 3219-3224.

(56) References Cited

OTHER PUBLICATIONS

Pancheshnyi, Sergey V. et al., "Ignition of Propane-Air Mixtures by a Repetitively . . . ," IEEE Transactions on Plasma Science, vol. 34, No. 6, pp. 2478-2487, Dec. 2006.

Guo, Huijun et al., "Measurements of H2O2 in Low Temperature Dimthyl Ether Oxidation," Proceedings of the Combustion Institute, vol. 34, pp. 573-581, 2013.

Zhao, Zhenwei et al., "Thermal Decomposition Reaction and a Comprehensive Kinetic . . . ," International Journal of Chemical Kinetics, vol. 40, pp. 1-18, 2008.

Metz, Thomas et al., "Fluorescence Lifetimes of Formaldehyde . . . ," Spectrochimica Acta Part A, vol. 60, pp. 1043-1053, 2004.

Harrington, Joel E. et al., "Laser-Induced Fluorescence Measurements of Formaldehyde . . . ," Chemical Physics Letters, vol. 202, Nos. 3 and 4, pp. 196-202, Jan. 22, 1993.

Janev, R. K. et al., "Collision Processes of C2,3Hy and C2,3H+y Hydrocarbons with . . . ," Physics of Plasmas, vol. 11, No. 2, pp. 780-829, Feb. 2004.

Farouk, Tanvir et al., "Atmopheric Pressure Radio Frequency Glow Discharges in Argon: . . . ," Plasma Sources Sci. Technol., vol. 17, pp. 1-16, 2008.

Farouk, T. et al., "Atmospheric Pressure Methane-Hydrogen dc Micro-Glow Discharge . . . ," Journal Phys. D: Appl. Phys., vol. 41, pp. 1-20, 2008.

Bao, Ainan et al., "Ignition of Hydrocarbon by a Repetitively . . . ," Diss. for Deg. Dr of Philosophy in the Graduate School of the Ohio State University, pp. 1-202, 2008.

Lutz, A.E. et al., "Senkin: A Fortran Program for Predicting Homogeneous Gas . . . ," SAND87-8248, pp. 1-31, Feb. 1988.

Bellan, J. "Supercritical (and Subcritical) Fluid Behavior and Modeling: Drops, . . . ," Progress in Energy and Combustion Science, vol. 26, pp. 329-366, 2000.

International Search Report for International Application No. PCT/US2015/024248 dated Feb. 17, 2016.

International Written Opinion for International Application No. PCT/US2015/024248 dated Feb. 17, 2016.

Ju, Y., "Recent Progress and Challenges in Fundamental Combustion Research," Advances in Mechanics, vol. 44, No. 1 (Apr. 1, 2014).

G. Mitchum, "Characterization of a New Counterflow Burner and Operation with Vaporized Liquid Heptanes," Dissertation, Purdue Univeristy (Aug. 2011).

A. Bourig, "Combustion Modification by Non-Theraml Plasma," Dissertation, University of Orleans, Otto-von-Guericke University Magedburg (2009).

Mohamed et. al., "Fundamentals and Simulation of MILD Combustion," [online—intednopen.com] Jan. 13, 2012.

* cited by examiner

Center burner (Fuel/N$_2$)
Plasma reactor (lean mixture)
Preheating burner (stoich. mixture)

$\Delta T \equiv T_{equil} - T$

Figure 45A
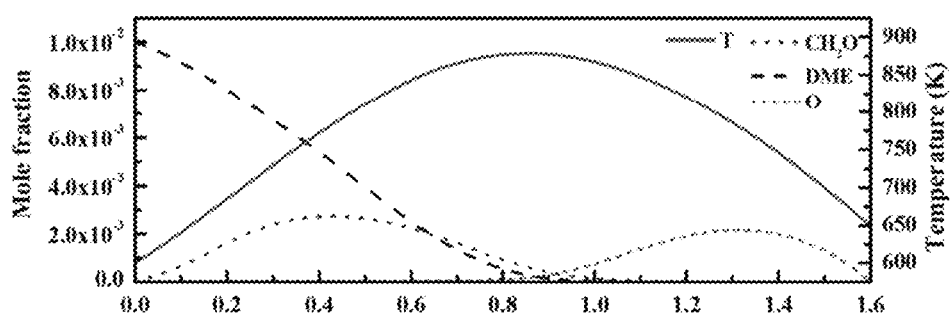
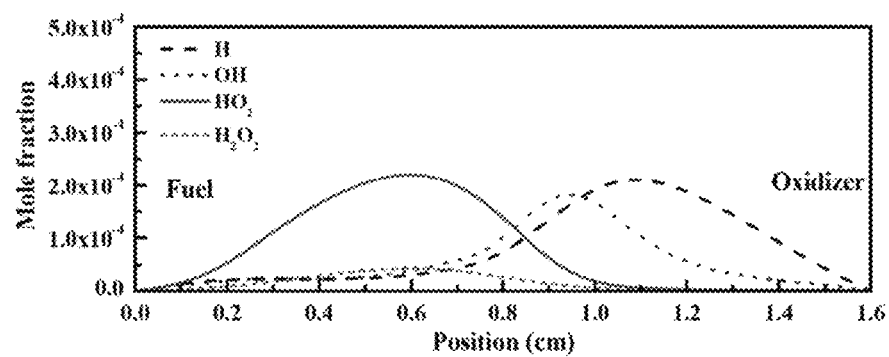
Figure 45B

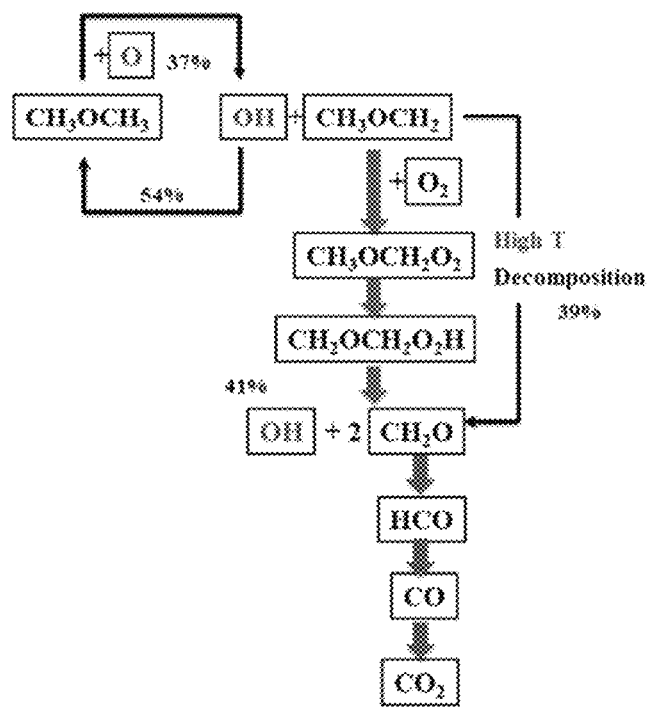
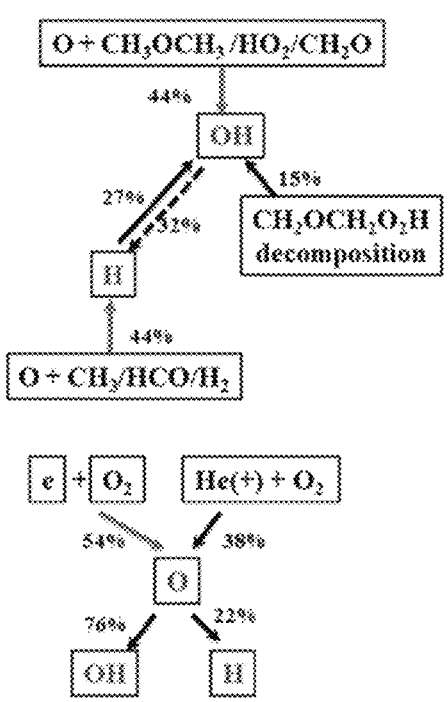
Figure 47A
Figure 47B
Figure 47C

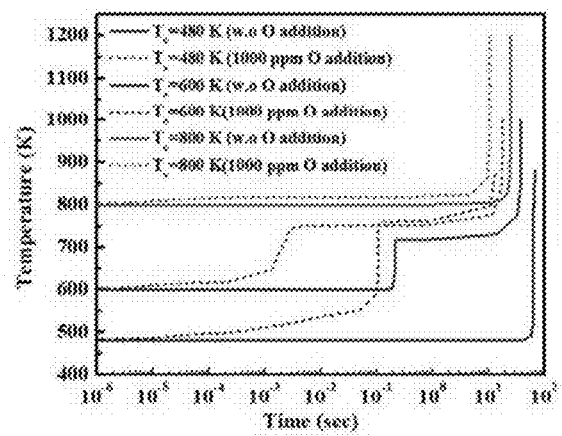
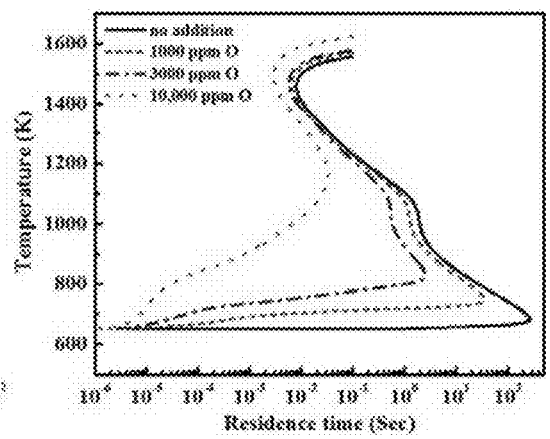
Figure 51A          Figure 51B
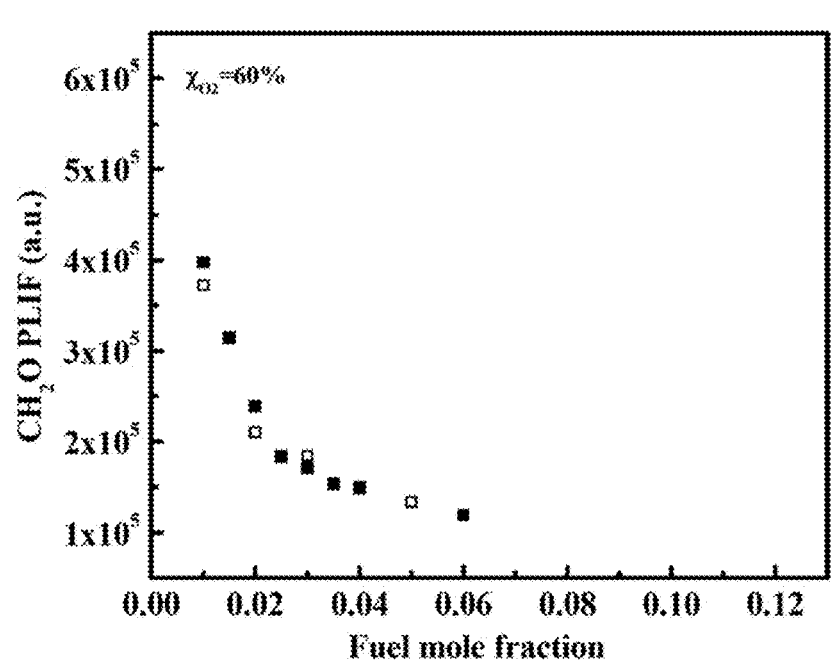
Figure 52

PROCESS FOR GENERATING COOL FLAME AND FLAMELESS FUEL OXIDATION USING NON-EQUILIBRIUM PLASMA ACTIVATION

This application relates to and claims the benefit and priority from International Patent Application No. PCT/US2015/024248 filed on Apr. 3, 2015, which relates to U.S. Provisional Patent Application No. 61/975,411, filed on Apr. 4, 2014, the entire disclosures of which are incorporated herein by reference in their entireties.

STATEMENT REGARDING FEDERALLY SPONSORED RESEARCH

This invention was made with government support under Grant No. FA9550-13-1-0119, Grant No. FA9550-09-1-0602, awarded by the Air Force Office of Scientific Research and Grant No. W911NF-12-1-0167 awarded by the U.S. Army, Army Research Office, and Grant No. NNX15AB67G, awarded by the National Aeronautics and Space Administration. The government has certain rights in the invention.

FIELD OF THE DISCLOSURE

The present disclosure relates generally engines, chemical and fuel processes and combustion, and more specifically, to exemplary embodiments of an exemplary process for generating cool flames and/or flameless fuel oxidation.

BACKGROUND INFORMATION

Currently, engines and combustors generally run at high temperatures, which can lead to problems such as engine knocking, flame stability, soot and NOx emissions as well as difficulty in combustion control. In spite of extensive attempts to operate engines at low temperature environments for mitigated emissions and improved engine efficiencies, low temperature combustion and fuel oxidation below 1000 K have been found to be difficult to achieve and/or unstable for engines and fuel processing.

The concept of a cool flame has been around for more than a century. After the accidental discovery of cool flames in 1882 (see, e.g., Reference 13), cool flames have been regarded as a processes that can cause engine knock, motivating extensive studies on large hydrocarbon low temperature chemistries. (See, e.g., References 14 and 15). Three conventional experimental approaches for the past studies of cool flames include: 1) heated burner, 2) heated flow reactor and 3) jet-stirred reactor. (See, e.g., Reference 16). Despite of the ambiguous boundary conditions and limited operation range in a heated burner, the convenience of optical accessibility made it possible to measure emission spectroscopy, revealing the excited formaldehyde (e.g., $CH_2O^*$) as a source of the pale bluish chemiluminescence of a cool flame. (See, e.g., Reference 16). Heated flow reactor experiments have provided oxidative chemical kinetic behaviors of hydrocarbon (e.g., liquid fuels) at given temperatures (e.g., 500-1000 K) of cool flames. (See, e.g., References 13-16).

Recently, based on the heated flow reactor concept, cool flames have been observed in a micro-channel flow, constraining the auto-thermal acceleration by the extensive wall heat loss. (See, e.g., Reference 21). Various types of preheated jet-stirred reactors also have been utilized to investigate the chemical kinetic characteristics of cool flame chemistry. (See, e.g. Reference 16). Generally, in all above experiments, external heating and wall heat losses ought to be provided to establish cool flames, mating the thermal and chemistry coupling with very complicated wall interaction. As a result, detailed and fundamental understandings of cool flame behaviors have not been well established.

Additionally, all of the previous cool flame studies have focused on homogeneous fuel/air pre-mixtures. A recent experiment of droplet combustion in microgravity has shown that a cool flame might be established even in the diffusive system, hypothesizing the existence of cool diffusion flame after radiation-controlled extinction (see, e.g., Reference 22) with the aid of numerical simulation. (See, e.g., Reference 23). Although, the numerical simulation was able to capture the global trend of droplet flame extinction, and subsequent formation of cool diffusion flame, the detailed structure of cool diffusion flame has not yet been revealed. As such, cool flame dynamics remain mysterious and the fidelity of cool flame chemistry remains unknown. Furthermore, this experimental observation was performed in a sophisticated environment, microgravity in NASA international space station, and is not applicable to the realization of cool flames in engine-relevant conditions.

One of the main challenges in establishing a self-sustaining cool flame can be that at low temperature, the cool flame induction chemistry for the radical branching can be too slow compared to the flow residence time in a practical combustor. On the other hand, at higher temperature, the radical branching can become so fast that a cool flame will transit to a hot flame rapidly. (See, e.g., Reference 24). As a result, a cool flame may not be stable without heat loss to the wall. Therefore, the only way to create a self-sustaining cool flame can be to significantly accelerate the chain-branching process at low temperature by providing new reaction pathways.

Recent progresses in plasma-assisted combustion in counterflow flames (see, e.g., References 25 and 26) provide some information on how to accelerate the cool flame induction chemistry at a low temperature. By producing active radicals, such as atomic oxygen, direct in-situ plasma discharge between two nozzles in counterflow burner can stabilize diffusion flames at flame temperatures below 1000 K at a flow residence time of 10 ms, and can also modify the ignition/extinction S-curve. Unfortunately, direct plasma discharge can make the study of low temperature combustion chemistry more complicated. Thus, to isolate the plasma-flame coupling, ozone was used as an atomic oxygen carrier to enhance flame stabilization and ignition. (See, e.g., References 27 and 28). Ozone has been also frequently utilized to reduce the time scale of induction chemistry, and activate the low temperature chemistry in tubular (see, e.g., Reference 29) and jet-stirred reactors. (See, e.g., Reference 30). Those studies suggest that one might be able to observe a self-sustaining cool flame using ozone. As the recent advanced concepts of engine design (see, e.g., References 31-33) appear to heavily relying on the low temperature combustion, it can be pre-requisite to understand the chemical kinetic mechanism and flame dynamics at the regime of low temperature chemistry. Consequently, a fundamental challenge can be how to develop an experimental cool flame platform with well-defined chemical and flow boundary conditions, such that both the global properties and the detailed chemical kinetics of cool flame can be simultaneously investigated and/or determined.

Intermittency, low energy density and difficulty in electricity storage can be among significant challenges of the sustainable electric power triangle. (See, e.g., FIG. 17). An increase of energy efficiency, fuel flexibility and capability of distributed power generation via integration of fuelflexible solid oxide fuel cells ("SOFCs") and micro gas turbines can be beneficial to the future development of the sustainable electric power triangle. (See, e.g., Reference 1). SOFCs can have over 60% efficiency in converting fuel chemical potential energy into electricity, and this can be further increased via integration with gas turbines by using the energy in the exhaust gas of SOFCs. Moreover, SOFCs have almost zero NOx and soot emissions.

However, one of the important challenges of SOFCs can be the lack of fuel flexibility and coke formation (e.g., carbon deposits) for large hydrocarbon fuels. (See, e.g., References 2 and 3). FIG. 18 illustrates the operating principles of SOFCs in a planar geometry. (See, e.g., Reference 4). A SOFC can include a porous cathode and anode separated by a solid electrolyte. The cathode material can include lanthanum-containing perovskite oxides such as the lanthanum strontium manganate (e.g., $La_xSr_{(1-x)}MnO_3$). Ceria- and zirconia-based oxides such as yttrium-stabilized zirconia ("YSZ") can generally be used as the solid electrolyte. The typical anode material can be a composite of ceramic and metal such as a nickel-YSZ composite. (See, e.g., Reference 5). The cathode catalyzes oxygen to form oxide ions ($O_2$—) (Eq. (1A)). The formed $O_2$— ions can travel across the solid electrolyte to the porous SOFC anode and oxidize chemical fuels such as carbon monoxide ("CO") and hydrogen ("$H_2$") and release electrons to produce electricity (Eq. (2A)).

$$\text{Cathode: } O_2 + 4e^- \rightarrow 2O^{2-} \tag{1A}$$

$$\text{Anode: } H_2 + O^{2-} \rightarrow H_2O + 2e^- \tag{2A}$$

$$C_nH_{2n+2} \rightarrow nC + (n+1)H_2 \tag{3A}$$

To increase the $O_2$— ion transport and the fuel decomposition and oxidation, SOFCs have to be operated at high temperatures (e.g., approximately 900° C. or higher). Unfortunately, nickel-based catalysts are very prone to form coke for large hydrocarbon fuels (e.g., shale gas liquids, gasoline and biodiesels) (Eq.(3A)) and even for high concentrations of methane (e.g., over 20%) (see, e.g., References 1-3), limiting the most desirable fuel of SOFCs to $H_2$/CO.

To increase fuel flexibility, a separate fuel reformer to produce $H_2$/CO from large hydrocarbons can be needed. (See, e.g., References 2-6). However, the high temperature (e.g., about 550-600° C.), endothermic reforming process can reduce the energy efficiency and increase the cost. Moreover, to reduce coke and catalyst deactivation, expensive catalysts such as Ru/CeO2 can be frequently used for catalytic partial oxidation ("CPDX"), direct steam reforming ("DSR"), or autothermal reforming ("ATR"). (See, e.g., References 3-6). Unfortunately, both CPDX and DSR can be sensitive to fuels and $H_2O$ content and have low energy efficiency. A small variation in the fuel stream can result in significant changes in catalyst bed temperature, product yields and coking. (See, e.g., Reference 7).

Moderate or Intense Low-oxygen Dilution ("MILD" or flameless) combustion has been investigated as a combustion concept to reduce pollutant emissions. (See, e.g., References 59 and 60). The basic concept of MILD combustion is to use excessive diluents to reduce fuel and oxygen concentrations below its flammable limit (see, e.g., References 61 and 62), and raise the oxidizer stream temperature to autoignition temperature of the fuel. MILD or flameless combustion occurs when preheated and highly diluted oxidizer (e.g., approximately 1300 K) and fuel are rapidly mixed. The rapid mixing associated with highly diluted reactants and reduced peak flame temperature can change the conventional diffusion flame regime to ignition dominated MILD or flameless combustion regime. This ignition-dominated MILD combustion process can facilitate reactants and intermediate species to leak through the reaction zone and therefore enlarges the combustion zone. As a result, the associated heat release can be distributed onto a larger volume with a significantly decreased peak flame temperature and thus preventing the formation of NOx. Although MILD combustion has the potential to reduce emissions in applications, it needs high preheating temperatures (e.g., over about 1300 K for methane) and high fuel/air dilutions. Due to the nonlinearity of combustion chemistry under such extreme conditions, chemically-induced flame instability can arise. To mitigate these oscillations and realize steady MILD combustion conditions, an external control, such as a closed-loop controller can be used (see, e.g., Reference 63) but has limitations in terms of response time.

Plasma assisted combustion has the potential to achieve steady MILD combustion by manipulating the chemical time scale (e.g., ignition delay time) and reducing the auto-ignition temperature. The influence of electron impact on fuel chemistry has already been extensively studied. (See, e.g., References 64-66). Using a counterflow configuration, it has been shown that plasma discharge can produce a direct ignition to flame transition regime without extinction limit (see, e.g., Reference 67) and even cool flames. (See, e.g., References 68 and 69). These studies suggest that an optimized plasma discharge, cool flame initiation process can lead to steady MILD combustion at even lower temperature and concentration conditions by reducing the ignition time via thermal and kinetic enhancement processes.

In order to understand and predict the turbulence-chemistry interactions within low temperature (e.g., 700K) to intermediate temperature (e.g., 1100K) range more accurately, there has been increasing interest in developing detailed kinetic mechanisms including low temperature chemistry, which involves hundreds of species and thousands of reactions. For example, a detailed n-heptane mechanism (see, e.g., Reference 77) has about 1034 species and about 4236 reactions and a recent jet fuel surrogate model (see, e.g., Reference 78) has more than two thousands species and eight thousands reactions. However, the large detailed chemical mechanisms results in great challenges in combustion modeling. Even with the availability of super-computing capability at petascale and beyond, the numerical simulation with such large kinetic mechanisms still remains difficult.

The first difficulty comes from the large and stiff ODE system which governs the chemical reactions. In a chemical reaction system, the characteristic time of different species can vary from millisecond to picosecond, and even beyond. In order to deal with the stiffness of the ODE system, the traditional VODE (see, e.g., Reference 79) method can be usually applied. However, the computation time of a VODE solver increases as cubic of the number of species due to the Jacobin matrix decomposition. Therefore, with a large detailed mechanism, the numerical simulation can be almost impossible. In order to utilize the detailed kinetic models in combustion modeling, researchers either reduce the stiffness of the ODE system, such as the computational singular perturbation ("CSP") method (see, e.g., Reference 80), the intrinsic low-dimensional manifold ("ILDM") method (see, e.g., Reference 81), the hybrid multi-timescale ("HMTS") method(see, e.g., Reference 82) and the dynamic stiffness removal method (see, e.g., Reference 83), or decrease the number of the species in the mechanisms, such as the visualization method (see, e.g., Reference 84), the multi-generation path flux analysis ("PFA") method(see, e.g., Reference 85), the direct relation graph ("DRG") method (see, e.g., Reference 86) and the DRG with error propagation ("DRGEP") method. (See, e.g., Reference 87). The dynamic adaptive chemistry ("CO-DAC") method (see, e.g., Reference 88) integrated with the HMTS method combined these two approaches and successfully addressed the first difficulty. In the CO-DAC method, correlated reduced mechanisms in time and space coordinate can be generated dynamically on the fly from the detailed kinetic mechanism by using the multi-generation PFA method. Then, the HMTS method can be applied to solve the chemical reactions based on the local reduced mechanisms. The efficiency and accuracy of the CO-DAC method has been previously demonstrated. (See, e.g., Reference 88).

The second difficulty in utilizing a large detailed chemical mechanism in combustion modeling can be from the calculations of transport properties. In a combustion process, the significant variations of the temperature and concentrations of species and radicals can result in the deviations of the transport coefficients from the initial values. Therefore, the mass diffusivities, heat conductivities and viscosities have to be updated during the calculations according to diffusion models. The Boltzmann's equation of kinetic theory (see, e.g., References 89 and 90) can provide the most rigorous Maxwell-Stefan multicomponent diffusion model. (See, e.g., References 91 and 92). However, it can be computationally prohibitive to employ the multicomponent diffusion model in the combustion modeling with large chemical mechanism due to the huge computational cost by matrix inversion. Therefore, a mixture-averaged diffusion model developed by the first-order perturbations of the Boltzmann equation following the Chapman-Cowling procedure 89 and 93-95) can be preferred. It can provide good accuracy with substantially lower computational cost for most combustion systems. In a recent examination of the computation of laminar flames, the mixture averaged diffusion model can be regarded as the de facto standard in combustion modeling. (See, e.g., Reference 96)

Recently, a reduced multicomponent diffusion model was described. (See, e.g., Reference 97). In this model, the diffusion coefficients of the important species can be calculated by the more accurate multicomponent model, and for the rest of the unimportant species, the mixture-averaged model can be applied. This model gives relatively accurate prediction of the diffusion coefficients compared with the mixture-averaged model and reduced the computational cost by 80% compared with the multicomponent model. But it can be still much slower than the mixture averaged model.

Even if the mixture averaged model, and the reduced multicomponent model, can be several orders of magnitude faster than the multicomponent model, they can still be too time consuming to be used for the calculations of convection and diffusion fluxes in a large scale numerical simulation. This problem becomes more significant when the chemistry may not be the most time consuming part anymore such as when a computationally efficient chemistry integrator such as CO-DAC method can be used. (See, e.g., Reference 88). The computational cost of the transport terms, mostly the diffusion coefficients, becomes the dominant time consuming part in the modeling. Therefore, further reducing the computation cost of diffusion coefficients can be of great importance when a large kinetic mechanism can be used.

Thus, it may be beneficial to provide an exemplary process for generating/establishing a cool flame, which can address and/or overcome at least some of the deficiencies described herein above.

SUMMARY OF EXEMPLARY EMBODIMENTS

An exemplary embodiment can be an exemplary method, which can include, for example, generating a cool flame(s) using a plasma-assisted combustion, and maintaining the cool flame(s). The cool flame(s) can have an exemplary maximum temperature below about 1050 K, which can be about 700 K. The cool flame(s) can be further generated using a heated counterflow flame arrangement and an ozone generating arrangement. The cool flame burner arrangement can include a liquid fuel vaporization arrangement. The ozone generating arrangement can include a micro plasma dielectric barrier discharge arrangement. The plasma-assisted combustion can be generated using (i) liquid normal alkanes, ethers, and/or transportation fuels, (ii) heated nitrogen and/or air, and (iii) ozone.

In some exemplary embodiments of the present disclosure, the ozone can be between about 0.1% and about 5%. The heated nitrogen or air can have a temperature between about 400 K and about 850 K. The ozone can be decomposed using the heated nitrogen and/or air. The ozone can be generated using a stream of oxygen(s) and/or air. The liquid fuels or the ozone can be diluted using a dilution gas, which can include helium, argon and nitrogen. The plasma-assisted combustion can be plasma-assisted moderate or intense low-oxygen dilution combustion (MILD).

A further exemplary embodiment of the present disclosure can include an exemplary apparatus, which can include, for example, a cool flame generating arrangement which can be configured to generate a cool flame(s). The cool flame generating arrangement can include a low-pressure chamber, a counterflow flame arrangement located inside or near the low-pressure chamber and an ozone generating arrangement which can generate ozone and can be coupled to the counterflow flame arrangement, and facilitate the cool flame arrangements to generate the cool flame. The cool flame generating arrangement can generate the cool flame(s) having a temperature below about 1050 K. The counterflow flame arrangement can include a liquid fuel vaporization arrangement, which can be configured to burn liquid n-heptane. The ozone generating arrangement can include a micro plasma dielectric barrier discharge arrangement, and the ozone generating arrangement can generate the ozone using oxygen. The cool flame generating arrangement can include a plasma-assisted cool flame generating arrangement.

These and other objects, features and advantages of the exemplary embodiments of the present disclosure will become apparent upon reading the following detailed description of the exemplary embodiments of the present disclosure, when taken in conjunction with the appended claims.

BRIEF DESCRIPTION OF THE DRAWINGS

Further objects, features and advantages of the present disclosure will become apparent from the following detailed description taken in conjunction with the accompanying Figures showing illustrative embodiments of the present disclosure, in which:

FIGS. 45A and 45B are graphs illustrating radicals and temperature profiles without flame $X_F$=0.01, $X_O$=0.4, P=72 Torr, f=24 kHz, a=250 l/s (e.g., fuel side at 0 mm, oxidizer side at 1.6 cm) according to an exemplary embodiment of the present disclosure;

FIG. 47A is a block diagram of a flux analysis DME consumption pathway according to an exemplary embodiment of the present disclosure;

FIG. 47B is a block diagram of a flux analysis OH and H formation pathways according to an exemplary embodiment of the present disclosure;

FIG. 47C is a block diagram of reaction pathways of O, $X_F$=0.01, $X_O$=0.4, P=72 Torr, f=24 kHz, a=250 l/s according to an exemplary embodiment of the present disclosure;

FIG. 51A is a graph illustrating the evolution of temperatures for DME/$O_2$/He (6.54%/19.63%/73.82%) at 480 K, 600 K and 800 K with and without 1000 ppm atomic O addition according to an exemplary embodiment of the present disclosure;

FIG. 51B is a graph illustrating a PSR calculation for DME/$O_2$/He (3%/9%/88%) at $T_o$=650 K with atomic O addition at different levels, at P=72 Torr according to an exemplary embodiment of the present disclosure;

FIG. 52 is a graph illustrating the relationship between $CH_2O$ PLIF and fuel mole fraction $X_O$=0.6, P=72 Torr, f=34 kHz, a=250 l/s according to an exemplary embodiment of the present disclosure;

Figures 1A, 1B:
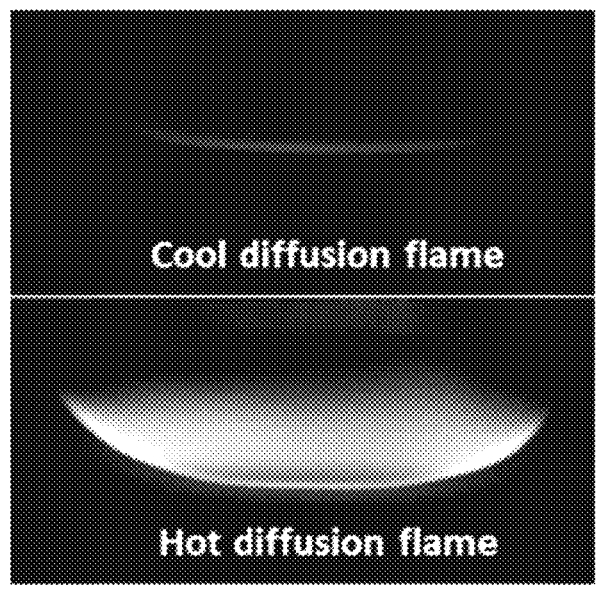
FIG. 1A is a photograph of a cool diffusion flame according to an exemplary embodiment of the present disclosure.
FIG. 1B is a photograph of a hot diffusion flame.

Throughout the drawings, the same reference numerals and characters, unless otherwise stated, are used to denote like features, elements, components or portions of the illustrated embodiments. Moreover, while the present disclosure will now be described in detail with reference to the figures, it is done so in connection with the illustrative embodiments and is not limited by the particular embodiments illustrated in the figures and the appended claims.

DETAILED DESCRIPTION OF EXEMPLARY EMBODIMENTS

Exemplary embodiments of the present disclosure relate to an exemplary process/apparatus for generating/establishing a low temperature flame and combustion to accelerate fuel oxidation and processing without producing soot and NOx emissions. The exemplary process/apparatus can be used in ignition and combustion control for advanced homogeneous charge compression ignition ("HCCI") and reactivity controlled compression ignition engines, dual fuel engines, gasoline and diesel engines, engine knocking, combustion instability, fuel processing and cracking, emission control, and new clean combustion engines etc.

The exemplary process/apparatus can utilize an oxygen rich oxidizer stream and a non-equilibrium plasma, which can create new chemical species such as singlet oxygen, ozone, ions, excited species and intermediate radicals. Stable, low temperature, cool flames and flameless combustion can be established to enable fast low temperature fuel oxidation in a broad range of pressure (e.g., about 0.1- about 50 atmosphere). Due to the low flame temperature (e.g., about 500 K-900 K), no soot emissions and no $NO_x$ emissions can be formed in the cool flames and flameless combustion region. Moreover, the cool flame process/apparatus can facilitate rapid fuel (e.g., ethers, biodiesel, gasoline, diesel and jet fuel) decomposition and partial oxidation to form clean and valuable small molecule fuels such as CO, $H_2$, $C_2H_4$, $CH_2O$, $CH_3HCO$ and $CH_4$ at low cost and high efficiency.

In an experimentation with the exemplary process/apparatus according to the exemplary embodiments of the present disclosure, cool flames and flameless combustion with peak flame temperature below about 700 K were observed at low pressure (e.g., about 0.1 torr) and about 1 atmosphere for different transportation fuels with flow residence time below about 10 ms. No soot emissions were observed. The flow rate of plasma discharge can be overcome by using micro-discharge.

The exemplary cool flame process/apparatus can be used to control engine knocking of gasoline engine, to enable ignition control in HCCI, RCCI, and highly fuel stratified advanced gasoline and diesel engines, zero emission engines, low emission gas turbine engines, industrial burners, and fuel cracking and processing.

The exemplary cool flame process/apparatus can be used to directly oxidize heavy fuels into $CH_2O/H_2/CO$ for SOFCs, and can remove coking using pulsed ozone oxidation and a formaldehyde (e.g., $CH_2O$) decomposition catalyst to form $H_2$/CO. The exemplary cool flame process/apparatus significantly increase the fuel-flexibility and decrease the cost of SOFCs. The exemplary cool flame process/apparatus can also solve the problems of current reformer technologies that suffer from extensive deactivation due to coking. In addition, due to the reduced temperature of the cool flame, the exemplary cool flame process/apparatus can also reduce the enthalpy losses and increase energy efficiency compared to existing steam reforming and partial oxidation systems. The exemplary cool flame process/apparatus can include a plasma activated cool flame reformer for SOFCs using n-decane (e.g., $C_{10}H_{22}$) as a sample large hydrocarbon fuel, and can incorporate and test formaldehyde decomposition catalysts using $CH_2O/CO/H_2$ mixtures.

Figure 20:
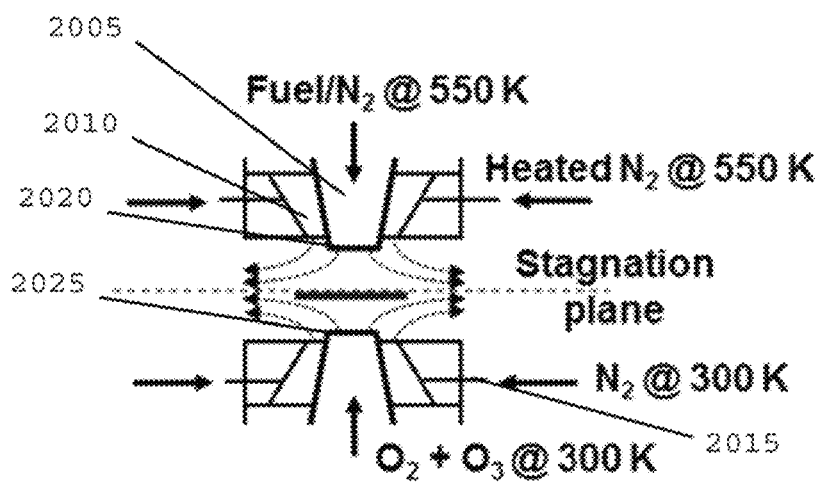
FIG. 20 is a diagram of an exemplary experiment showing a cool flame according to an exemplary embodiment of the present disclosure.

Exemplary Self-Sustaining n-Heptane Cool Diffusion Flames Activated by Ozone Experiment The experimental platform to establish a self-sustaining cool diffusion flame can include, for example, a heated counterflow burner integrated with a liquid fuel vaporization system and an ozone generator with micro plasma dielectric barrier discharge. An exemplary schematic of this experimental setup is shown in FIG. 20, the details of which have been described. (See, e.g., References 34-37).

For example, liquid fuel, n-heptane (e.g., Sigma Aldrich, >99% in purity) can be delivered by a syringe pump (e.g., Harvard Apparatus, PHD 22/2000) through the central capillary tube 2009 (e.g., about 200 μm inner diameter) into a pre-vaporization chamber 2010 maintained at about 550 K. Heated nitrogen (e.g., about 350 K) can be supplied through the annular coaxial tube 2015 (e.g., about 2 mm inner diameter) to enhance the atomization of liquid fuel. After the atomization of liquid fuel by co-flowing nitrogen, the fully mixed and pre-vaporized fuel/nitrogen mixture can be directed into the upper burner 2020, the temperature of which can be held at 550 ±5 K with PID control.

Pure oxygen (e.g., >about 99.9% in purity) can be used for the oxidizer. An ozone generator (e.g., Ozone Solutions, TG-20) can be used to produce ozone from the oxygen stream and the pressure inside of ozone generator can be held at about 170 kPa. Ozone concentrations can be measured by monitoring the volumetric flow rate before and after the ozone generator with flow calibrator (e.g., BIOS, Drycal DC-2) at the constant mass flow of oxygen. Depending on the flow rate of oxygen, (for example, 2-4% of ozone in volume fraction within ±about 0.2% fluctuation can be produced in the oxidizer stream and directed to the lower burner 2025 at about 300 K.

The upper and lower fuel and oxidizer burners 2020 and 2025 can both have about 13 mm of inner diameter at the exits. To ensure the validity of plug flow assumption, and reduce the uncertainty in species sampling (see, e.g., Reference 37), a large nozzle separation distance of about 24 mm can be used for most of measurements. The strain rate can be defined as the gradient of axial flow velocities by taking into account the density difference between fuel and oxidizer. (See, e.g., References 34-36). Species profiles of cool diffusion flames can be measured by using a microprobe sampling with a micro gas chromatic system (e.g., Inficon, 3000 micro-GC). (See, e.g., Reference 37). Uncertainties of measured species concentrations can be evaluated from the calibration of micro-GC, within about ±5% in species mole fraction.

Numerical calculations can be performed using the OPPDIF module of the CHEMKIN package (see, e.g., Reference 38) with a modified arc-length continuation method. (See, e.g., References 39 and 40). A comprehensively reduced n-heptane model (see, e.g., Reference 41) can be employed by using a multi-generation path flux analysis ("PFA") method (see, e.g., Reference 42) from the detailed chemical kinetic model (see, e.g., Reference 14), which can be used for a n-heptane chemical kinetic model. An ozone submodel can be utilized. (See, e.g., Reference 28). Other n-heptane models can also be tested further. (See, e.g., References 15 and 43).

Figure 2:
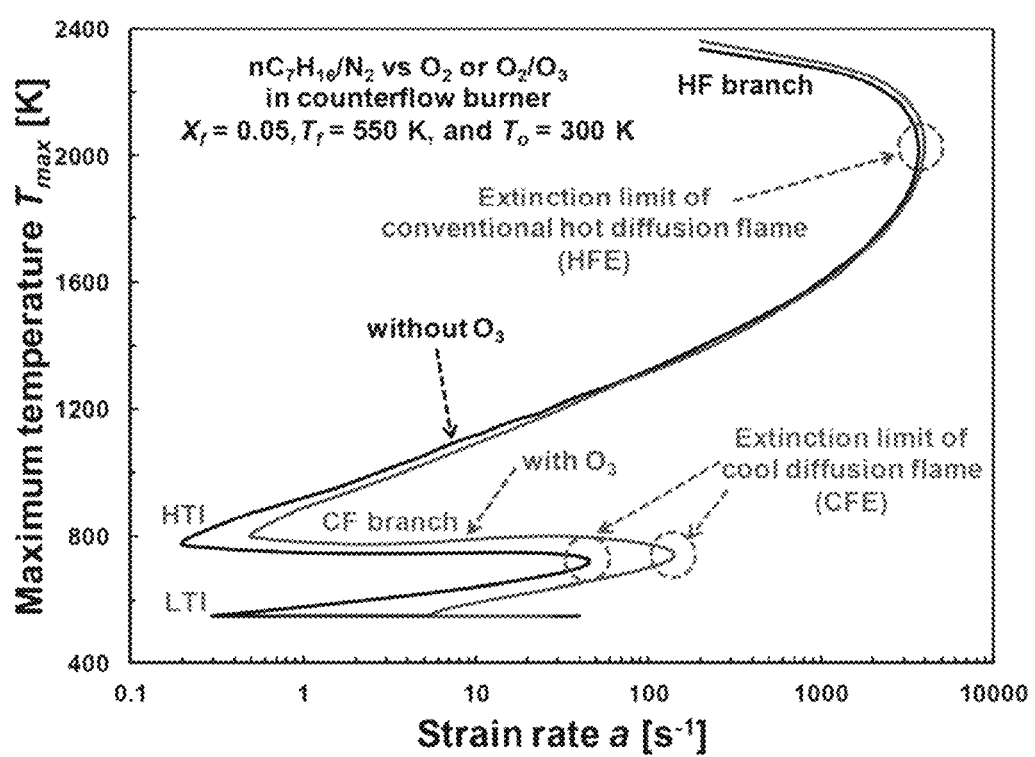
FIG. 2 is a graph illustrating calculated S-curves of diffusion flame in a counterflow configuration according to an exemplary embodiment of the present disclosure.

Exemplary Self-Sustaining n-Heptane Cool Diffusion Flames Activated by Ozone Results and Discussion Initiation of cool diffusion flame has been tested by changing the nitrogen dilution level at fuel side, strain rate, and ozone concentration produced with ozone generator. FIGS. 1A and 1B show photos of a cool diffusion flame and a conventional hot diffusion flame, respectively, taken by a digital camera (e.g., Nikon, D40) at exactly identical flow conditions with about 3% ozone produced in the oxidizer side. The fuel mole fraction ($X_f$) of about 0.07 and strain rate (a) of about 100 $s^{-1}$. With ozone addition as the low temperature chemistry ("LTC") initiator, a cool diffusion flame shown in FIG. 1A can be successfully established. For comparison purposes, a hot diffusion flame (e.g., high temperature normal diffusion flame) shown in FIG. 1B at the same conditions can be initiated by a high temperature external ignition source from the pre-existing cool diffusion flame. FIG. 2 shows that the hot diffusion flame in FIG. 1B has a strong incandescence yellow emission from soot particles (e.g., shutter speed of 1/4000 s) due to high temperature flame, whereas the cool diffusion flame in FIG. 1A has a very weak bluish chemiluminescence (e.g., shutter speed of ½ s), indicating relatively lower flame temperature, and no soot formation.

In order to elucidate the observed two different flame regimes, (e.g., the hot and cool diffusion flames), e.g., at the identical flow conditions, numerical calculations, e.g., using exemplary specifically-programmed computer processors, can be performed to investigate the flame stability and the S-curve for the diffusion flames in a counterflow configuration. FIG. 2 shows the calculated flame temperature ($T_{max}$)

vs. stretch rate of a S-curve for steady-state n-heptane diffusion flames for $X_f$=0.05 with and without about 3% ozone addition at the oxidizer stream. Regardless of ozone addition, numerical calculations show that there can exist two stable branches, hot flame ("HF") and cool flame ("CF"). The temperature on the HF branch can be greater than about 2000 K while that on the CF can be around 800 K. The hot flame extinction ("HFE") limits can be found at a=3700 s$^{-1}$ and 3950 s$^{-1}$ without and with about 3% ozone addition, respectively. The cool flame extinction ("CFE") limit can be substantially extended from 46 s$^{-1}$ without ozone to 141 s$^{-1}$ by ozone addition, indicating ozone activated low temperature chemistry at a shorter timescale. Compared to the case without ozone, the low temperature ignition ("LTI") limit of with ozone enhancement can become much higher than the high temperature ignition ("HTI") limit, but lower than the CFE, enabling the auto-ignition to the self-sustaining cool diffusion flame branch by ozone addition as shown in FIG. 1A. Therefore, low temperature activation by an ignition enhancer, such as ozone, can be to observe a self-sustaining cool flame at atmospheric pressure and below.

The initiation diagram of cool diffusion flames in a phase coordinate of $X_f$ and a can be experimentally determined at the constant ozone concentration. The extinction limits of cool diffusion flames, represented by extinction strain rates, can also be measured as a function of $X_f$.

Exemplary Initiation and Extinction of Cool Diffusion Flame

Ozone production from the ozone generator can be sensitive to the flow rate of oxygen; the higher ozone concentration the lower flow rate. In order to keep the ozone concentration constant and momentum balance between fuel and oxidizer sides, the initiation diagram of cool diffusion flame can be measured by varying the nozzle separation distance between about 13 to about 24 mm. Oxygen flow rate can be held constant for all measurements (e.g., constant ozone concentration) and only flow rates of fuel and nitrogen can be varied, while maintaining the flow momentum balanced. As described above, the initiation of cool and hot flames can be measured by turning the fuel syringe pump on at the designed flow rate, after setting all other flow condition and confirming the ozone concentration.

Figure 3:
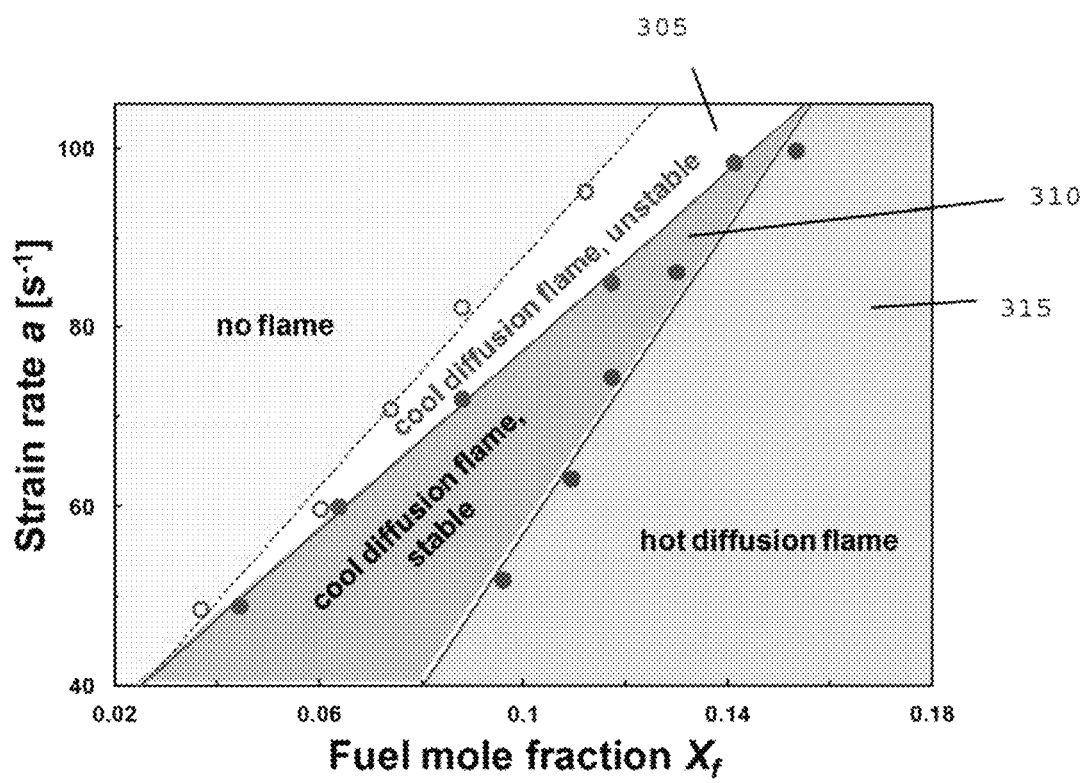
FIG. 3 is a graph illustrating a cool diffusion flame measured in terms of $X_f$ and a with 4% ozone addition at oxidizer side according to an exemplary embodiment of the present disclosure.

FIG. 3 illustrates a graph that shows that an experimentally determined initiation diagram of cool diffusion flames with about 4% ozone addition at the oxidizer side. Three flame regimes can be found that can include, for example: 1) unstable cool flame 305, 2) cool diffusion flame 310, and 3) hot diffusion flame 315. For example, at a=80 s$^{-1}$, there can be no flame initiated until $X_f$ reaches about 0.085. At 0.085<$X_f$<0.105, cool diffusion flames can be formed from the direct ignition by ozone, but are found to be unstable, exhibiting repetitive ignition and extinction instability. Stable cool diffusion flames can be observed at 0.105<$X_f$<0.125. At $X_f$>0.125, the direct initiation of hot diffusion flames can be observed.

The direct initiations of cool diffusion flames by ozone addition can be described based on the role of ozone decomposition. Ozone can decompose through the reaction, $O_3+(M)=O+O_2+(M)$, releasing atomic O due to the temperature gradient formed between fuel (e.g., 550 K) and oxidizer sides (e.g., 300 K), prior to the ignition. Atomic O can trigger and accelerate the H abstraction reactions from fuel molecules, and can shorten the induction chemistry to form the initial fuel radical pool (R). Once the fuel radicals can be formed, the low temperature chemistry (e.g. $R+O_2$ reactions) can proceed. At lower $X_f$, the chemical heat release rate can be regulated with the transport of fuel, forming the cool diffusion flames. Whereas at higher $X_f$, the excessive chemical heat release from increased fuel concentration through the aforementioned reactions can trigger the transition to hot ignition, forming the hot diffusion flames directly. This exemplary behavior can be also described based on the two-stage ignition process for homogeneous n-heptane/air oxidation (14 and 15); by interpreting the strain rate inversely as characteristic timescale. For $X_f$=0.1, at the higher strain rate the characteristic timescale can be too short for the chemistry, and thus chemically frozen, exhibiting no formed flame. When a=90 s$^{-1}$ (e.g., approximately 11 ms of time scale), the first-stage ignition can start, forming the cool diffusion flames. Further increasing the timescale (e.g., decreasing a to approximately 57 s$^{-1}$) to approximately 17 ms, the transition to second-stage hot-ignition can occur, forming the hot diffusion flames.

Figure 4:
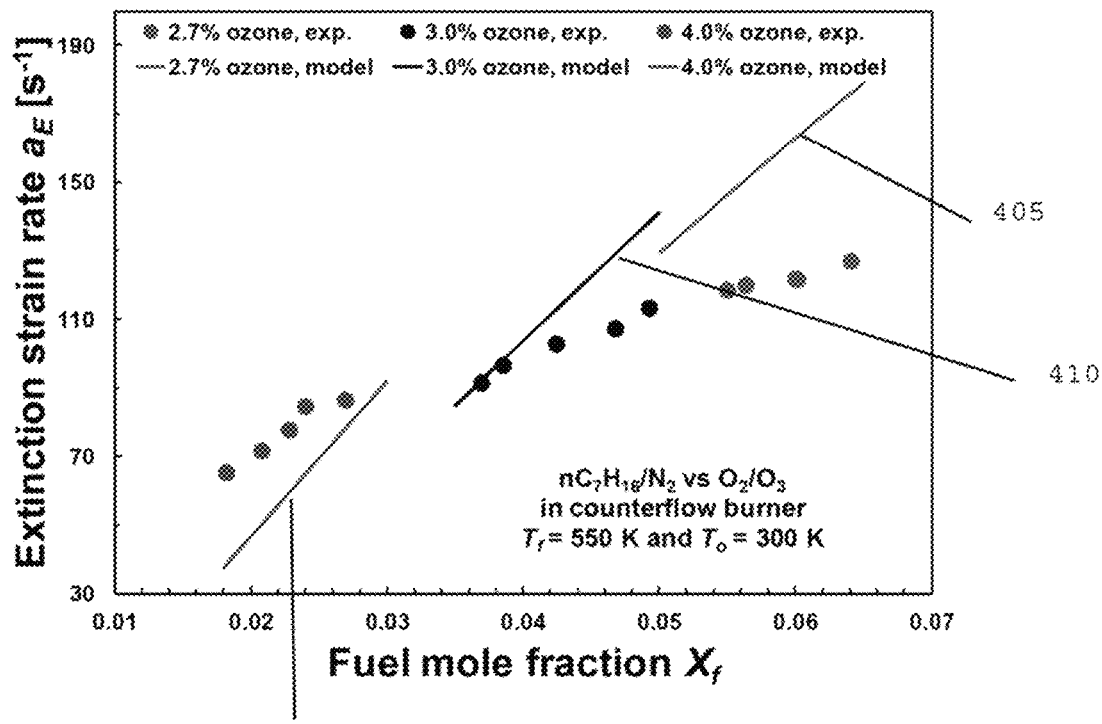
FIG. 4 is a graph illustrating measured extinction limits of cool diffusion flames at three different levels of ozone addition according to an exemplary embodiment of the present disclosure.
Figure 5:
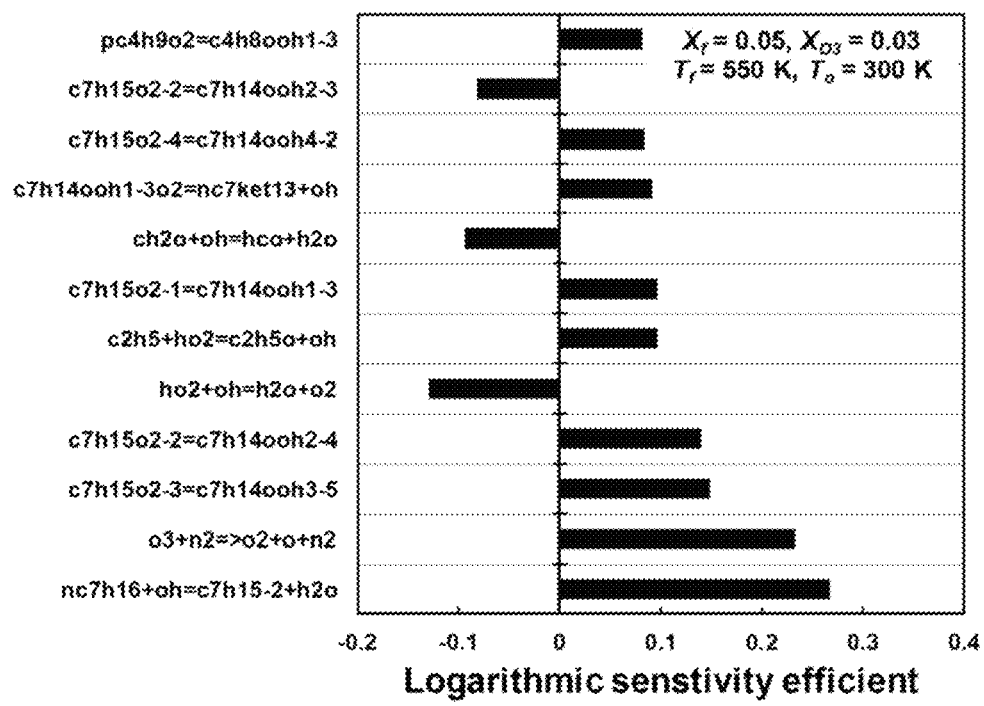
FIG. 5 is a chart illustrating a sensitivity analysis of extinction strain rate per elementary reaction step for cool diffusion flame at $X_f$=0.05 with 3% ozone addition according to an exemplary embodiment of the present disclosure.

The extinction limits of stable cool diffusion flames can be measured after initiating the cool diffusion flame. Extinction limits can be measured either by, e.g., (i) changing $X_f$, adjusting fuel and nitrogen flow rates gradually at the fixed a, and/or (ii) simultaneously changing the nitrogen and oxygen flow rates, while maintaining the momentum balance. FIG. 4 illustrates a graph that shows the measured extinction strain rates of cool diffusion flames (e.g., with 2.7% ozone 405, 3.0% ozone 410 and 4.0% ozone 415) in a function of $X_f$ along with model predictions, for three different levels of ozone additions. In general, the extinction strain rates of a cool diffusion flame can increase as the fuel mole fraction increases, and the exemplary model predictions can capture the general trend. However, the model can under predict the extinction limits at lower $X_f$, whereas it can over predict at higher $X_f$, indicating the large uncertainty of cool flame chemistry Chemical kinetics at the extinction limits of cool diffusion flames can be numerically analyzed by performing the sensitivity analyses for reactions and transports. FIG. 5 is a chart that shows the sensitivity analysis from A-factor perturbation in elementary reactions for $X_f$=0.05 with about 3% ozone addition. The cool diffusion flame can be controlled by the low temperature chemistry, which can be completely different from a conventional hot diffusion flame (34-36). In the case of hot diffusion flames, the most dominant reaction steps can be chain branching/propagation reactions of small species chemistry to generate OH, O, and H, such as $H+O_2=O+OH$, $CO+OH=CO_2+H$, and $HCO+(M)=H+CO+(M)$. However, in case of a cool diffusion flame, the results in FIG. 5 indicate that the extinction limit can be governed by the reactions relevant to the low temperature chemistry, such as the formation of QOOH from the isomerization of RO2 (e.g. c7h15o2=c7h1400h3-5, etc.), and $HO_2$ related reaction (e.g., $HO_2+OH=H_2O+O_2$) for heat release. It also shows that the extinction limit can be sensitive to the fuel radical initiation chemistry, $nC_7H_{16}+OH$ to form $R+H_2O$.

The flux analysis on fuel consumption pathways can show that more than about 90% of n-heptane can be decomposed through H abstraction reactions by OH, H and O, but OH radical can play a most significant role here, contributing about 80% of total n-heptane consumption pathways. The exemplary model can predict very complicated multiple pathways for OH production, which can be categorized as (i) direct thermal decompositions of QOOH, O2QOOH, and ketohydroperoxide (e.g., more than 35%), or (ii) $HO_2$ or $CH_2O$ involving reactions (e.g., approximately 20%). Major consumption routes for OH can be n-heptane+OH reactions (e.g., >about 50%) and $CH_2O+OH$ reaction (e.g., approximately 15%). The exemplary model can predict maximum OH concentration less than about 5 ppm in the entire flame structure, which can indicate that the OH radical can immediately be consumed by the induction chemistries once produced.

Figure 6:
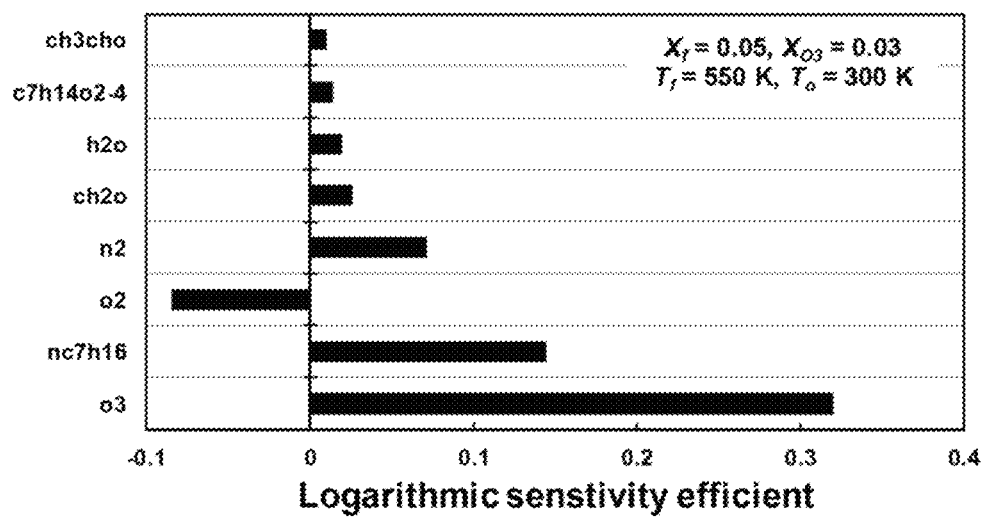
FIG. 6 is a chart illustrating a sensitivity analysis of extinction strain rate per species diffusivity for cool diffusion flame at $X_f$=0.05 with 3% ozone addition according to an exemplary embodiment of the present disclosure.

Sensitivity analysis on diffusive transport of species at the extinction limit of cool diffusion flame can also be performed and the result are shown in the chart of FIG. 6, where it is shown that the diffusivity of ozone can be found to play significant role, since the ozone decomposition to form atomic oxygen, shown in FIG. 5, can be an important chain-initiation reaction. Compared to the hot diffusion flame, where OH, H, and O becomes important (see, e.g., Reference 34), the exemplary result shown in FIG. 6 reveals that the cool diffusion flame can be sensitive to the diffusive transport of species relevant to the low temperature chemistry, such as acetaldehyde (e.g., $CH_3CHO$) and $CH_2O$.

Exemplary Structure of Cool Diffusion Flame

Previous studies on methyl esters in terms of their extinction behaviors has revealed that the global flame characteristics can be properly emulated by a model, even with erroneously predicting the details of flame structure. (See, e.g., References 44 and 45). In this regard, temperature and species profiles of cool diffusion flame can be measured at $X_f$=0.08 and a=100 $s^{-1}$ at about 3% ozone addition and compared to model predictions.

Figures 7A, 7B, 7C:
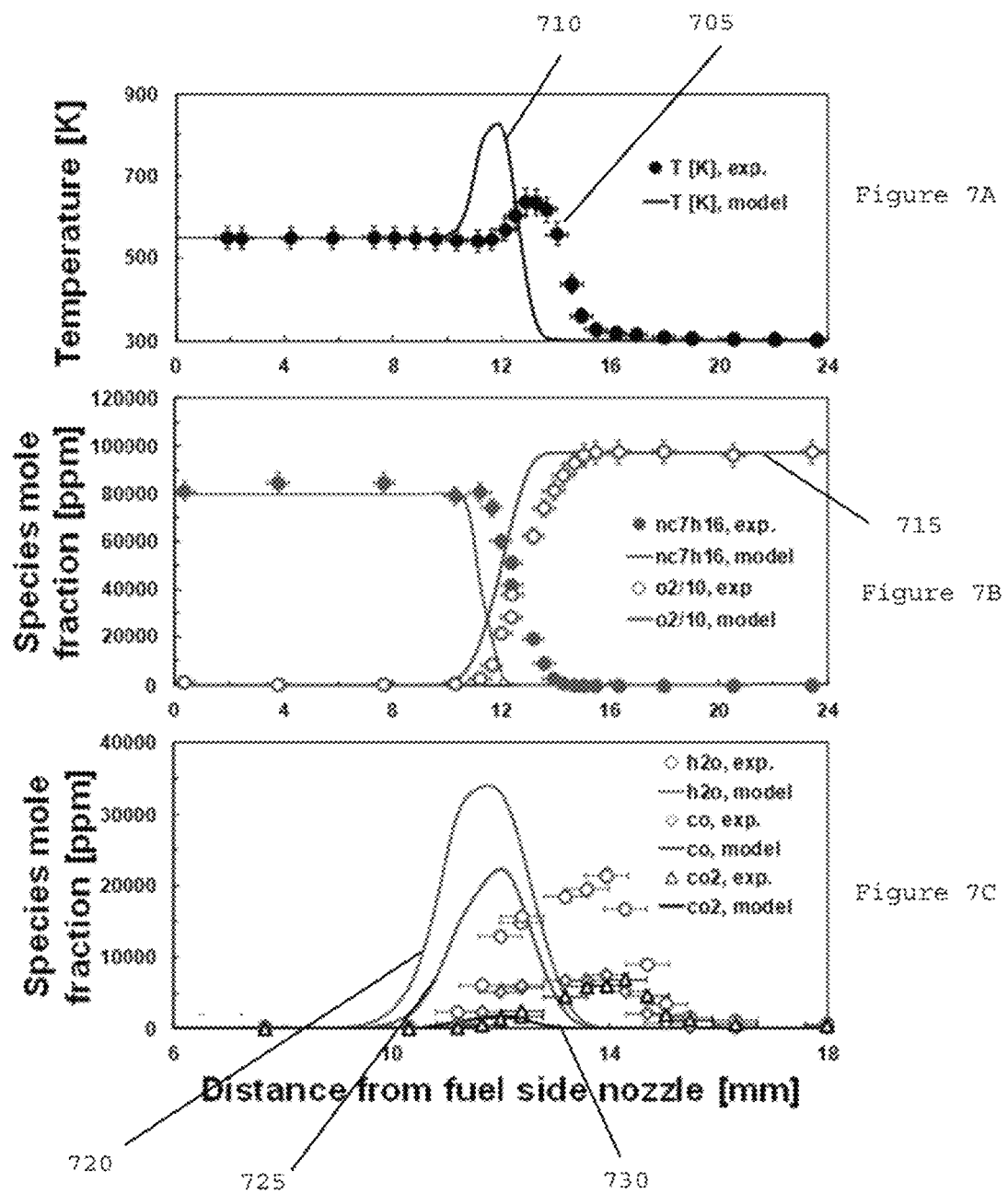
FIGS. 7A-7C are graphs illustrating comparisons between experiments and model calculations for cool diffusion flame at $X_f$=0.08 and a=100 s$^{-1}$ with 3% ozone addition in a function of distance from fuel side nozzle according to an exemplary embodiment of the present disclosure.

FIG. 7A shows a graphs of the comparison between measured (e.g., element 705) and model-predicted (e.g., element 710) temperature profiles of cool diffusion flame. The temperature measurements indicate that the cool diffusion flame can be located at the oxidizer side, judged by the position of peak temperature, whereas the model can predict flame location near stagnation plane at the middle of two nozzles. Additionally, the measured maximum flame temperature can be approximately 640 K, but the model can predict about 828 K, indicating over-prediction of heat release in the model. In general, the intrusive measurements by either thermocouple (e.g., about 127 μm junction diameter) or sampling probe (e.g., about 363 μm outer diameter) can cause the perturbation of flame position. (See, e.g., Reference 37). The cool diffusion flame tested here can be located at the oxidizer side even without inserting the thermocouple or sampling probe, confirming that the discrepancy of flame location between measurements and model prediction may not be caused by the exemplary cool flame procedure. However, the exemplary cool flame procedure or still cause the uncertainty in the flame location equivalent to the size of sampling probe (e.g., ±0.4 mm), thus the sampling results used herein can be based on the maximum concentration of measured species.

Spatial profiles of major reactants, n-heptane and oxygen, are plotted in the graph of FIG. 7B. Unlike hot diffusion flames where the fuel molecules disappear prior to the main reaction zone, strong penetrations of fuel and oxygen into the other sides can be observed in the cool diffusion flame tested here, indicating the significantly slow oxidation process. The exemplary model can predict faster oxidation of fuel molecule, indicated from the slope of n-heptane profile 715, which can be attributed to the over-estimation of maximum flame temperature. Major products, $H_2O$ 720, CO 725 and $CO_2$ 730 are also shown in the graph of FIG. 7C. The exemplary model can over predict the $H_2O$ and CO formations, but under-predicts the $CO_2$ formation.

Figures 8A, 8B:
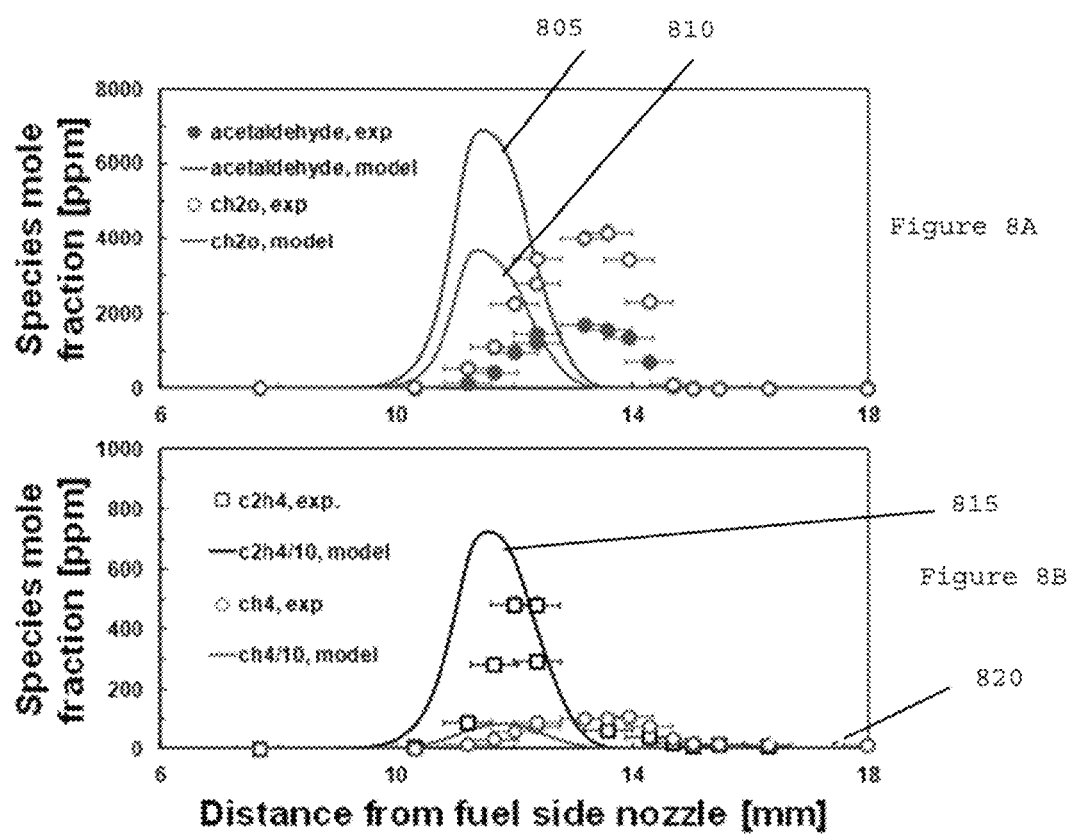
FIGS. 8A and 8B are graphs illustrating comparisons between experiments and model calculations for cool diffusion flame at $X_f$=0.08 and a=100 s$^{-1}$ with 3% ozone addition in a function of distance from fuel side nozzle according to an exemplary embodiment of the present disclosure.

The exemplary model predictability for the structure of cool diffusion flames can be more clearly evaluated by comparing intermediate species. Considering the complexity of low temperature chemistry both in the experiment and modeling, the exemplary model can be capable of capturing the formations of $CH_2O$ 805 and acetaldehyde 810 relatively well. (See, e.g., FIG. 8A). However, the formations of $C_2H_4$ 815 and $CH_4$ 820 can be significantly over-estimated in the model, by a factor of 10 in FIG. 8B. Major routes to form $C_2H_4$ and $CH_4$ in low temperature chemistry can be known to be from the propagation reactions of QOOH (14). The large discrepancies can indicate that the rates of QOOH pathways to form olefins can be over-estimated in the exemplary model. More recent models of n-heptane (see, e.g., References 15 and 43) were also tested, however, no improvement of $C_2H_4$ and $CH_4$ prediction was observed.

Figure 9:
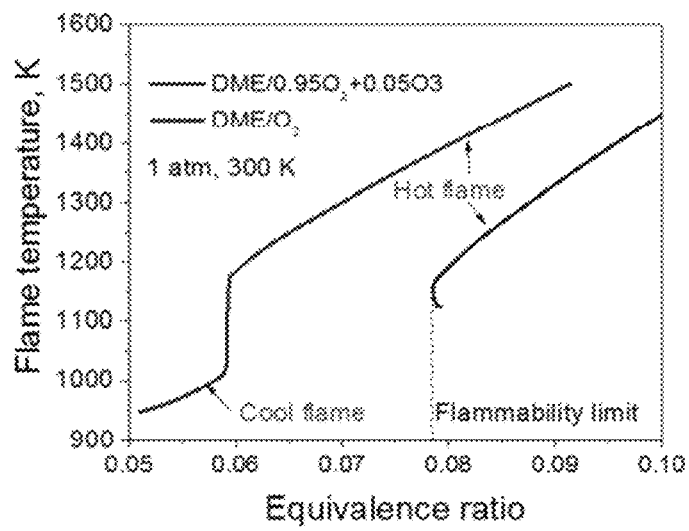
FIG. 9 is a graph illustrating a calculated flame temperatures of the DME/O$_2$/O$_3$ premixture (with ozone) and the DME/O$_2$ premixture (without ozone) in a freely-propagating premixed flame configuration according to an exemplary embodiment of the present disclosure.

FIG. 9 is a chart that illustrate comparisons between experiments and model calculations for cool diffusion flame at $X_f$=0.08 and a=100 $s^{-1}$ with about 3% ozone addition as a function of distance from fuel side nozzle (e.g.,) oxygenated species, acetaldehyde and $CH_2O$ and small hydrocarbon species ($C_2H_4$ and $CH_4$).

Exemplary Freely-Propagating Flame

FIG. 9 illustrates a graph that shows the computational results of the impact of ozone on the flame temperature and flame regimes of a freely-propagating premixed dimethyl ether flame. Numerical simulations were carried out by using the arc-length continuation method in a modified PREMIX code. To predict the flammability limit, radiation heat loss from CO, $CO_2$, and $H_2O$ can be modeled by using an optically thin model. It can be seen that without ozone addition, the lean flammability limit of the high temperature flames can exist at an equivalence ratio of about 0.078 near a flame temperature at about 1150K. However, with about 5% ozone addition in the oxygen stream, after a rapid transition region, a new cool flame branch appears at much lower equivalence ratios than the flammability limit of high temperature DME flames without ozone. Compared to the high flames without ozone addition, the flame with ozone addition does not extinguish near 1150K. Instead, it enters a transition flame regime from the high temperature flame to a cool flame where the flame temperature decreases rapidly as the equivalence ratio decreases. At flame temperature slightly above about 1000K, a cool flame can be established. A further decrease of equivalence ratio may only gradually decrease the flame temperature of the cool flame. Therefore, the existence of ozone can enable stable cool flames, and can extend the flammability limit.

Figure 10:
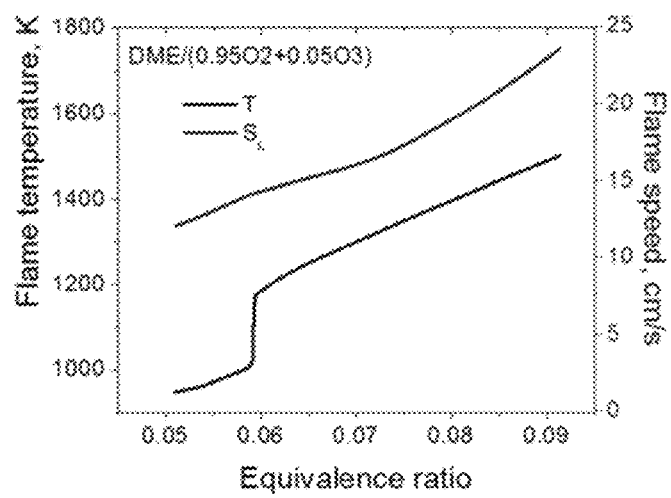
FIG. 10 is a graph illustrating calculated flame temperatures and flame speeds of the DME/O$_2$/O$_3$ premixture in a freely-propagating premixed flame configuration according to an exemplary embodiment of the present disclosure.

Exemplary numerical results of flame speeds as function of equivalence ratio are shown in the graph of FIG. 10. Unlike the flame temperature, the flame speed steadily decreases as the flame transitions into the cool flame regime without sharp fall in the flame speed in the transitional flame regime. Further studies of flame structure show that for much of this transition region, particularly for temperatures between about 1400 K and about 1000 K, a trailing hot flame can follow the leading cool flame in space. As the equivalence ratio becomes smaller, the separation distance between the two flames can increase until the hot flame no longer exists in the computational domain, completing the crossover from the transition region to the cool flame regime.

Figure 11:
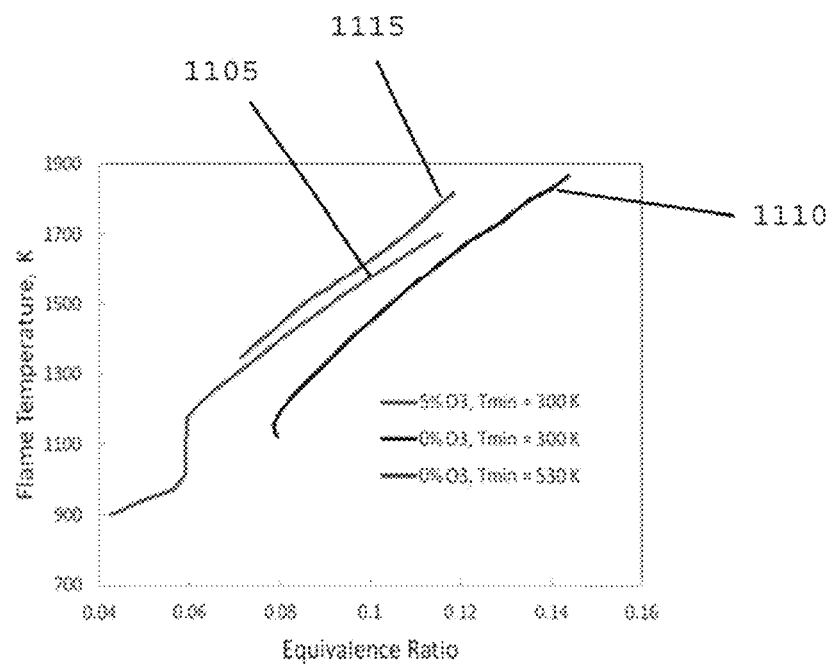
FIG. 11 is a graph illustrating a calculated flame temperatures of the DME/O$_2$/O$_3$ premixture at different initial temperatures and ozone concentrations in a freely-propagating premixed flame configuration according to an exemplary embodiment of the present disclosure.

The chemical necessity of $O_3$ in forming a cool premixed flame can also be observed. The increased entropy of $O_3$ compared to $O_2$ can be the driving force behind existence of the ozone-enhanced cool flames. FIG. 11 illustrates a 5% $O_3$ with $T_{min}$=300K (element 1105), a 0% O3 with $T_{min}$=300K (element 1110) and 0% O3 with $T_{min}$=530K (element 1115). However, it can be seen in FIG. 11 that accounting for ozone's heat of formation can cause a similar increase in the flame temperature, but may not extend the flammability limits to the cool flame region. Instead, it can be ozone's chemical characteristics that can be responsible for the establishment of stable cool flames. The radical pool created by the decomposition of ozone (e.g., $O_3 \leftrightarrow O_2+O$) can accelerate the low temperature chemistry, extend the flammability limits and can enable the establishment of stable cool flames.

Figure 12:
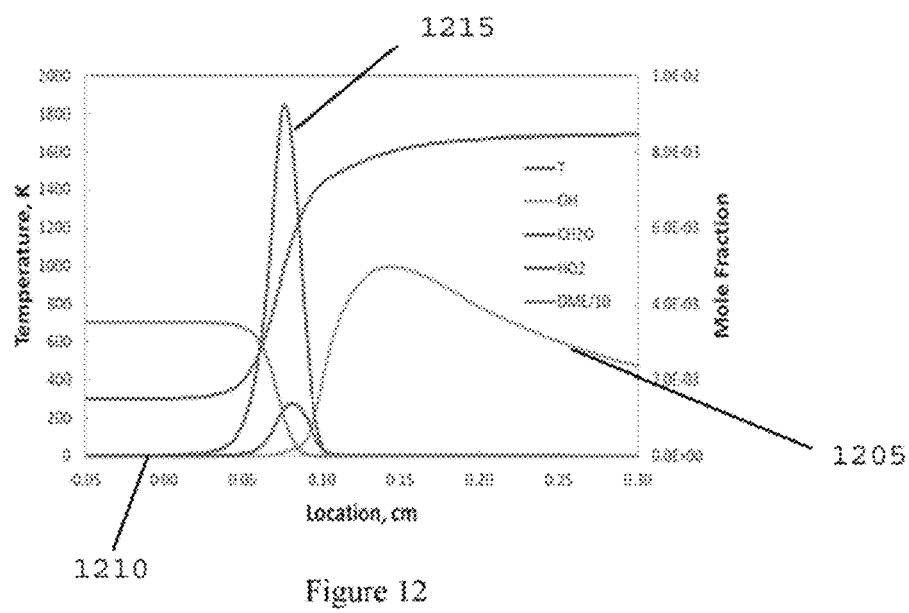
FIG. 12 is a graph illustrating a calculated flame profile for a DME/O$_2$/O$_3$ flame with 5% ozone addition in oxygen and a maximum temperature of 1700 K (hot premixed flame) according to an exemplary embodiment of the present disclosure.
Figure 13:
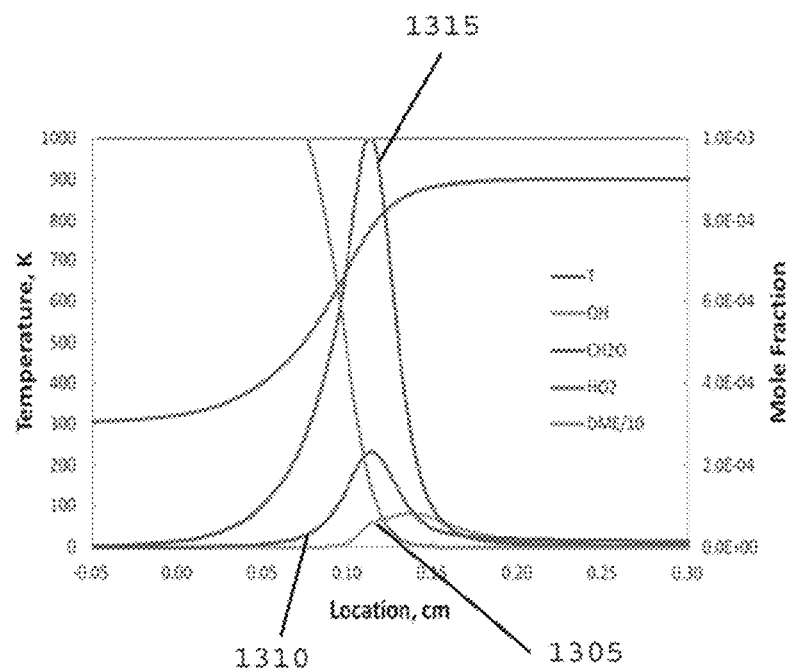
FIG. 13 is a graph illustrating a calculated flame profile for a DME/O$_2$/O$_3$ flame with 5% ozone addition in oxygen and a maximum temperature of 900 K (cool premixed flame) according to an exemplary embodiment of the present disclosure.

In addition to the marked shift in flame temperature, the cool and hot flame zones can exhibit different flame structures as described by intermediate concentrations. As seen in FIGS. 12 and 13, cool flames can have a significantly lower peak mole fraction of OH radicals 1205 even smaller than the peak $HO_2$ mole fraction 1210 and less than a tenth of the peak $CH_2O$ 1215. (See, e.g., FIG. 12). In hot flames (see, e.g., FIG. 13), on the other hand, the peak OH 1305 can be about three times larger than the peak $HO_2$ 1310 and over half of the peak $CH_2O$ 1315. Additionally, intermediate concentrations throughout the hot flame can be about an order of magnitude higher. Through this comparison, the $HO_2$ radicals and $CH_2O$ can be relatively more present in a cool flame while OH radicals can be more present in a hot flame.

Table 1 indicates exemplary reactions for heat release in cool and hot flames. Several reactions can be seen that only appear in one half of Table 1. The decomposition of ozone can be noted as important for cool flame heat release but not nearly as much for the hot flame (e.g., less than about 5%), which can be reasonable considering that the premixed cool flame can precede the trailing hot flame in space, and can therefore encounter the ozone first. The H-abstraction of formaldehyde can also be a significant reaction for cool flame heat production, supporting the previous assertion of the relative importance of $CH_2O$ in the cool flame. Finally, the presence of $R+O_2 \leftrightarrow RO_2$ can be seen, as well as the oxidation of the fuel radical itself. The degree to which it can contribute to the total cool flame heat release can be a strong sign that significant low temperature chemistry involving the undecomposed fuel radical can be present in the cool flame. This can be further supported by the fact that carbon monoxide oxidation (e.g., $CO+OH \leftrightarrow CO_2+H$), a major source of heat release in the trailing hot flame, and a part of high temperature chemistry, can provides less than about 1% of the total cool flame heat release.

Due to the relative important of the intermediates $CH_2O$ and $HO_2$ in the cool flame, understanding the mechanisms by which they can be produced can provide further insight into the cool flame chemistry as a whole. Table 2 shows that that the majority of formaldehyde within the cool flame can be produced by the decomposition of the large fuel species QOOH and R. Examining these reaction pathways can reveal that about 30% of R and about 80% of QOOH can decompose directly through these two $CH_2O$ reactions. Thus, it can be regarded that formaldehyde can be the major intermediary in the low temperature DME oxidation process. About 86% of the $CH_2O$ can react to form the formyl radical CHO, of which almost all (e.g., >about 99%) can be oxidized by $HCO+O_2 \leftrightarrow CO+HO_2$ to give carbon monoxide and the aforementioned hydroperoxyl radical. This key reaction shows up in both Table 1 and Table 2 as a major source of cool flame heat release, and a means of production of $HO_2$.

TABLE 2

| | Production of $CH_2O$ | | Production of $HO_2$ | |
|---|---|---|---|---|
| Reaction | | % of production | Reaction | % of production |
| $CH_2OCH_2OOH \leftrightarrow OH + 2CH_2O$ | | 65.8 | $HCO + O_2 \leftrightarrow CO + HO_2$ | 79.7 |
| $CH_3OCH_2 \leftrightarrow CH_2O + CH_3$ | | 18.9 | $CH_3O + O_2 \leftrightarrow CH_2O + HO_2$ | 6.3 |
| $CH_3O + O_2 \leftrightarrow CH_2O + HO_2$ | | 5.8 | $H + O_2 (+M) \leftrightarrow HO_2 (+M)$ | 4.7 |
| $CH_3 + O \leftrightarrow CH_2O + H$ | | 5.5 | | |

Exemplary Counterflow Configuration

Exemplary numerical calculations were also performed for a premixed dimethyl-ether flame in the counterflow configuration stabilized by a preheated nitrogen flow. The counterflow setup was chosen because: (1) a counterflow burner can provide a simple and quasi-one dimensional flow geometry, (ii) it can isolate the flame interaction with the nozzle and wall which have been a major concern for a weakly burning cool flames, (iii) the flame stretch of counterflow flame can provide a well-defined platform to study flame extinction, flammability limits and structures, and can enable direct comparisons between experiment and modeling to give further understanding of the dynamics of cool flames.

Figure 14:
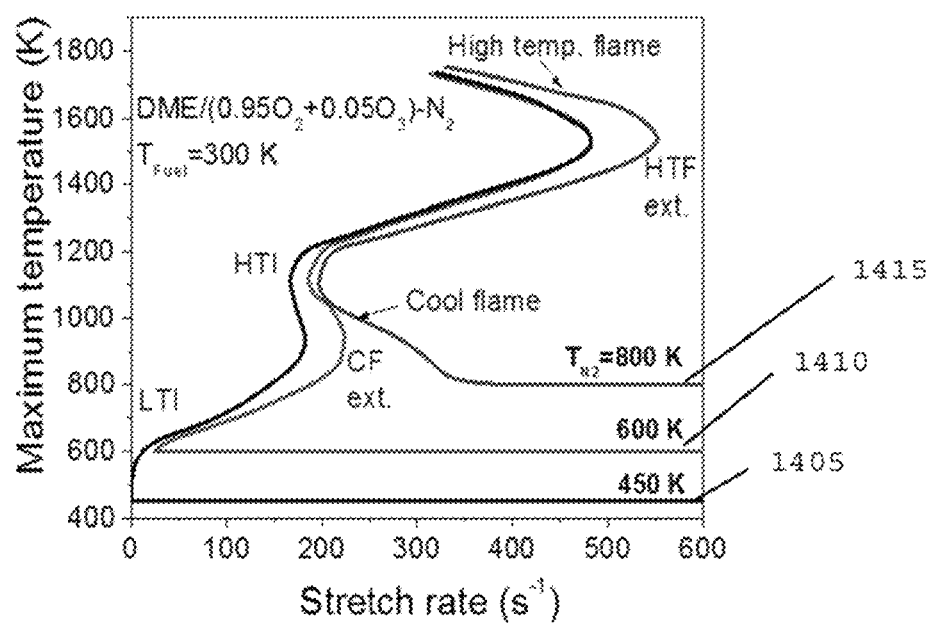
FIG. 14 is a graph illustrating a calculated flame regime diagram of the DME/O$_2$/O$_3$ premixture versus various initial temperatures of heated N2 (600 K) in a counterflow configuration according to an exemplary embodiment of the present disclosure.

FIG. 14 shows the effects of nitrogen temperature on the change of flame regimes and the ignition and extinction limits. The temperature of the $DME/O_2/O_3$ premixture can be fixed at about 300 K for all conditions. The exemplary results in FIG. 14 show that at a self-sustaining cool flame can exist at all three nitrogen temperatures at 450K (line 1405), 600K (line 1410) and 800K (line 1415). At about 450K, it can be seen that there can exist five different flame regimes, the high temperature flame, unstable high temperature flame, cool flame, unstable low temperature flame, and

TABLE 1

| Cool Flame Heat Release | | Hot Flame Heat Release | |
|---|---|---|---|
| Reaction | % of heat release | Reaction | % of heat release |
| $O_3 + H \leftrightarrow OH + O_2$ | 14.6 | $H + O_2 (+M) \leftrightarrow HO_2 (+M)$ | 19.2 |
| $HCO + O_2 \leftrightarrow CO + HO_2$ | 13.4 | $HO_2 + OH \leftrightarrow H_2O + O_2$ | 18.4 |
| $HO_2 + OH \leftrightarrow H_2O + O_2$ | 13.2 | $CO + OH \leftrightarrow CO_2 + H$ | 16.7 |
| $CH_2O + OH \leftrightarrow HCO + H_2O$ | 9.3 | $HO_2 + O \leftrightarrow O_2 + OH$ | 15.4 |
| $CH_3OCH_2 + O_2 \leftrightarrow CH_3OCH_2O_2$ | 8.2 | $HCO + O_2 \leftrightarrow CO + HO_2$ | 6.1 |
| $HO_2 + O \leftrightarrow O_2 + OH$ | 7.6 | | | the unburned mixture, respectively, separated by the high temperature extinction limit (e.g., HTF ext.), HTI, CFE limit and LTI. With the increase of nitrogen temperature of about 600K, the cool flame flammable region can move to a higher stretch rate. When the nitrogen temperature further increases to about 800K, the low temperature ignition limit can disappear, which can result in a smooth transition from the unburned mixture to the cool flame regime. Therefore, the existence of cool flames with ozone sensitization can be clearly demonstrated numerically. Moreover, the increase of inert stream temperature can dramatically change the dynamics and stability region of cool flames. The present results show that cool flame can be an important flame regime in engines, and can be addressed as the preheated air temperature increases by increasing compression ratio.

Exemplary Experimental Configuration

An exemplary process for establishing a self-sustaining cool premixed flame can include a heated counterflow burner integrated with a liquid fuel vaporization system and an ozone generator with micro plasma dielectric barrier discharge.

Heated nitrogen can be directed into the upper burner, the temperature of which can be held at 600±5 K with PID control. This heated inert stream can establish the temperature gradient utilized to decompose ozone in the $DME/O_2/O_3$ mixture supplied at the bottom burner. The oxidizer consists of pure oxygen (e.g., >about 99.9% in purity). An ozone generator (e.g., Ozone Solutions, TG-20), in which the pressure can be maintained at about 170 kPa, can be used to produce ozone from the oxygen stream. Ozone concentrations can be measured directly downstream from the exit of the ozone generator in the ozone cell by a UV absorption spectroscopy method (see, e.g., Reference 54), using a Deuterium lamp (e.g., Oriel) and a spectrometer (e.g., Ocean Optics, USB2000+) to scan absorption spectra between about 280 and about 310 nm. (See, e.g., Reference 58). The flow rate of DME can be controlled by a mass flow controller (e.g., MKS), and all DME can be merged with the $O_2/O_3$ flow exiting the ozone generator. The fully premixed $DME/O_2/O_3$ mixture can then be directed to the bottom burner (e.g., at about 300 K) of the counterflow system.

The upper and lower burners each have an about 13 mm inner diameter at the exit. A nozzle separation distance of about 22 mm can be used for all measurements. The strain rate can be defined as the gradient of the axial flow velocities, accounting for the density difference between the fuel and oxidizer streams (see, e.g., References 53-55).

Exemplary Experimental Results

Figure 15:
FIG. 15 is an image of a premixed DME/O$_2$/O$_3$ flame from an ICCD camera according to an exemplary embodiment of the present disclosure.

The burner distance (e.g., about 22 mm), premixture temperature (e.g., about 300 K), and inert temperature (e.g., about 600 K) were all held constant, leaving the $O_2$, $N_2$, and DME flow rates as the controlling variables. The mole fraction of ozone in oxygen varied very slightly with the $O_2$ flow rate but remained between about 3.1% (e.g., highest tested flow rate) and about 3.4% (e.g., lowest). For each of the three $O_2$ flow rates tested, the $N_2$ and DME flow rates were adjusted until the flame was able to ignite. After ignition, the $N_2$ flow rate was set to match the momentum balance with the premixture. Finally, the DME flow rate was either decreased until extinction occurred or increased until flashback. The ICCD camera was setup in such a manner that the entire distance between burners could be viewed in a single shot. FIG. 15 is a photo of the stable premixed flame from an ICCD camera. The flame itself can be quite dim, with a signal-to-noise ratio of only about 1.8.

Figure 16:
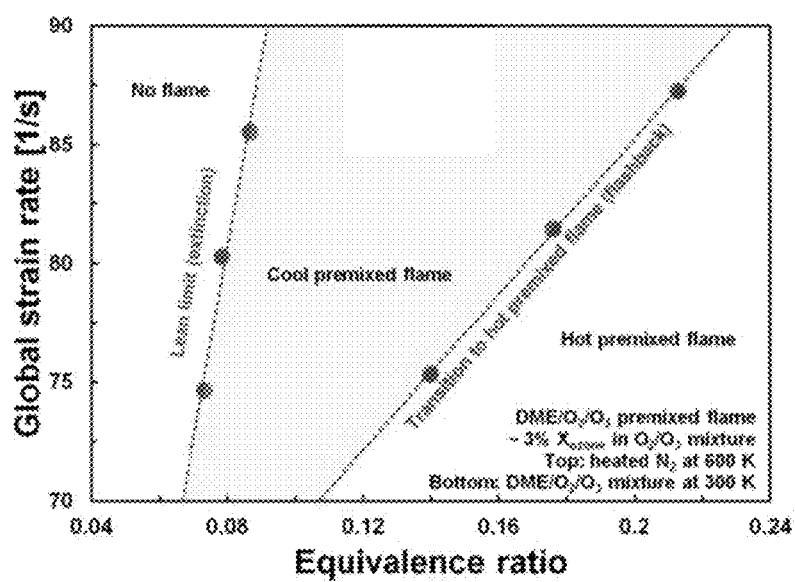
FIG. 16 is a graph illustrating the DME/O$_2$/O$_3$ premixture in a counterflow configuration at 3% ozone added according to an exemplary embodiment of the present disclosure.
Figure 17:
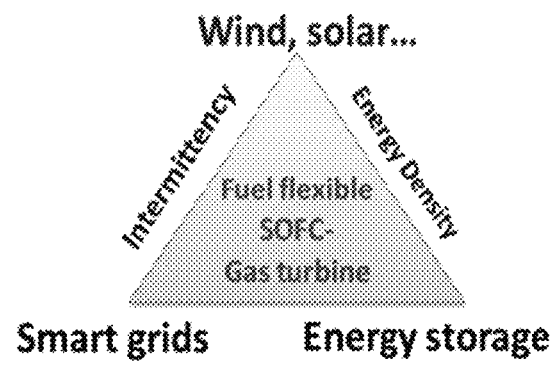
FIG. 17 is a diagram of sustainable electric power triangle.
Figure 18:
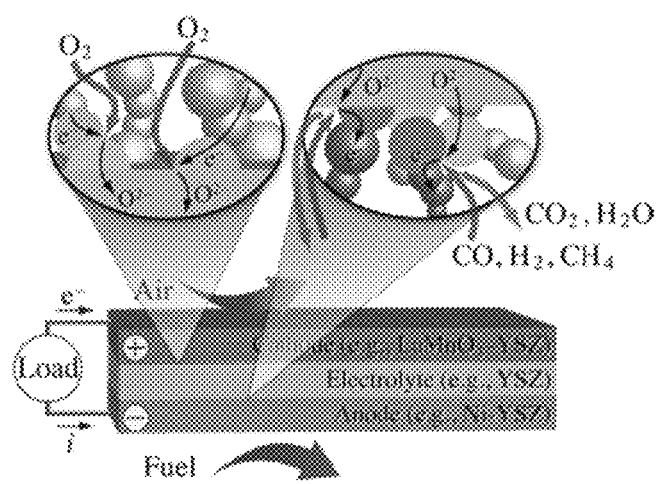
FIG. 18 is a diagram of a planar SOFC.

FIG. 16 shows the experimentally determined regime diagram/graph for a premixed DME flame with approximately 3% ozone added. For example, three distinct regions can be seen in FIG. 16. At extremely low equivalence ratios, no stable flames can exist as the mixture can be beyond the lean flammability limit for the cool flame. This lean limit slightly increases with increasing strain rate. Moving towards slightly richer fuel concentrations can lead to a region of stable cool flames. The width of this region can be fairly sensitive to strain rate, as an increase from about 75 $s^{-1}$ to about 85 $s^{-1}$ almost doubles the range of stable equivalence ratios. Further, when the equivalence ratio can be increased far enough (e.g., or the strain rate can be decreased in certain areas), the flame eventually destabilizes and transitions to a hot flame. The increased flame speed of the hot flame often results in a flashback.

Exemplary Plasma Assisted MILD Combustion

To review the effect of the plasma discharge on the reaction zone at MILD combustion conditions, images comparing the reaction zone with and without plasma were compared. The jets from the center burner and the plasma reactor can be set to the same condition as described above. The conditions of the jets from the center burner and plasma reactor can be 10% $CH_4/N_2$ mixture with velocity of 20 m/s and 3% $CH_4/N_2$ mixture with velocity of 5 m/s, respectively. The preheated oxidizer flow can be set to about 1050 K and its $O_2$ concentration can be about 12%. Due to a weak luminosity from these reaction zones, the exposure time can be set to about 30 s.

Figure 29A:
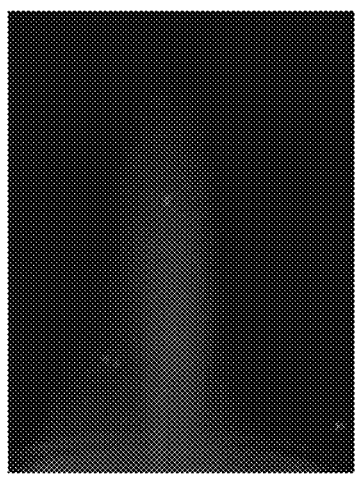
FIG. 29A is an image of MILD combustion without plasma according to an exemplary embodiment of the present disclosure.
Figure 29B:
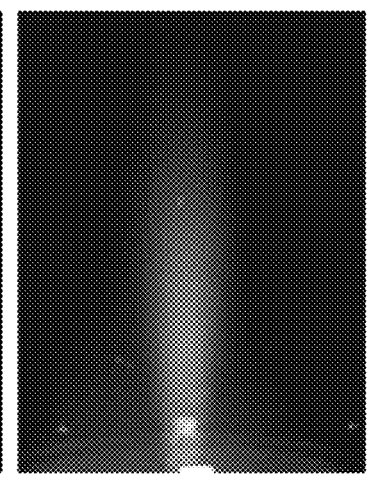
FIG. 29B is an image of plasma assisted MILD combustion according to an exemplary embodiment of the present disclosure.

FIGS. 29A and 29B show the comparison of direct photos exhibiting reaction zones under the MILD combustion (e.g., FIG. 29A) and the plasma assisted MILD combustion (e.g., FIG. 29B) conditions, respectively. The rapid mixing of highly diluted fuel and sufficiently preheated oxidizer streams can form a reaction zone with a significantly weak luminosity. Under the MILD combustion condition, the plasma discharge can change the shapes of the reaction zone. It can reduce the reaction zone length and enlarge its diameter. The plasma discharge can form reactive species, and can locally accelerate gas velocity. This local acceleration can enhance mixing of fuel, oxidizer and the plasma generating reactive species. Although the reactive species amount can be significantly small as compared to the value of fuel, it can decrease ignition delay time substantially. This can shorten the ignition delay time to facilitate the completion of the fuel oxidizing process within the shorter period of time. As a result, the plasma discharge can reduce reaction zone length and enlarge its diameter.

Exemplary Plasma-Assisted MILD Combustion Results

Figure 22:
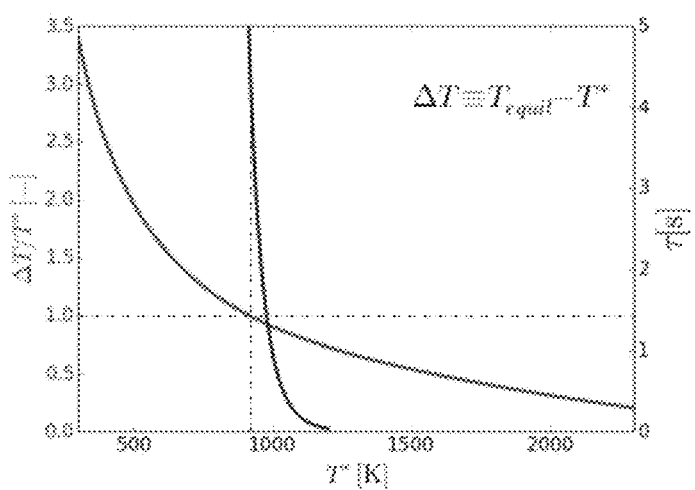
FIG. 22 is a graph illustrating exemplary criteria of MILD combustion according to an exemplary embodiment of the present disclosure.

In order to determine MILD combustion conditions, the two streams (e.g., preheated oxidizer and highly diluted fuel) need to be mixed rapidly. In addition, the equilibrium temperature of the entire mixture, for example, homogenous mixture of the two streams, can be low. To characterize MILD combustion, criterion have been proposed based on the preheated oxidizer temperature (T*) and the temperature increase caused by the chemical reactions ($\Delta T$). (See, e.g., Reference 59). In this exemplary criteria, the ratio between $\Delta T$ and T* can be used, and MILD combustion can occur when this ratio can be smaller than unity. If this ratio can be larger than unity, the heat release rate can be too large, and can lead to a typical diffusion flame. FIG. 22 shows this temperature ratio for T* ranging from about 300 to about 2300 K in the case of 1:3.95:18.9 CH4:O2:N2 mixture. As shown in FIG. 22, $T_{equil}$ denotes the equilibrium temperature. At T*=920 K, the ratio crosses the value of unity when $T_{equil}$ can be about 1836 K. This result can suggest that preheated oxidizer temperature has to be higher than about 920 K to realize MILD combustion.

The exemplary criteria above can be over simplistic. Ignition delay time (τ) of the mixture at T*=920 K can be about 4.33 s, which can be three orders of magnitude larger than those of characteristic fluid dynamics time. MILD combustion can be dominated by the ignition process. Therefore, the chemical and fluid dynamics times have to be in the same order of magnitude. This condition can correspond to a Damköhler number (Da) close to unity. To satisfy this constraint, the preheated gas temperature should be higher than about 920 K. As shown in FIG. 22, τ approaches to the typical fluid dynamics time at around 1137 K. These two criteria can indicate that MILD combustion can be achieved only for a preheated oxidizer temperature above about 1137 K for the aforementioned mixture.

Figure 23:
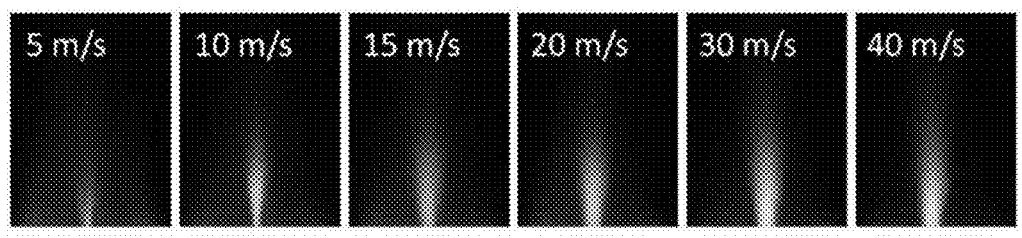
FIG. 23 is a set of exemplary images of direct reactions of MILD combustion without plasma according to an exemplary embodiment of the present disclosure.

The exemplary criterion based on the balance between fluid dynamics and chemical times can be tested using the exemplary apparatus. In order to evaluate the influence of the rapid mixing in the co-axial configuration, the main jet velocity was varied from about 5 to about 40 m/s while all other parameters were fixed. The preheated oxidizer contained about 6% O2 (e.g., equivalence ratio of unburned mixture was about 0.75) and the gas velocity at the preheat burner was set to about 1.9 m/s. The measured gas temperature near the center jet was about 1050 K. The jet velocity of the plasma reactor was fixed to about 5 m/s. To emphasize the influence of the preheating and the rapid mixing, pure air has been used for the plasma reactor. FIG. 23 shows exemplary photos captured from the side for various center jet velocities. The luminosity from these reaction zones can be extremely weak, and needed the use of significantly long exposure time (e.g., about 10 s) to be unambiguously visualized.

The weak luminosity can be a result of a wide reaction zone. This can indicate sufficient mixing of the fuel and oxidizer streams. When fuel supply to the preheating burner is discontinued (e.g., only air and $O_2$ flows remains to maintain the flow field), preheating temperature drops down, and all reaction zones are blown off. This blowing off indicates that the mixture cannot be auto-ignited without the assistance of the preheating. These results indicate that the tested conditions are under the MILD combustion condition.

Exemplary Plasma Rector

The plasma discharge can change the mixture compositions dramatically. Different plasma pulse energy and repetition frequencies can affect the gas reformation process in different ways. (See, e.g., Reference 65). The resulting reformed gas mixture has different properties, such as equilibrium temperatures and ignition delay times, than the original gas mixture. However, using the same set parameters for plasma discharge, the variation of the mixture composition can be minimized. Thus, by measuring the mixture composition the equilibrium temperature and ignition delay time of the mixture can be predicted while the plasma setting can remain unchanged.

Figure 21A:
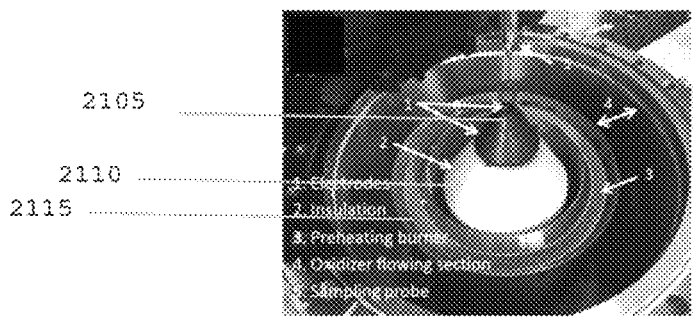
FIG. 21A is an image of a Plasma assisted MILD combustion burner inside a quartz tube according to an exemplary embodiment of the present disclosure.
Figure 21B:
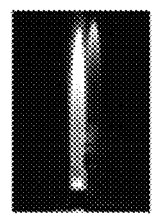
FIG. 21B is an image of a side view of a diffusion flame with plasma through the quartz tube according to an exemplary embodiment of the present disclosure.
Figure 21C:
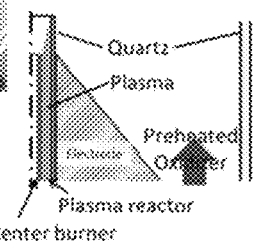
FIG. 21C is a diagram of burner tip cross-section according to an exemplary embodiment of the present disclosure.

The effect of plasma discharge on the reformed mixture composition can be measured using gas chromatography. A 3% $CH_4$/air mixture with a jet velocity of about 5 m/s can be flown through the plasma reactor section while all other gas supplies are turned off. The gas samples can be collected along the center axis. To prevent air entrainment, the sample locations can be radially constrained within the inside of the quartz tube. (See e.g., FIGS. 21A and 21B). Two sampling locations at z=7.5 and z=15.1 mm downstream of the exit of the reactor section were adopted, corresponding to two different residence times separated by approximately 10 ms.

Figure 24:
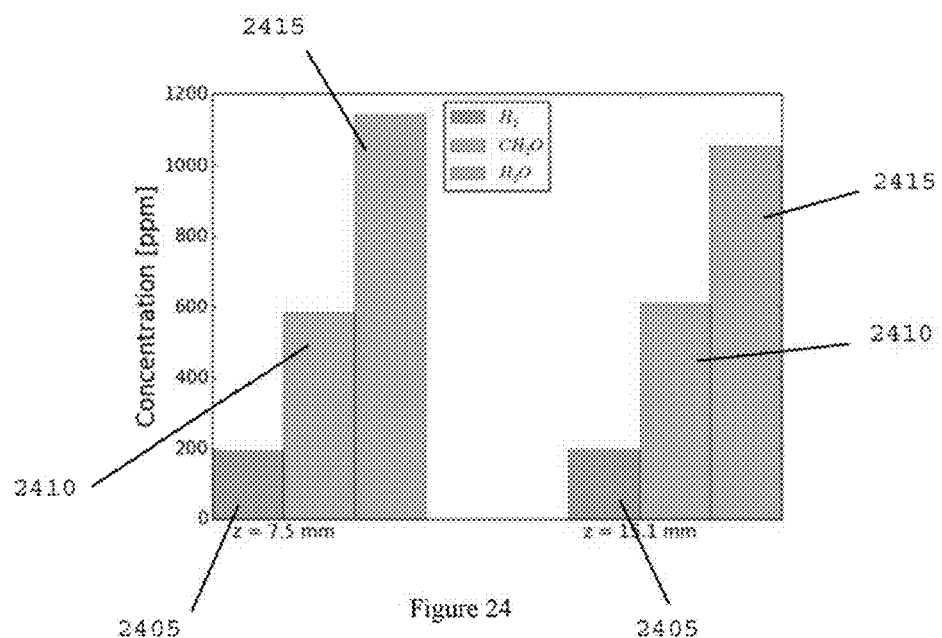
FIG. 24 is a chart illustrating gas composition according to an exemplary embodiment of the present disclosure.

FIG. 24 shows an exemplary plot of the selected major species from the collected gas samples. A large amount of reactive species such as hydrogen (e.g., $H_2$ element 2405), formaldehyde (e.g., $CH_2O$ element 2410), and water (e.g., $H_2O$ element 2415) are measured. The gas compositions did not change significantly within the two locations. This observation can be explained by the extremely short life time of the plasma excited species. Although the plasma can generate a tremendous variety of excited species, the mixture passing through the plasma discharge can reach the equilibrium state almost immediately. (See, e.g., Reference 70).

Figure 25:
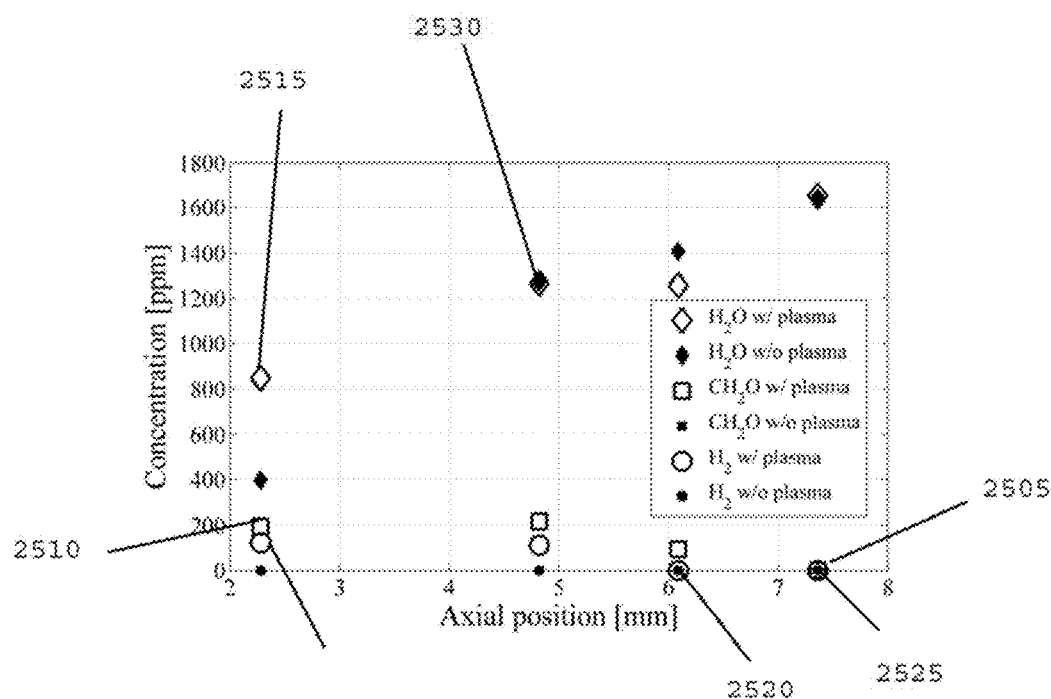
FIG. 25 is a graph illustrating radial species profile at z=27.8 mm according to an exemplary embodiment of the present disclosure.

To determine the interaction between the jet from center burner, and the reformed gas from the plasma reactor, the main center fuel jet can be resumed, and the radial distribution of the gas composition can be measured at z=27.8 mm. The flow condition in the plasma reactor can remain the same as above, but the center jet can be set to about 20 m/s and a about 10% CH4/N2 mixture can be used. FIG. 25 shows a comparison for the selected species (e.g., $H_2$, element 2505, $CH_2O$, element 2510, and $H_2O$, element 2515) with plasma and (e.g., $H_2$, element 2520, $CH_2O$, element 2525, and $H_2O$, element 2530) without plasma. The reactive species generated by the plasma discharge are mixed with the center jet and the surrounding air. The reformed gas quickly supplies the mixing zone with the reactive intermediates. Until near the quartz tube outer wall (e.g., r=4.5 mm), the reactive species have nearly uniform radial profiles. At 5<r<7 mm, the decay of these reactive species can be seen. This decay can indicate the location of the mixing zone. Thus, the potential core regime can locate until r=4.5 mm, and the mixing process can be denominated by mass diffusion. Therefore, the intermediate species exhibits nearly uniform profile within this regime. The $H_2O$ profile shows a good agreement with the location of the mixing zone. The $H_2O$ profile exhibits an asymptotic distribution reaching toward to concentration of $H_2O$ in surrounding/room air in the mixing zone from the center region. There can be a significant difference near the center region (e.g., r=2.28 mm). However, this difference can be due to the $H_2O$-production caused by the plasma discharge. The non-zero value without plasma discharge demonstrates the $H_2O$ diffusion from ambient is shown in FIG. 25.

Figure 26:
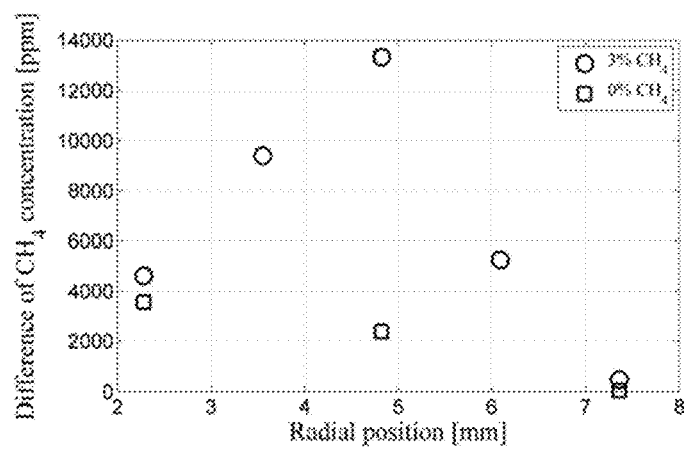
FIG. 26 is a graph illustrating an experimentally determined radial profile of difference of CH$_4$ concentrations with and without plasma discharge at z=27.8 mm according to an exemplary embodiment of the present disclosure.

In order to understand the mixing zone in detail, difference in $CH_4$ concentrations at z=27.8 mm, with and without plasma discharges, can be compared. The tested condition for the center burner remains the same as above, but two mixtures, about 3% $CH_4$-air mixture and pure air (e.g., 0% CH4), can be used for the plasma reactor with the same jet velocity, about 5 m/s. FIG. 26 shows $CH_4$ concentrations difference which result in the influence of plasma discharges on the concentrations. A positive value illustrated in FIG. 26 shows a higher $CH_4$ concentration with plasma discharges than those without plasma discharge. These results demonstrate a broaden $CH_4$ distribution in radial direction with plasma discharges. This influence of plasma discharge on the $CH_4$ profile can be interpreted by the understanding of plasma actuators. Nanosecond pulsed discharges can generate a hot gas spot in the discharge and can induce a flow. (See, e.g., Reference 76). They can focus number of pulses accumulated in the hot spot, and it can be shown that even a small number of pulses (e.g., about 10 pulses) can form a significant size of a hot spot to generate a strong density gradient near the dielectric wall where plasma discharges were formed.

According to the exemplary cool plasma flame process, plasma discharges can be formed at the plasma reactor section. (See e.g., FIG. 21B). A portion of plasma discharge can be at the inside of quart tube and downstream of the center burner tip. Thus, the plasma discharges can be at a concaved shape section downstream of center burner. The residence time of the mixture within this concaved section can be about 20 ms. Within this duration, the flowing mixtures from plasma reactor have at least about 20 pulses of plasma discharges. Note that plasma discharge may not be formed at the center part downstream of center jet. Therefore, a hot spot may only be formed near the quartz wall and the gas can be accelerated due to a significantly large temperature gradient generated by the plasma discharge. In contrast, the axial velocity near the interface between the center jet and the flowing gases from the plasma reactor can be decelerated because the mass flow rate was kept constant.

Figure 27:
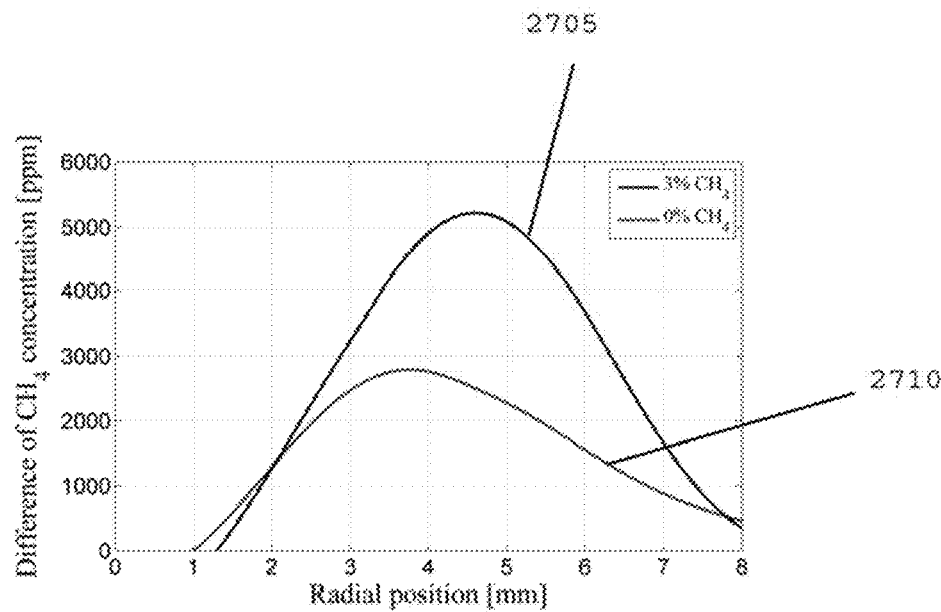
FIG. 27 is a graph illustrating a numerically determined radial profile of difference of CH$_4$ concentrations with and without plasma discharge at z=27.8 mm which corresponds to experiments shown in FIG. 26 according to an exemplary embodiment of the present disclosure.

In order to determine the influence of the accelerated flow near the wall on the $CH_4$ profiles downstream, a simple estimate on the boundary condition for the simulations were applied and compared with a cold flow case at z=27.8 mm. The estimated boundary can be a linearly distributed velocity profile, maximum value at the quartz wall (e.g., r=3.5 mm) and the maximum value at outer wall of center burner (e.g., r=1.58 mm). The boundary condition with cold flow calculation can be a fully developed velocity profile at the exit of plasma reactor section. Velocity profile at the center burner exit can be set to parabolic. For consistency, mass flow rate are kept constant. FIG. 27 shows the numerically determined corresponding profiles shown in FIG. 26, (e.g., 3%, line 2705 and 0%, line 2710). Although there can be a factor of two difference in experimentally and numerically determined values at the each peak, this result show a qualitatively good agreement under the tested conditions. In addition, it can also indicate that the applied estimation on the boundary condition can correctly simulate the influence of plasma discharge. This exemplary result can confirm that the mixing in the quartz tube section and downstream of center jet can be significantly enhanced by the plasma discharges. Thus, the formed recirculation zone in this section can broaden the center jet in radial direction. In addition, accelerated gas near the quartz wall can induce fast development of the shear layer between the entire jet, center burner and plasma reactor, and surrounding oxidizer. Therefore, plasma discharge can act as two major roles for the enhancement MILD combustion. One can be to generate reactive species which can have a strong impact on the ignition process. And the other role can be to enhance mixing by inducing a flow by generating a hot spot.

To quantify the influence of the reforming gas, and by extension of the plasma discharge, on the chemical time scale, atmospheric ignition delay times can be calculated. The measured concentrations of $H_2$, $H_2O$ and $CH_2O$ can be taken into account, and can be added to the initial gas composition. The preheating temperature T* can be varied within the range from about 900 to about 1050 K. FIG. 26 further shows the change of ignition delay time with and without plasma discharge. By adding the $H_2$, $H_2O$ and $CH_2O$, the ignition delay time can decrease dramatically by a factor ten. This shortening ignition delay time can be compared with experimentally determined values. (See, e.g., References 64 and 75). MILD combustion can be realized when Da can approach unity. Under the tested conditions (e.g., about 3% $CH_4$/air mixture and about 10% $CH_4/N_2$ mixtures with plasma) and assuming the fluid dynamical time scale of about 0.1 s, Da can become close to unity at preheated temperatures of about 994 and about 1137 K with and without plasma, respectively. This exemplary result can indicate that chemical time scale can be manipulated at the same preheating temperature by applying plasma discharge in order to achieve MILD combustion. In addition, this exemplary result can further indicate that influence of plasma discharge on the MILD combustion can be estimated by measuring reformed gas. This reformed gas can provide consistency in the boundary condition for the advanced simulations/modeling.

Figure 28:
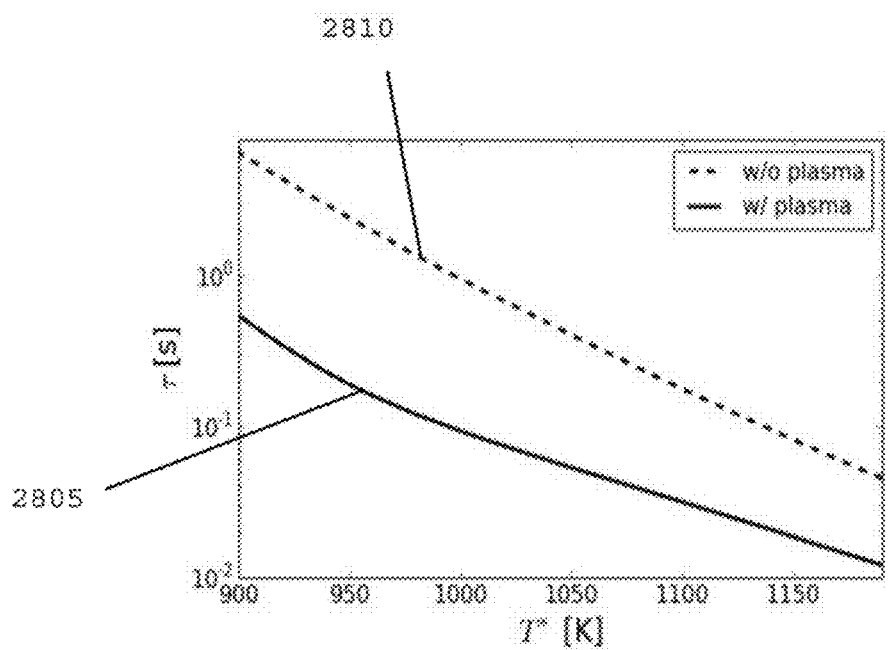
FIG. 28 is a graph illustrating ignition delay time, $\tau$, with and without plasma discharge according to an exemplary embodiment of the present disclosure.
Figure 30A:
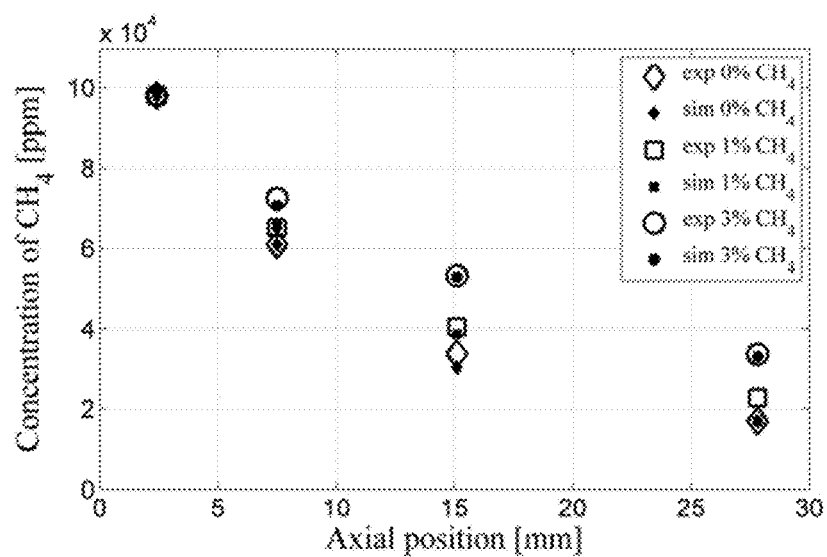
FIGS. 30A and 30B are graphs illustrating experimentally and numerically determined CH$_4$ profile in axial and radial direction according to an exemplary embodiment of the present disclosure.
Figure 30B:
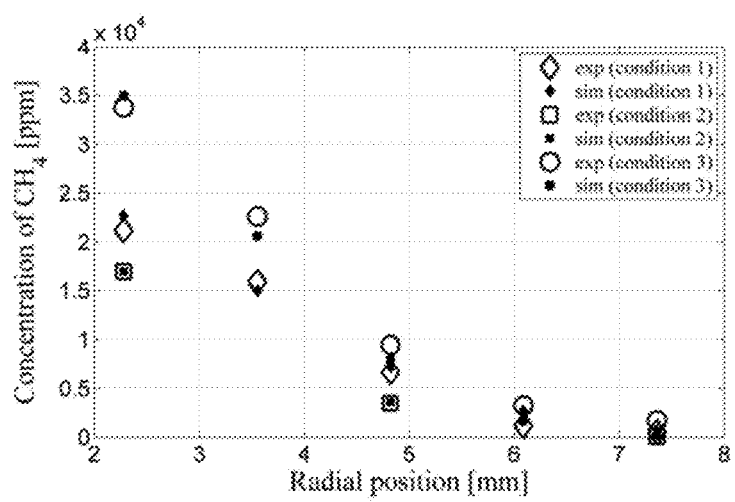

FIG. 28 illustrates an ignition delay time, with (e.g., line 2805) and without (e.g., line 2810) plasma discharge. FIGS. 29A and 29B illustrate a comparison of MILD combustion without plasma (see FIG. 29A) and plasma assisted MILD combustion (see FIG. 29B). FIG. 30 illustrates a comparison of experimentally and numerically determined $CH_4$ profiles in axial and radial direction Exemplary Formulation of Exemplary Mixture-Averaged Model The exemplary model described herein below can be used with the exemplary cool flame process/apparatus. This exemplary model can be used with other exemplary processes and apparatuses.

The Wilke formula (see, e.g., Reference 93 and 95) for mixture-averaged viscosity, η, can be given by, for example:

$$\eta = \sum_{k=1}^{K} \frac{X_k \eta_k}{\sum_{j=1}^{K} X_j \Phi_{kj}} \quad (1)$$

$$\Phi_{kj} = \frac{1}{\sqrt{8}} \left(1 + \frac{w_k}{w_j}\right)^{-\frac{1}{2}} \left(1 + \left(\frac{\eta_k}{\eta_j}\right)^{\frac{1}{2}} \left(\frac{w_j}{w_k}\right)^{\frac{1}{4}}\right)^2$$

where K can be the total number of species, and Xk, ηk and wk can be the molar fraction, single component viscosity and molecular weight of the k-th species, respectively.

The mixture-averaged thermal conductivity, λ, can be given by the combination averaging formula. (See, e.g., Reference 94). Thus, for example:

$$\lambda = \frac{1}{2}\left(\sum_{k=1}^{K} X_k \lambda_k + \frac{1}{\sum_{k=1}^{K} X_k / \lambda_k}\right), \quad (2)$$

where λk can be the pure species thermal conductivity of the k-th species.

The mixture-averaged diffusion coefficient, Dkm, for species k diffuse into species m can be computed as, for example:

$$D_{km} = \frac{1 - Y_k}{\sum_{j \neq k}^{K} X_j / D_{jk}} \quad (3)$$

where Djk can be the binary diffusion coefficient between j-th species and k-th species.

Once the single component viscosity is known, the pure species thermal conductivity, and the binary diffusion coefficient and the mixture-averaged diffusion coefficient can be constructed according to the molecular weights and the molar fractions.

The single component viscosities, the pure species conductivities and the binary diffusion coefficients can be computed from the standard kinetic theory expression. (See, e.g., Reference 89). However, it can be difficult to implement them in simulation due to the complex expressions for the properties and the appearance of the intermolecular collision areas, the collision integrals, the Lennard-Jones potential well depths, the dipole moments. Therefore, in numerical modeling, such as the CHEMKIN (see, e.g., Reference 98) and TRANSPORT (see, e.g., Reference 99) programs, the pure species viscosity, conductivity and the binary diffusion coefficient can usually be computed by a polynomial fit of the logarithm of the property versus the logarithm of the temperature. (See, e.g., Reference 99).

For the single component viscosity $\eta k$:

$$\ln \eta_k = \sum_{n=1}^{N} a_{n,k} (\ln T)^{n-1} \quad (4)$$

and the pure species thermal conductivity $\lambda k$:

$$\ln \lambda_k = \sum_{n=1}^{N} b_{n,k} (\ln T)^{n-1} \quad (5)$$

For each pair of binary diffusion coefficients Djk:

$$\ln D_{jk} = \sum_{n=1}^{N} d_{n,jk} (\ln T)^{n-1} \quad (6)$$

Usually, the third-order polynomial fits can be applied as, for example, N=4. All the coefficients $a_{n,k}$, $b_{n,k}$ and $e_{n,jk}$ can be pre-generated and stored before calculations.

Exemplary Correlated Dynamic Adaptive Chemistry and Transport (CO-DACT) Method

In the mixture-averaged model, the transport properties can be fitted and constructed according to Eqs. (1) to (6) at each computational cell and every time steps. However, this is very computationally inefficient. In a large scale numerical simulation, the calculations of the transport properties and the reduction of kinetic mechanism can be correlated in time and space. For example, in an unsteady premixed flame system, all the cells far before or after the flame can have similar reaction transport properties and reaction pathways due to the similarity of their thermodynamic states. Similarly, in some computational cells, the reaction pathways and the transport properties in the current time step can be similar to those in the previous time step. Therefore, only one calculation in transport properties and model reduction can be needed for all the correlated cells instead of calculating the transport properties and conducting kinetic model reduction at each cell and each time step.

Figure 31:
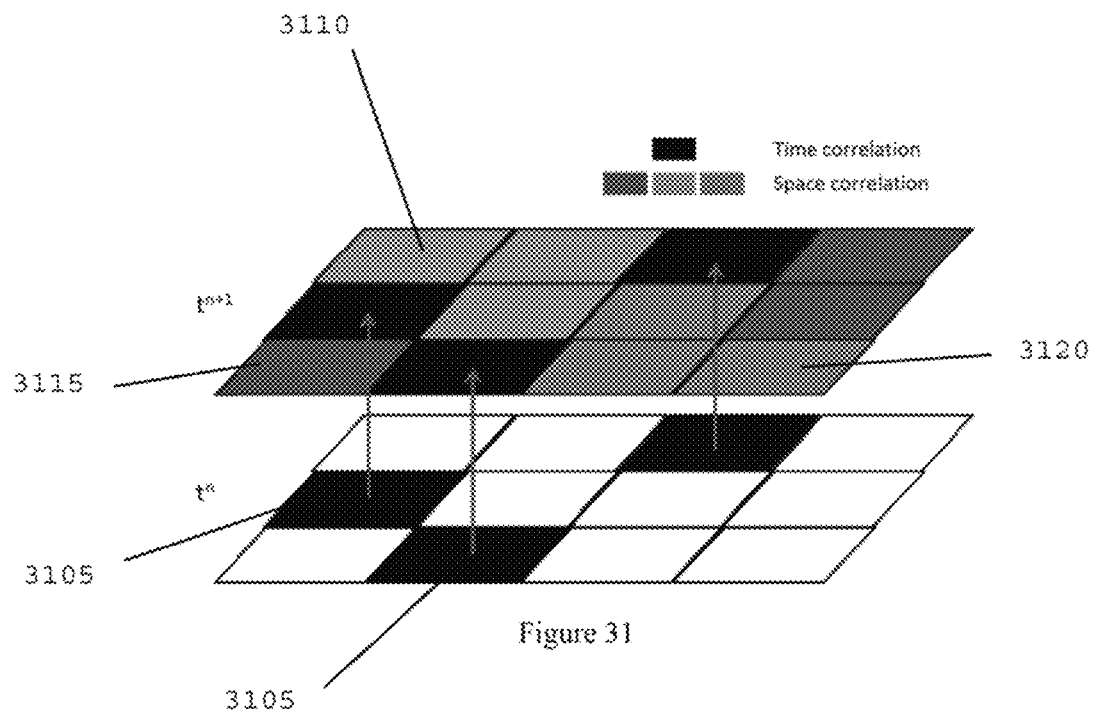
FIG. 31 is a diagram of time and space correlations in chemistry and transport.

The exemplary CO-DACT method can be based on that a phase space can be constructed by a few key parameters which can dominate the transport properties, and computational cells can be agglomerated into time and space correlated groups in that phase space by a user specified threshold value $\epsilon$. Then the diffusion coefficients, in phase space for each correlated groups to avoid redundant calculations, can be calculated. This is schematically shown in FIG. 31. For example, the time correlation can be examined and applied firstly (e.g., cells 3105). If the variation of local thermodynamic conditions (e.g., various parameters) can be small, the same cell at different time steps can be considered in a same time correlated group and the transport properties and/or the reduced kinetic model at time step n can be directly passed to time step n+1. For the rest of the cells at time step n+1, the space correlation can be applied. After the cells with similar thermodynamic conditions can be gathered as space correlated groups (e.g., cells 3110, 3115 and 3120), the mixture-averaged diffusion model can be applied to conduct the transport properties for each group, and the multi-generation path flux analysis PFA procedure can be used to generate reduced kinetic model.

An exemplary factor of the exemplary CO-DACT process can be or include the selection of the phase parameters. According to Eqs. (4)-(6), the single component viscosity, the pure species conductivity, the binary diffusivity and the reaction pathways can be a function of temperature. Thus, the exemplary temperature can be one of the phase parameters. From Eqs. (1)-(3), the mixture-averaged diffusion coefficients can be formulated by the combinations of molar fractions and the pure species transport properties. For different species, the higher the molar fraction is the larger the impact can be. Thus, besides temperature, the molar fractions of the first several abundant major species can also be selected as the phase parameters. In most of the combustion system, the summation of the major reactants and productions, including N2, O2, Fuel, H2O, H2, CO2, CH2O, and CO can account for at least about 95% of the molar fraction in total. (See, e.g., Reference 97). For the rest of the species, the maximal total error they can introduce to the mixture-averaged transport properties can be on the same order of about 5%, which can be close to the threshold value of constructing the phase space. Therefore, the temperature and the molar fraction of N2, O2, Fuel, H2O, H2, CO2, CH2O, and CO can be chosen as the phase parameter. Then the distance between a computational cell and the center of a correlated group in phase space can be defined as, for example:

$$d = \begin{pmatrix} |\Delta T/T^0| \\ |\Delta X_{N_2}/X_{N_2}^0| \\ |\Delta X_{O_2}/X_{O_2}^0| \\ |\Delta X_{Fuel}/X_{Fuel}^0| \\ |\Delta X_{H_2O}/X_{H_2O}^0| \\ |\Delta X_{H_2}/X_{H_2}^0| \\ |\Delta X_{CO_2}/X_{CO_2}^0| \\ |\Delta X_{CO}/X_{CO}^0| \end{pmatrix}^{\infty} \quad (7)$$

where T can be the temperature, X can be the molar fraction and the parameters with 0 superscript can be the values at the center of the correlated group. If this distance can be less than the user specified threshold value c, then the cell can be gathered into this correlated group. For kinetic model reduction, a different set of phase parameters, which govern both low and high temperature fuel oxidation, can be used. These parameters include temperature, equivalence ratio, fuel concentration, OH, HO2, H2O2 and CH2O.

Exemplary Numerical Errors of the CO-DACT Method

The numerical errors in the single component viscosity $\eta k$, the pure species thermal conductivity $\lambda k$ and the binary diffusivities Djk may only be introduced by the temperature variation, $\Delta T$. From Eq. (4), it can be demonstrated (e.g., by Taylor expansion) that in one correlated group the maximal variation of $\eta k$ can be, for example:

$$\frac{|\Delta \eta_k|}{\eta_k} = \sum_{n=1}^{4} a_{n,k} (\ln T)^{n-1} \cdot \left(\frac{n-1}{\ln T}\right) \varepsilon + O(\varepsilon^2),$$

where $T$ and $\eta k$ can be the values at the center of the correlated group. Because $n \leq 4$, for example, $n-1 \leq 3$, thus, for example:

$$\frac{|\Delta \eta_k|}{\eta_k} \leq \frac{3|\ln \eta_k|}{\ln T} \cdot \varepsilon + O(\varepsilon^2).$$

In general combustion systems, $T \sim 1000K$, $\eta k \sim 5E\text{-}4 g/cm*s$, $$\therefore \frac{3|\ln \eta_k|}{\ln T} \sim O(1), \quad (8)$$

$$\therefore \frac{|\Delta \eta_k|}{\eta_k} \sim O(\varepsilon)$$

In the polynomial fittings, lower order terms can dominate the total values, for example, $|a1,|>|a2,k|>|a3,k|>|a4,k|$ in general cases. For $a1,k$, $(n-1)=0$ and for $a2,k$, $(n-1)=1$. Therefore, in detailed calculations, it can be true for all the species that, for example:

$$\frac{|\Delta \eta_k|/\eta_k}{\varepsilon} << \frac{3|\ln \eta_k|}{\ln T}$$

A similar analysis can be applied for pure species thermal conductivity $\lambda k$ and the binary diffusivities $Djk$ and the maximal variations in one correlated group can be obtained as, for example:

$$\frac{|\Delta \lambda_k|}{\lambda_k} \sim O(\varepsilon) \quad (9)$$

$$\frac{|\Delta D_{jk}|}{D_{jk}} \sim O(\varepsilon) \quad (10)$$

Thus, the detailed pure species transport properties can be first order accurate in the exemplary CO-DACT method. Then they can be used to construct the mixture-averaged diffusion coefficients.

From Eq. (2), the mixture-averaged heat conductivity $\lambda'$ can deviate from the value at the center of the correlated group, $\lambda$, as, for example:

$$\lambda' = \frac{1}{2}\left(\sum_{k=1}^{K} X_k(1+\delta_k^X)\lambda_k(1+\delta_k^\lambda) + \frac{1}{\sum_{k=1}^{K} X_k(1+\delta_k^X)/\lambda_k(1+\delta_k^\lambda)}\right)$$

where $X_k$ and $\lambda_k$ can be the value at the center of the correlated group and the $\delta_k^X$ and $\delta_k^\lambda$ can be the variation of $X_k$ and $\lambda_k$ between the computational cell and the center of the correlated group. So, for example:

$$\lambda = \frac{1}{2}\left(\sum_{k=1}^{K} X_k \lambda_k + \frac{1}{\sum_{k=1}^{K} X_k/\lambda_k}\right)$$

Thus, $|\delta| \leq \varepsilon$ from Taylor expansion, can be, for example:

$$\lambda \cdot (1 - 2\varepsilon + O(\varepsilon^2)) \leq \lambda' \leq \lambda \cdot (1 + 2\varepsilon + O(\varepsilon^2)) \quad (11)$$

$$\therefore \frac{|\Delta \lambda|}{\lambda} \leq 2\varepsilon \sim O(\varepsilon)$$

Based on the similar analysis for viscosity and mass diffusivity:

$$\frac{|\Delta \eta|}{\eta} \sim O(\varepsilon) \quad (12)$$

$$\frac{|\Delta D_{km}|}{D_{km}} \sim O(\varepsilon) \quad (13)$$

Therefore, it can be shown that the exemplary CO-DACT process can be first order accurate and the errors in diffusion coefficients can be in the same order of the threshold value for constructing the phase space. Unless specified, the threshold value $\varepsilon$ is 5%.

Exemplary Numerical implementation

The exemplary CO-DACT process can be implemented into the adaptive simulation of unsteady reactive flow (e.g., ASURF+) code (88, 100 and 101) to simulate compressible, unsteady reactive flows. ASURF+ can be an updated version of ASURF (100) with a higher-order numerical scheme, and integrated with the exemplary CO-DAC process to utilize the on the fly chemical reductions and conducts multi-level local grid adaption to resolve the reaction zone and flame front. In exemplary simulations, the base grid size can be chosen as about 0.5 mm and maximal grid level can be about 5, which can result in the minimum grid size of about 15 μm.

Further Exemplary Results and Discussion

In order to validate the exemplary process, and test its performance, the exemplary CO-DACT process will be compared with the original mixture-averaged diffusion model to examine the computational accuracy and efficiency. Exemplary numerical simulations of a premixed spherical propagating flame and a 1D diffusion flame can be conducted, covering premixed and non-premixed, and stretched and unstretched conditions. A comprehensively reduced n-heptane mechanism (see, e.g., Reference 78) with 170 species and 962 reactions will be used in these simulations.

Exemplary Premixed Outwardly Propagating Spherical Flames

Figure 32:
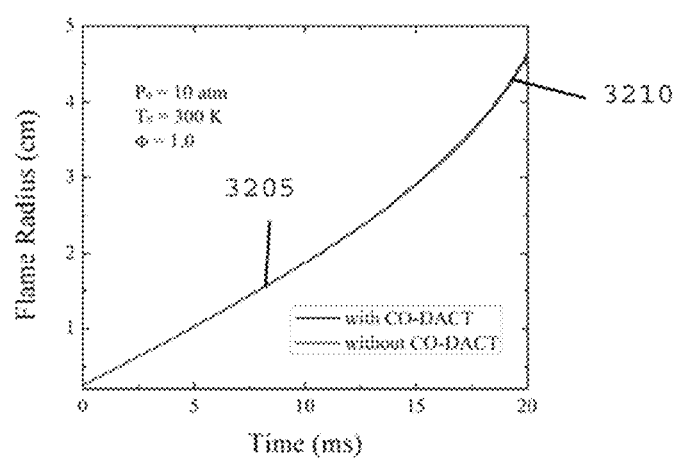
FIG. 32 is a graph illustrating flame trajectories of stoichiometric reduced n-heptane/air mixture at 10 atmosphere and 300 K according to an exemplary embodiment of the present disclosure.

The premixed spherical flame can be ignited at the center of the domain by a hot spot with about 2000 K and about a 2 mm radius. For example, the initial temperature, pressure and equivalence ratio of the homogeneous n-heptane/air mixture can be about 300 K, 10 atmosphere and 1.0, respectively. The domain size can be about 5 cm with transmissive outer boundary condition. FIG. 32 shows a graph of the time-dependent outwardly propagating spherical flame trajectories calculated by ASURF process with (e.g., element 3205) and without (e.g., element 3210) CO-DACT. It can be seen in FIG. 32 that the exemplary CO-DACT process shows an appropriate agreement compared with the original mixture-averaged model. The largest relative error in flame trajectory can be less than about 0.5%, which can be far below the experimental accuracy of flame speed measurements. (See, e.g., Reference 104).

Figure 33A:
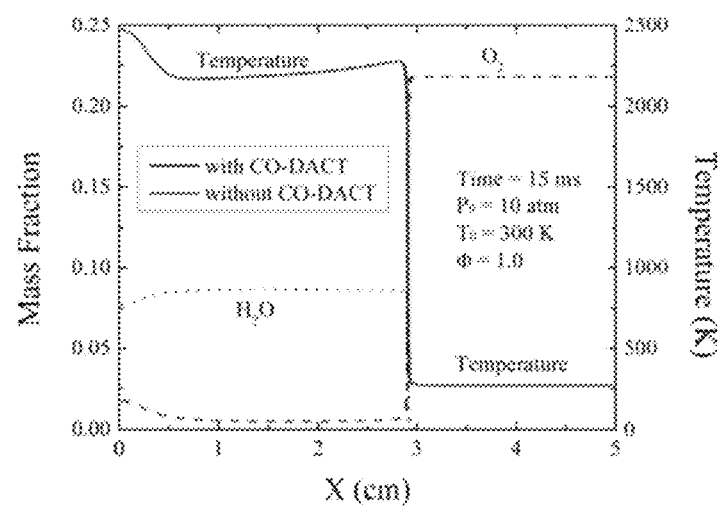
FIGS. 33A and 33B are graphs illustrating distributions of temperature and major species (O$_2$ and H$_2$O) in the stoichiometric reduced n-heptane/air mixture initiated at 10 atmosphere and 300 K according to an exemplary embodiment of the present disclosure.
Figure 33B:
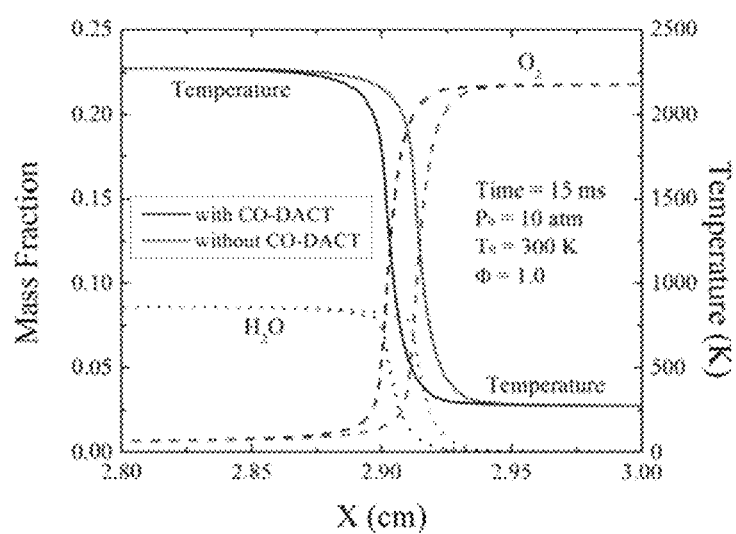

FIG. 33A shows a graph of the predicted flame structure of the temperature and major species of the spherical flame at physical time t=15 ms. The distributions of temperature and major species O2 and H$_2$O can be calculated and compared with and without the exemplary CO-DACT process. The flame can be located around the location X=2.9 cm. It can be seen that the exemplary CO-DACT process can be accurate. FIG. 33B shows an enlarged plot of the same flame structure as FIG. 33A around the flame surface (e.g., from about 2.8 cm to about 3.0 cm). As shown in FIG. 33B, the distributions of the temperature and species profiles calculated by different methods with and without CO-DACT can be identical except a horizontal shift in space. The value of the maximal shift can be about 0.023 cm. Compared with the flame surface location, X=2.9 cm, the relative error in space can be only about 0.8%. The excellent agreement demonstrates that the exemplary CO-DACT process can be sufficient to capture the major properties, including temperature and major species, of the flame.

Figure 34A:
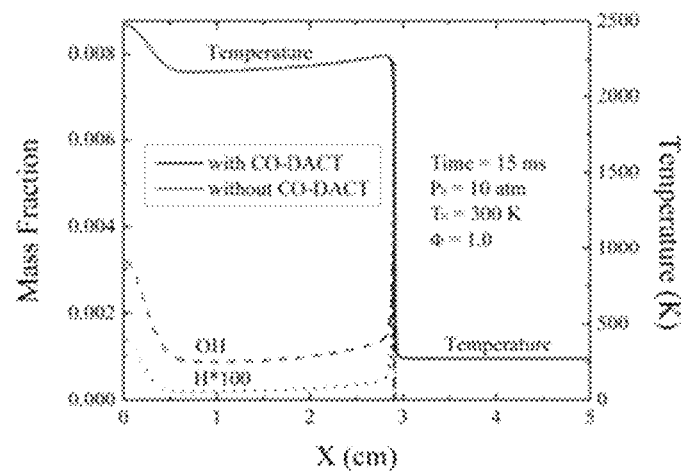
FIG. 34A is a graph illustrating distributions of temperature and minor radicals (e.g., OH and H) in the stoichiometric reduced n-heptane/air mixture initiated at 10 atmosphere and 300 K according to an exemplary embodiment of the present disclosure.
Figure 34B:
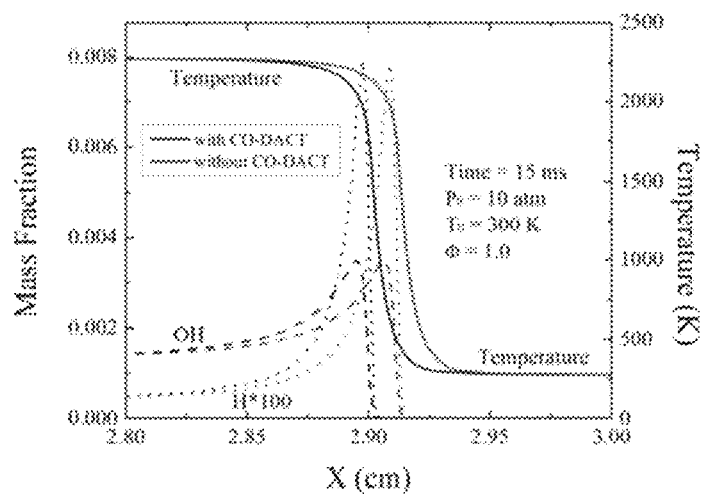
FIG. 34B is a graph illustrating temperature and minor radicals' distributions around the flame surface according to an exemplary embodiment of the present disclosure.

In order to demonstrate the ability of the exemplary CO-DACT process to predicting the minor radicals which may not be included in the phase parameters, FIG. 34A shows the distribution of the radicals OH and H of the spherical flame at the same physical time t=15 ms. Similarly, FIG. 34B shows the enlarged graph of FIG. 34A around the flame surface, and illustrates that the minor radicals can also be predicted accurately by the CO-DACT process even if they may not be in the phase parameters. They can follow the same accuracy and same space shift of the major species. Therefore, the exemplary CO-DACT process can be used to capture the detailed flame structures and predict both the major flame properties and minor radials accurately for the premixed flame. The H radical can be the most diffusive radial in the flame, which can cause the largest diffusivity errors. If the exemplary CO-DACT process can capture H radical accurately, it can predict other radicals accurately as well.

Figure 35:
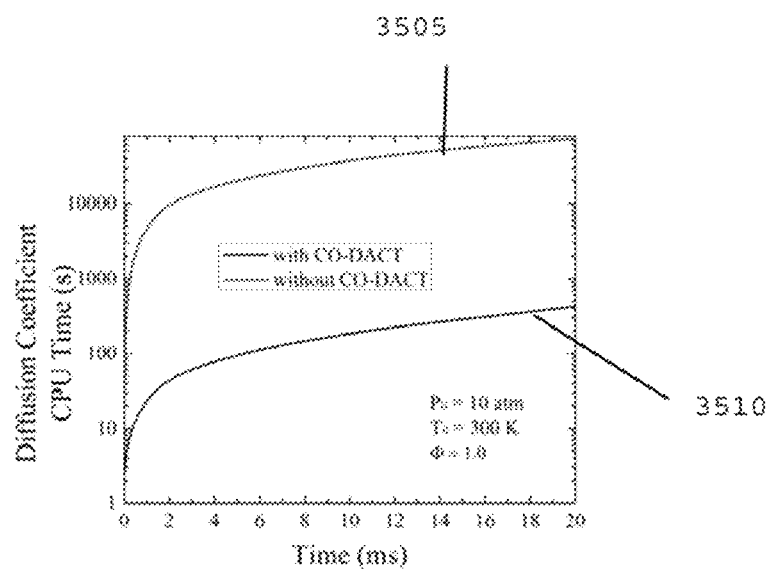
FIG. 35 is a chart illustrating a comparison of CPU time for the diffusion coefficients between methods with and without CO-DACT of stoichiometric reduced n-heptane/air mixture at 10 atmosphere and 300 K according to an exemplary embodiment of the present disclosure.
Figure 36:
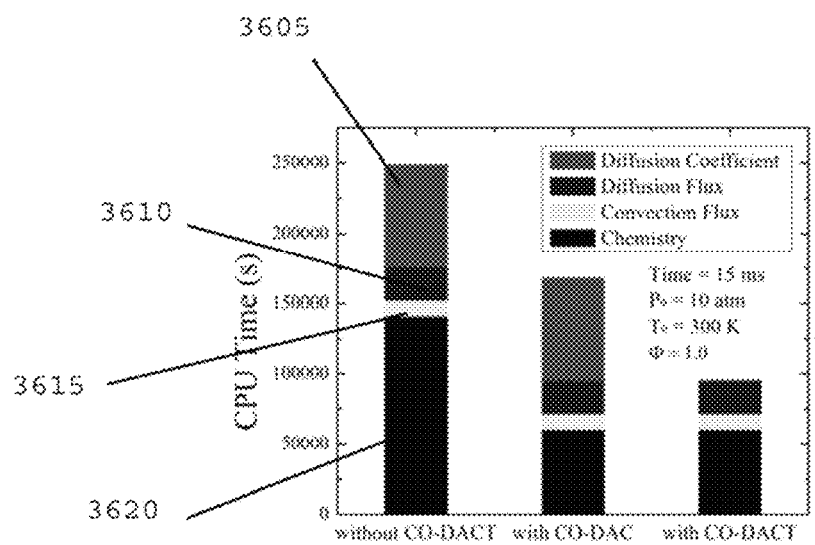
FIG. 36 is a graph illustrating CPU time comparison between methods without CO-DACT, with CO-DAC and with CO-DACT of stoichiometric reduced n-heptane/air mixture at 10 atmosphere and 300 K according to an exemplary embodiment of the present disclosure.

FIG. 35 shows the comparison of the CPU time for diffusion coefficients during the premixed spherical flame computation between the methods with (e.g., element 3505) and without (e.g., element 3510) CO-DACT. The CPU times are plotted in the logarithm coordinate with the unit of second [s]. According to FIG. 35, the CO-DACT process can be about 175 times faster than the mixture-averaged model, which can be a huge decrease of the computation cost. FIG. 36 shows the total CPU time comparison, including the diffusion coefficients, the diffusion flux, the convection flux and the chemical terms, at physical time t=15 ms. Sections 3605, 3610 and 3615 represent the CPU time for diffusion coefficient, diffusion flux and convection flux, respectively. Section 3620 shows the CPU time for solving the chemical terms. Thus, FIG. 36 illustrates that as compared to the original mixture-averaged model, the exemplary CO-DACT process can dramatically decrease the CPU time for diffusion coefficient and makes it almost negligible even for a large kinetic mechanism involving several hundreds of species. The total computational efficiency can be increased by factor of three by the exemplary CO-DACT process compared with the method without CO-DACT.

Exemplary Diffusion Flames

Figure 37A:
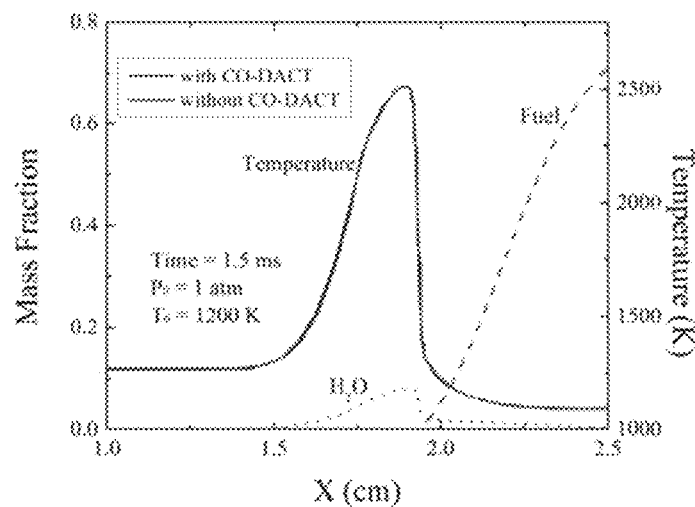
FIG. 37A is a graph illustrating distributions of temperature and major species (e.g., Fuel and $H_2O$) in a 1D diffusion flame initiated at 1 atmosphere according to an exemplary embodiment of the present disclosure.
Figure 37B:
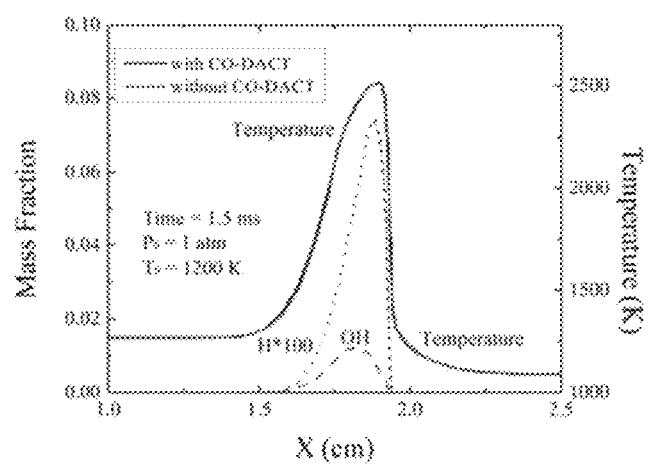
FIG. 37B is a graph illustrating distributions of temperature and minor radicals (e.g., OH and H) in a 1D diffusion flame initiated at 1 atmosphere according to an exemplary embodiment of the present disclosure.

In order to make the exemplary validation more comprehensive, a one-dimensional non-premixed flame can be reviewed to examine the performance of the exemplary CO-DACT process in the diffusion controlled system. In the exemplary 1D diffusion flame configuration, the initial temperature and pressure can be about 1200 K and about 1 atmosphere, respectively. Initially, the left half domain can be pure air and the right half domain can be pure fuel. The domain size can also be about 5 cm and the boundary condition can be reflective. FIG. 37A and 37B show graphs of the distribution of the major species, including fuel and H2O, and minor radicals, including OH and H, at physical time t=1.5 ms, respectively. In addition, the temperature distribution is plotted FIGS. 37A and 37B. For example, the maximal deviation between the methods with and without CO-DACT happened around the location X=1.5 cm on both plots. Further, the maximal relative error in space can be only about 1.1%. These two figures clearly show the excellent agreement between the CO-DACT method and the original mixture-averaged model even when the diffusion terms can be dominating.

Figure 38:
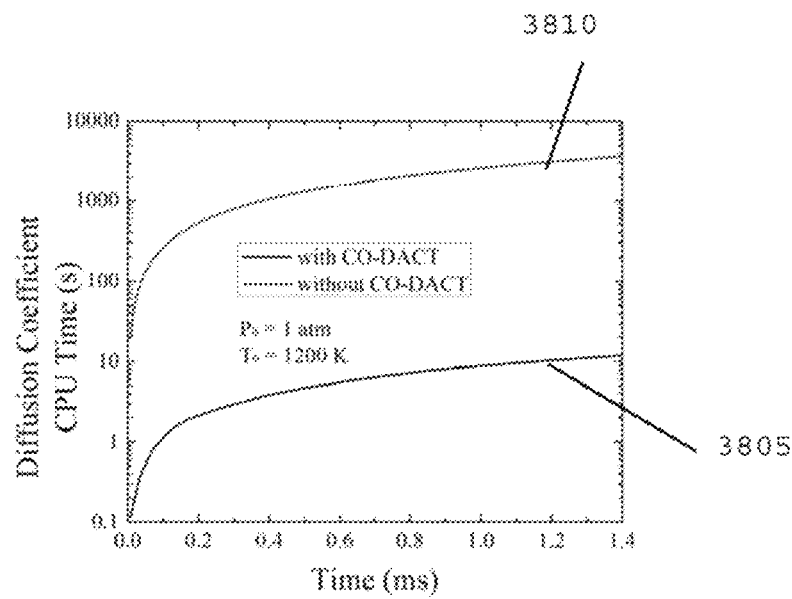
FIG. 38 is a graph illustrating a comparison of CPU time for the diffusion coefficients between methods with and without CO-DACT of a 1D diffusion flame at 1 atmosphere according to an exemplary embodiment of the present disclosure.
Figure 39:
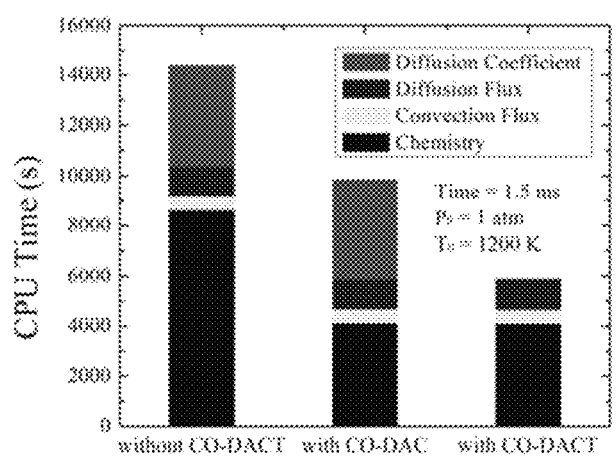
FIG. 39 is a chart illustrating a CPU time comparison between methods without CO-DACT, with CO-DAC and with CO-DACT of a 1D diffusion flame at 1 atmosphere according to an exemplary embodiment of the present disclosure.

FIG. 38 shows the diffusion coefficient CPU time comparison during the 1D diffusion flame calculation. Line 3805 can be computed by the exemplary CO-DACT process and line 3810 can be from the original mixture-averaged model. It can be seen that the exemplary CO-DACT process can be more than about 300 times faster than the mixture-averaged model in this case, which can be more efficient that the diffusion coefficient CPU time comparison in the premixed flame case, shown in FIG. 35. FIG. 39 shows the detailed comparison of the total CPU time at physical time t=1.5 ms, that is similar to FIG. 36, which indicates that the CPU time for diffusion coefficients can be decreased significantly and can become negligible with the exemplary CO-DACT process. As such, compared with the original mixture-averaged model, the exemplary CO-DACT process can dramatically increase computational efficiency without sacrificing accuracy.

Figure 40:
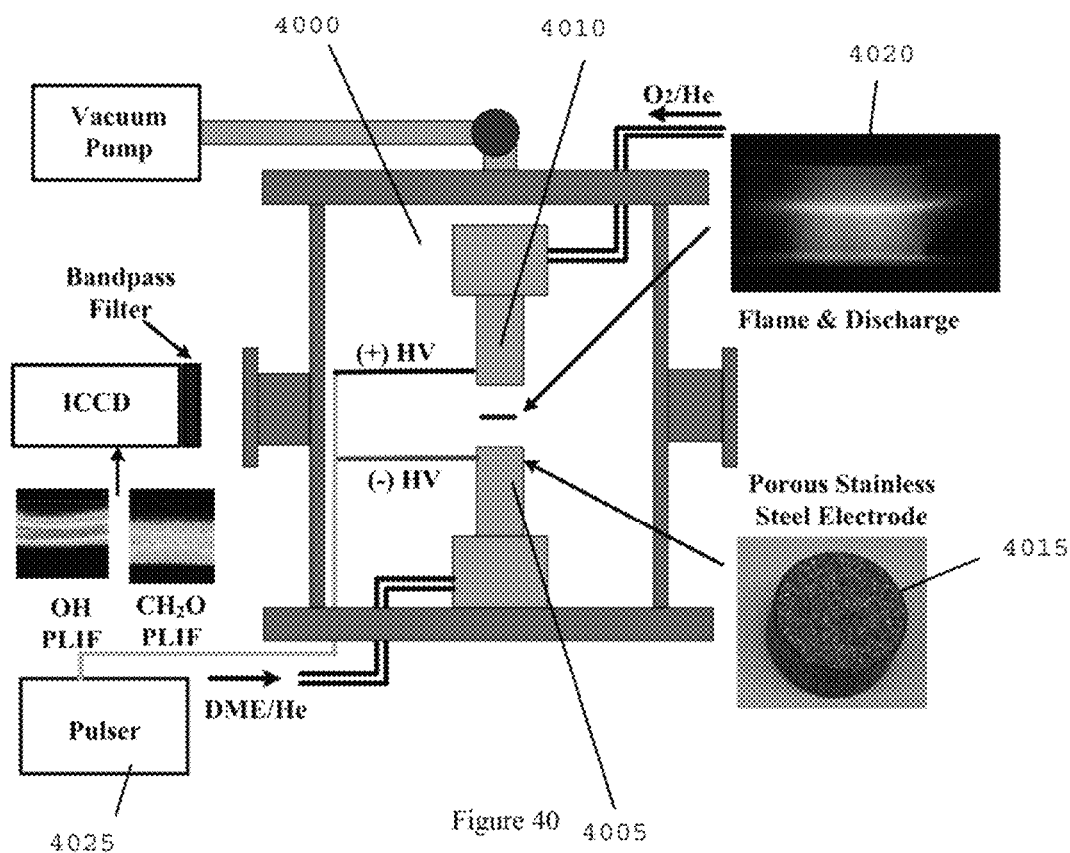
FIG. 40 is a diagram of the exemplary cool flame system/arrangement according to an exemplary embodiment of the present disclosure.

Exemplary Counterflow Flame System with In Situ Nano-Second Pulsed Discharge Experimental Methods and Kinetic Modeling An exemplary diagram of a cool flame system according to an exemplary embodiment of the present disclosure is shown in FIG. 40. For example, a counterflow burner 4000 can be located in a low pressure chamber. Both the fuel nozzle 4005 and the oxidizer nozzle 4010 of the counterflow burner system 4000 can be made of stainless steel with about a 25.4 mm inner diameter. At both fuel and oxidizer nozzle exits, stainless steel porous plugs (e.g., about 2 mm in thickness) can be placed to provide the uniform velocity profiles and to serve as the electrodes 4015. The separation distance of the oxidizer and fuel burner nozzles (e.g., electrodes) can be maintained at about 16 mm. The oxidizer- and fuel-side electrodes can be connected to the positive high voltage and the negative high voltage, respectively. The polarizations of the two electrodes can be fixed. The discharge 4020 can be generated between the two nozzles (e.g., electrodes), as shown in FIG. 40.

Figure 41:
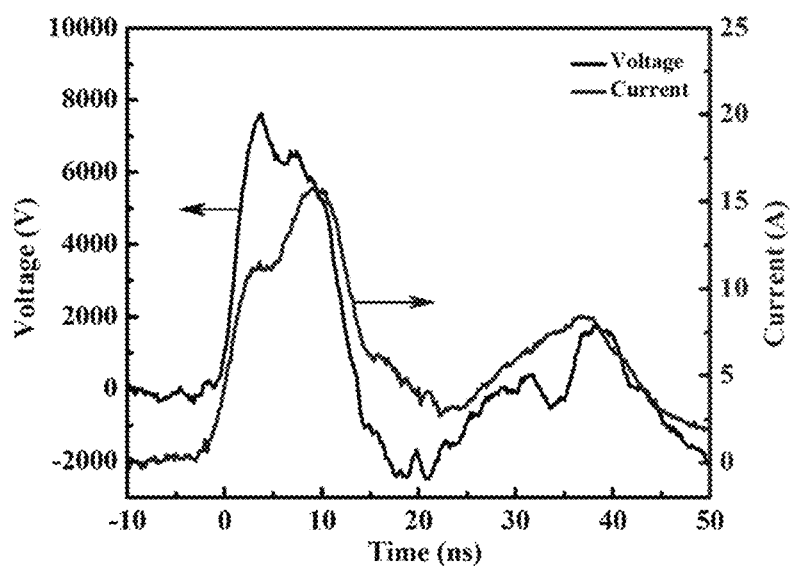
FIG. 41 is a graph illustrating voltage and current waveforms of the plasma discharge according to an exemplary embodiment of the present disclosure.

The high voltage pulse can be generated by a pulse generator 4025 (e.g., FID, FPG 30-50MC4) with a pulse duration of about12 ns (e.g., full width at half maximum, FWHM) and adjustable frequency. The counterflow burner can be connected with about 75Ω non-inductive resistor in parallel. The non-inductive resistor can remove the charging of the cell and cables, and also absorb the reflected power to prevent overheating of the pulse generator. The voltage can be measured by a high voltage probe (e.g., LeCroy, PPE20 KV), and can be kept constant as about 7.6 kV. The current through the electrodes can be measured with a Pearson Coil (e.g., Model 6585). Both the voltage and current can be measured at the same point in the cable (e.g., about 1.5 m away from the electrode along the cable) connecting the pulse generator 4025 and oxidizer 4010 side electrode. The exemplary voltage and current waveforms are shown in FIG. 41. The characteristics of voltage-current can be found to be independent of the mixture compositions of the fuel and oxidizer sides. The pulse energy supplied to the discharge can be estimated from the time integration of the voltage and current profiles, and can be found to be approximately 0.73 mJ/pulse. The pulse repetition frequency (f) can be fixed at either about 24 kHz or about 34 kHz during the experiments, corresponding to an input power of about 17.5 W or about 24.8 W.

In order to improve the uniformity of the discharge, helium ("He") can be used as the dilution gas for both the fuel ("DME") side and the oxidizer ("$O_2$") side. The pressure can be held constant at 72 Torr for all of the experiments. The discharge between the two burner nozzles can be always uniform and stable with or without DME addition. No filamentary structure or hot spot, which can cause hot ignition, was observed from OH and $CH_2O$ PLIF images. A similar observation has been previously described using $CH_4$ as the fuel. (See, e.g., Reference 107).

The temperatures close to the burner surface (e.g., boundary temperatures) can be measured by a thermocouple with three coating layers (e.g., Omega Engineering, INC.). The thermocouple can be coated by magnesium oxide ("MgO") on the surface, and can be encapsulated by a metal sheath. The electromagnetic effect from the pulsed discharge on the thermocouple can be removed. Additionally, an aluminum oxide sheath (e.g., OD 3 mm) can be used to cover the metal sheath to remove the effect from the ionized environment. (See, e.g., References 105 and 106). The thermocouple measurements have been compared with Rayleigh scattering (see, e.g., Reference 107), with and without discharge, respectively. The uncertainty of the thermocouple measurements was found to be ±20 K.

Both OH and $CH_2O$ Planar Laser Induced Fluorescences ("PLIFs") can be utilized to characterize the high and low temperature chemistry. The exemplary OH PLIF system can include an Nd:YAG laser (e.g., Continuum, Powerlite 8000), a dye laser (e.g., Continuum, ND6000) and an ICCD camera (e.g., Princeton Instrument, PI-MAX Gen-3). The Q1(6) transition of OH can be excited at the wavelength of about 282.93 nm. The OH PLIF intensity can be calibrated with a $CH_4/O_2$/He diffusion flame and converted into absolute number densities. (See e.g., Reference 128). The $CH_2O$ PLIF excited by photons at 355 nm, the third harmonic from the Nd:YAG laser can be employed. (See, e.g., References 129 and 130). The fluorescence signal from $\tilde{A}1A2$ to $\tilde{X}^1A_1$ transition band can be collected by the ICCD camera with a bandpass filter from about 400 to about 450 nm. For both LIF measurements, the laser sheet (e.g., about 282.93 nm or about 355 nm wavelength) can be formed by using a concave lens (e.g., focus length about −50 mm) and two convex lenses (e.g., focus length about 150 mm and about 500 mm). The laser sheet which can be about 16 mm wide can pass the center gap between the two burners to excite the OH or $CH_2O$ species. The fluorescence signal can be collected by the ICCD camera at a 90° angle with respect to the laser sheet.

Exemplary Counterflow Flame System with In Situ Nano-Second Pulsed Discharge Computational Approach with Plasma-Combustion Kinetic Model A one-dimensional stagnation flow approximation can be used to model the exemplary counterflow system with in situ discharge by using modified CHEMKIN-II code. (See, e.g., References 131 and 132). The kinetic mechanism can be generated by the combination of a plasma kinetic model (see, e.g., Reference 112) and the DME combustion kinetic model. (See, e.g., Reference 127). The exemplary reaction rate constants of electron impact related reactions can be known to be a strong function of the reduced electrical field (e.g., E/N, defined as the local electric field strength, E, divided by the local number density, N). These constants can be generated independently by solving the steady state, two-term expansion Boltzmann equation for the electron energy distribution function ("EEDF") of the plasma electrons, using the measured cross sections of electron impact on electronic excitation, dissociation, ionization and dissociative attachment processes. (See, e.g., Reference 112). The rate constants can then be fitted as a function of E/N for later usage. Among the electron impact reactions, one unknown reaction set can be the electron impact dissociation of DME. However, two dominant reaction channels can be identified by EI-MBMS (e.g., Electron Impact-Reflection Time-of-Flight Molecular Beam Mass Spectrometry) of DME oxidation (see, e.g., Reference 126) as follows. The averaged electron energy of the e-gun in the EI-MBMS was 30 eV. The two dominant reaction channels can be independent of mean electron energies of e-gun were 10 eV to 40 eV.

$$e + DME \rightarrow CH_3OCH_2 + H + e \tag{14}$$

$$e + DME \rightarrow CH_3O + CH_3 + e \tag{15}$$

Since there may be no cross-section data available for electron impact of DME, the cross sections of reactions in Eqs. (14) and (15) can be approximated by the cross sections of $e + C_2H_6 \rightarrow C_2H_5 + H + e$ and $e + C_2H_6 \rightarrow 2CH_3 + e$, respectively, based on the similarity in carbon number, single C—C/C—O/C—H bonds, and radical formation. (See, e.g., Reference 133).

The exemplary model may not solve the Poisson equation for the electric field and therefore may not take into account for the charge separation and sheath formation near the electrodes. This exemplary modeling approach can be justified by the following reasons. The voltage drops in the sheath regions close to the electrode surfaces can be estimated by simulations at the same conditions, but with homogeneous compositions. (See, e.g., References 134 and 135). The simulation illustrate that the electrical field (e.g., E=7500 V/cm) in the bulk plasma region can be nearly constant at different conditions as the applied voltage can be constant, which can be confirmed during the exemplary experiments. Thus, the rate constants of electron impact reactions can be predominantly controlled by the local temperature at constant pressure conditions. The effect of temperature gradient on the discharge properties can be accounted by calculating the local E/N value (e.g., mean electron energy and electron impact reaction rates) according to the local temperature. Since the exemplary system can be highly diluted by helium and the discharge characteristic (e.g., voltage and current waveforms) can be independent of gas composition, it can be assumed the effect of gas composition gradient can be negligible.

The electron number density can be approximately $5 \times 10^{10}$ cm$^{-3}$ calculated through $j = v_{dr} n_e$ where j can be the current density from experiments, $v_{dr}$ can be the drift velocity from the modeling, and ne can be the electron number density. Because the high voltage pulse can be very short (e.g., about 12 ns) compared to the flow residence time, the flame may not respond to the pulsed perturbation, and the pulsed excitation effect on the mixture can be averaged over the fluid particles. (See, e.g., Reference 136). Additionally, the kinetic mechanism that can include both plasma and combustion kinetics, can be generated and used by the modified CHEMKIN-II code. (See, e.g., References 131 and 132).

Exemplary Counterflow Flame System with In Situ Nano-Second Pulsed Discharge Results and Discussion The dependence of the OH number density on DME fuel concentration can be compared to that of $CH_4$. (See, e.g., FIG. 42). $O_2$ mole fraction at the oxidizer side nozzle exit $X_O$=0.55, the strain rate (e.g., 250 l/s for DME and 400 l/s for $CH_4$) and the discharge frequency (e.g., f=24 kHz) can be fixed. The boundary temperatures at the oxidizer side nozzle exit and fuel side at the fuel side nozzle exit can be 650±20 K and 600±20 K, respectively, and nearly constant within about a 20 K variation through all the exemplary experiments with the fixed discharge frequency and experimental pressure. The oxidizer side burner can be located on the top of the fuel side burner, such that the temperature at the oxidizer side nozzle exit can be slightly higher than that of fuel side due to the heating effect from the burned gas inside the chamber. This temperature can be well below the auto-ignition temperature of DME at strain rate of about 250 l/s and about 72 Torr without plasma. With the increase of DME mole fraction at the fuel side nozzle exit, $X_F$, ignition can happen at $X_F$=0.08 along with a sharp increase of the OH number density.

Figure 42:
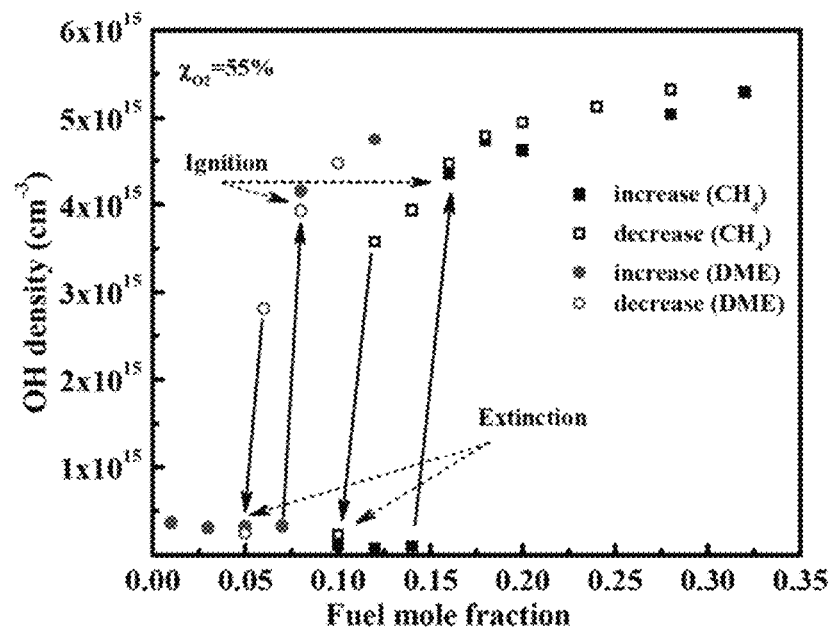
FIG. 42 is a graph illustrating the relationship between OH density and fuel mole fraction $X_O$=0.55, P=72 Torr, f=24 kHz, for DME (a=250 l/s) and $CH_4$ (a=400 l/s,) as the fuel, respectively according to an exemplary embodiment of the present disclosure.

After the ignition, the OH number density can show the proportionality to the DME mole fraction. But if the DME mole fraction at the fuel side nozzle exit becomes smaller than a critical value, (e.g., 0.05), extinction can occur along with a sharp decrease (e.g., one order of magnitude) of the OH number density. The OH number density can be very low at the noise level and nearly constant with the change of DME mole fraction on the fuel side. The change of OH number density may only be observed after the ignition as shown in FIG. 42. The low OH number density in the low temperature oxidation of DME can be because of the fast H abstraction reaction between OH and fuel. As such, OH PLIF may only show the ignition process after hot ignition transition (e.g., $H_2O_2$=2OH and/or $H+O_2$=OH+O). However, by comparing OH formation from DME with $CH_4$ in FIG. 42, it can be seen that at a similar condition, ignition occurred at a much low fuel mole fraction at the fuel side nozzle exit for DME than $CH_4$.

Figure 43:
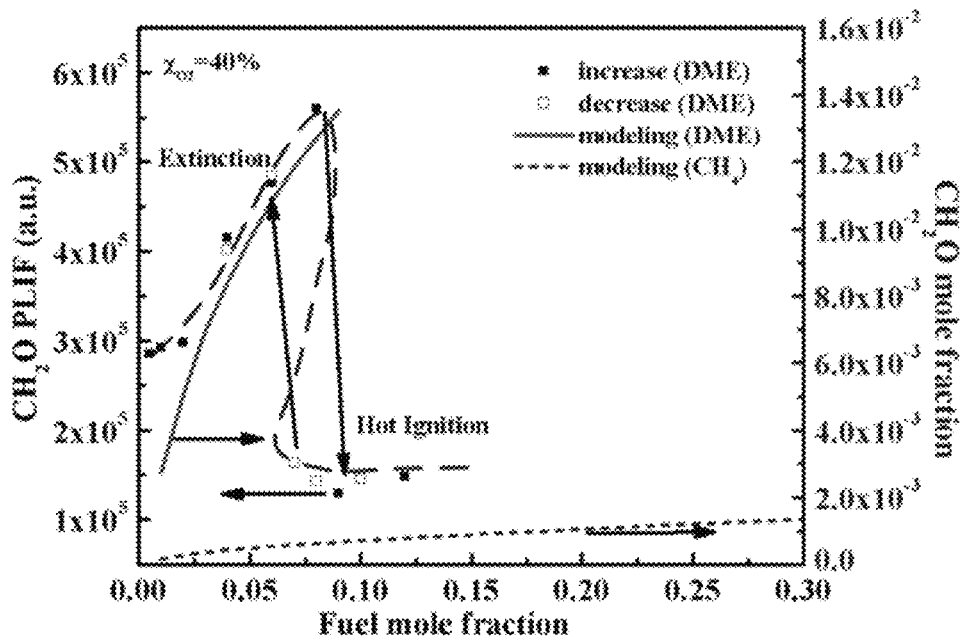
FIG. 43 is a chart illustrating the relationship between $CH_2O$ PLIF and fuel mole fraction $X_O$=0.4, P=72 Torr, f=24 kHz, a=250 l/s according to an exemplary embodiment of the present disclosure.
Figure 44:
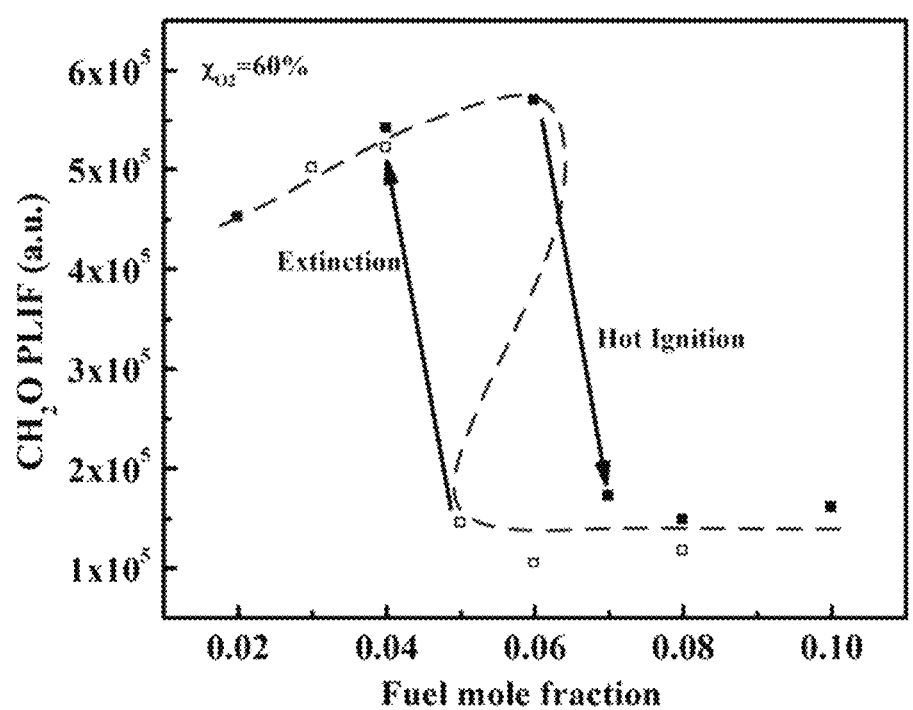
FIG. 44 is a graph illustrating the relationship between $CH_2O$ PLIF and fuel mole fraction $X_O$=0.6, P=72 Torr, f=24 kHz, a=250 l/s according to an exemplary embodiment of the present disclosure.

In order to understand plasma activated low temperature chemistry (e.g., PA-LTC) of DME, the formation of $CH_2O$ via low temperature reaction pathway (126) can be measured by using $CH_2O$ PLIF. The integrated intensity of $CH_2O$ PLIF signal across the burner gap can be used as a marker of high temperature and low temperature combustion chemistry of DME for comparisons of different cases/conditions. During the exemplary experiments, the strain rate (e.g., about 250 l/s, with flow residence time of approximately 4 ms) (see, e.g., Reference 112), the $O_2$ mole fraction at the oxidizer side nozzle exit, $X_O$, and the discharge frequency (e.g., f=24 kHz) can be held constant, while the DME mole fraction at the fuel side nozzle exit, $X_F$, can be varied. The relationship between $CH_2O$ PLIF signal intensity (e.g., integration across burner gap) and fuel mole fraction at the fuel side nozzle exit, $X_F$, with a repetitive plasma discharge, is shown in FIG. 43 and FIG. 44 at f=24 kHz, $X_O$=0.4 and $X_O$=0.6, respectively. As shown in FIG. 43, with the increase of the fuel mole fraction ($X_F$), the $CH_2O$ PLIF signal intensity can increase almost linearly. This linear increase of $CH_2O$ PLIF signal (e.g., proportional to $CH_2O$ number density) with fuel mole fraction before ignition can indicate the occurrence of low temperature DME oxidation. In addition, when the DME mole fraction at the fuel side nozzle exit can be larger than about 9% at $X_O$=0.4, the ignition can occur with a sharp decrease of $CH_2O$ PLIF signal intensity. After the ignition, the $CH_2O$ PLIF signal intensity can become insensitive to the change of DME mole fraction. However, when the DME mole fraction can be decreased slowly to about 7% at $X_O$=0.4, extinction can occur along with a rapid increase of $CH_2O$ PLIF signal intensity. Similar results can also be observed at $X_O$=0.6, as shown in FIG. 43 with the ignition and extinction occurring at lower fuel mole fractions.

In order to confirm whether this pronounced formation of $CH_2O$ before ignition can be a unique response of DME oxidation relevant to the low temperature reactivity, numerical calculations for both DME and the $CH_4$ case (see, e.g., Reference 107) can be conducted. The exemplary modeling results before ignition for both DME and $CH_4$ as the fuels are also illustrated in FIG. 43, which indicates that the $CH_2O$ mole fraction can be about 500 ppm for $CH_4$ cases at the identical conditions shown in FIG. 43, whereas the $CH_2O$ mole fraction in DME studied here can be about 10,000 ppm. The large difference in $CH_2O$ formation between DME and $CH_4$ can suggest that the low temperature reactivity in DME oxidation can be activated by the in situ discharge. The fully-stretched (e.g., monotonic) S-curve has been observed at the condition of $X_O$=0.62, a=400 l/s, and f=24 kHz at 72 torr for $CH_4$, whereas the result of DME shown in FIG. 44 still indicates the hysteresis between ignition and extinction at the similar condition except a=250 l/s because the fuel DME stream can be highly diluted. The exemplary comparison between $CH_4$ and DME shown in FIG. 42 shows that the DME oxidation can start from lower fuel mole fraction than $CH_4$, can indicate the earlier onset of oxidative reaction due to the enriched low temperature reactivity of DME.

Figure 46:
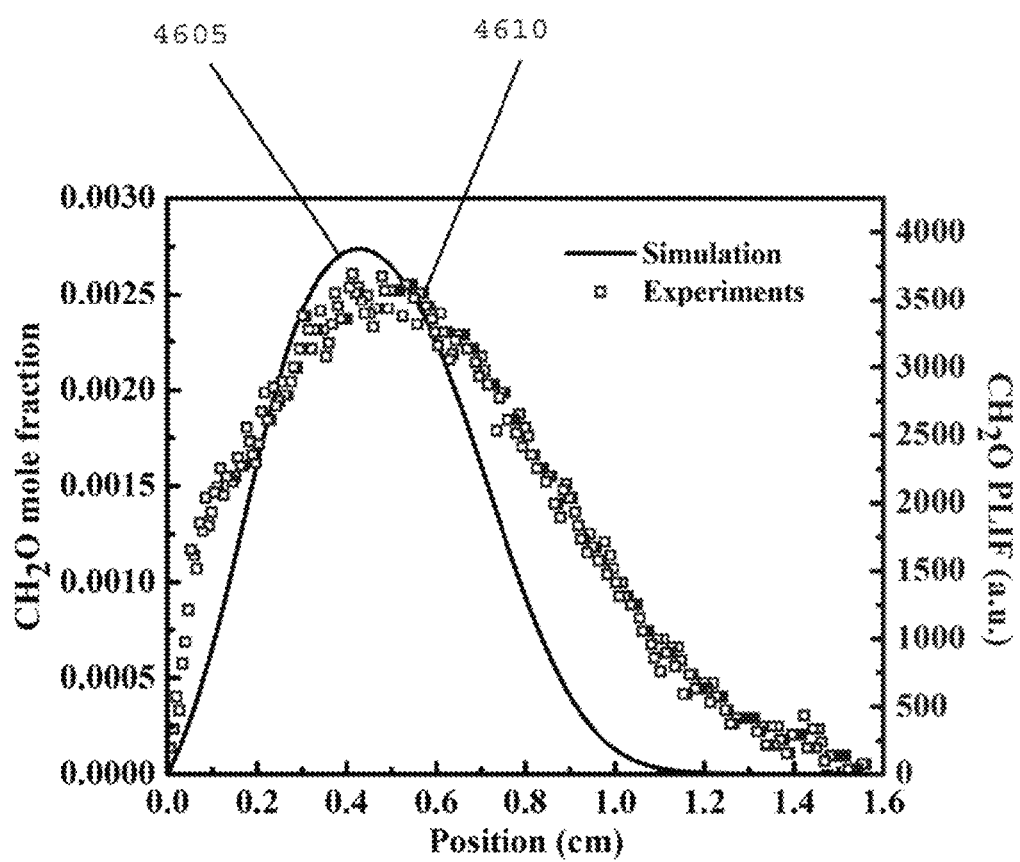
FIG. 46 is a graph illustrating a comparison of $CH_2O$ profiles between simulation (e.g., mole fraction) and experiments (e.g., PLIF signal intensity), $X_F$=0.01, $X_O$=0.4, P=72 Torr, f=24 kHz, a=250 l/s (e.g., fuel side at 0 mm, oxidizer side at 1.6 cm) according to an exemplary embodiment of the present disclosure.

Exemplary Counterflow Flame System with In Situ Nano-Second Pulsed Discharge Numerical Modeling and Experimental Confirmation of PA-LTC The exemplary simulations can be conducted at the condition of f=24 kHz, $X_F$=0.01 and $X_O$=0.4 for the fuel and oxidizer sides, respectively, in order to analyze the plasma activated reactions prior to ignition and consequent formation of a flame. As shown in FIGS. 45A and 45B, the flame temperature can peak near the stagnation plane, indicating the location of the main reaction zone. Without the plasma, no reaction zone (e.g., flame) can exist at this condition. With the presence of plasma, significant amounts of O, H, OH together with $HO_2$ and $H_2O_2$ can be generated. The dominant production pathway of O can be the direct electron impact dissociation of $O_2$. The O mole fraction can peak close to the oxidizer side nozzle exit (e.g., about 2.5 mm away) but not at the nozzle exit where the $O_2$ mole fraction can peak. This can be due to the radical quenching boundary conditions at the electrode surfaces. Moving along the axis away from the oxidizer side nozzle exit as shown in FIG. 45A, O mole fraction can increase first and then decrease due to both the increased consumption reaction rates with fuel and fuel fragments and decreased $O_2$ mole fraction. The H atom mole fraction can also peak on the oxidizer side due to the reactions between O and fuel fragments. Different from the $CH_4$ results (see, e.g., Reference 107), there can be no H peak close to the fuel side. This exemplary difference can indicate that the direct electron impact dissociation of DME via reaction in Eq. (14) can play a minor role in radical production. The production of O and H, together with OH, can further accelerate the fuel oxidization and can result in the temperature increase. A detailed comparison of $CH_2O$ profiles between modeling (e.g., mole fraction) and experiments (e.g., PLIF signal intensity) is shown in FIG. 46. The location of the CH$_2$O peak from the experiment agreed well with that from the modeling. However, the CH$_2$O profile from the exemplary experiment (e.g., element 4605) can be broader than the profile from the modeling (e.g., element 4610) especially close to the oxidizer side. So the effect of radical production on the subsequent formation of CH$_2$O can be underestimated from the modeling. It can be seen from FIG. 43 that at similar conditions, the CH$_2$O number density of CH$_4$ can be approximately 20 times lower than that of DME. This large difference further confirms that the CH$_2$O production can be from the low temperature chemistry kinetics.

In order to identify the important pathways of the radical generation, and understand the kinetic processes in the plasma stimulated low temperature DME (e.g., CH$_3$OCH$_3$) oxidation mechanism, path flux analysis can be performed at X$_F$=0.01, X$_O$=0.4, f=24 kHz by integrating the reaction rates between the two burner nozzles. The exemplary results are shown in block diagrams of FIGS. 47A and 47B. For example, as illustrated in FIG. 47A, approximately 37% of DME can react with atomic O to form OH and CH$_3$OCH$_2$. The formed OH can abstract H from DME and can continue to form DME radicals, CH$_3$OCH$_2$. At the very first reaction step, about 54% of DME can react with OH to form CH$_3$OCH$_2$. There can exist two reaction pathways for CH$_3$OCH$_2$ consumption. The first channel can be that CH$_3$OCH$_2$ can decompose directly to CH$_2$O and CH$_3$. This can be a typical high temperature reaction pathway. The second channel can be that CH$_3$OCH$_2$ can go through the low temperature chemistry reaction pathway via an O$_2$ addition to form CH$_3$OCH$_2$O$_2$ (e.g., RO$_2$ radical). The subsequent isomerization of RO$_2$ to R'OOH and decomposition to OH and CH$_2$O can be the major (e.g., 41%) formation pathways of CH$_2$O at low temperature. As shown in FIG. 47B, the dominate formation pathways of OH and H can be related with atomic O reactions. Therefore, atomic O produced by the plasma can be an important radical controlling the oxidation of DME at low temperature conditions. The dominate formation pathways (e.g., 54%) of atomic O can be from direct electron impact of O$_2$ (e.g., reactions in Eqs. (16) to (18)) and also the collision between He ions (e.g., He(+)) and O$_2$ which counts 38% of the formation of atomic O.

$$e+O2=O+O(1D)+e \quad (16)$$

$$e+O2=2O+e \quad (17)$$

$$e+O2=O+O(+)+2e \quad (18)$$

where O(1D) and O(+) can be the excited atomic O and atomic O ion, respectively. Once O(1D) and O(+) can be produced, they can be quenched and recombined with electrons quickly to produce atomic O based on the exemplary kinetic model. Then, the atomic O can react with DME and DME fragments quickly to form OH and H, to further accelerate the oxidation of DME. The quenching process can introduce heat release due to the relaxation of formation enthalpy of O(1D) and O(+). It can be estimated from the exemplary simulation that the total temperature rise can be approximately 70 K due to the quenching. However, at reduced pressure condition and with helium as dilution gas, the local heating due to the quenching process can be smoothed out by rapid thermal diffusion between the two burner nozzles, and can just contribute to the overall temperature rise of the gas. Through the path flux analysis, CH$_2$O formation can be dominated by PA-LTC of DME oxidation and atomic O production from plasma and subsequent radical productions initiate and control DME low temperature oxidation. Therefore, DME oxidation, and CH$_2$O formation, can be sensitive to atomic O production from the plasma.

Figure 48:
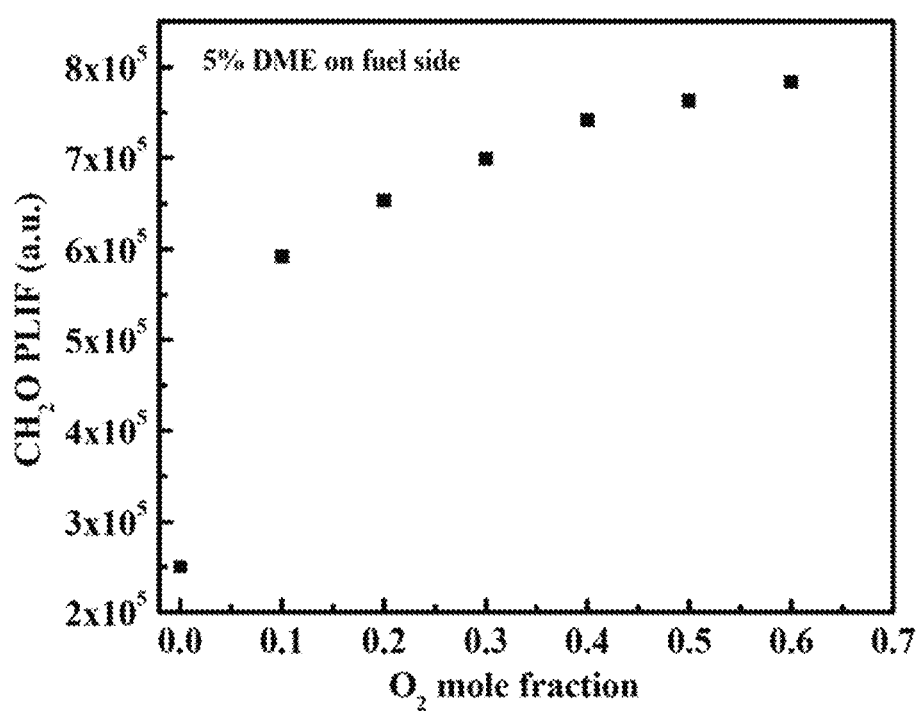
FIG. 48 is a graph illustrating the relationship between $CH_2O$ PLIF and $O_2$ mole fraction with fixed 5% DME mole fraction, P=72 Torr, f=24 kHz, a=250 l/s according to an exemplary embodiment of the present disclosure.

The sensitivity of CH$_2$O formation to atomic O production can be examined experimentally by fixing the DME mole fraction, while varying the O$_2$ mole fraction on the oxidizer side. As shown in FIG. 48, starting with no O$_2$ in the system, a very weak CH$_2$O PLIF signal intensity can be observed comparable with the background noise. However, the intensity of CH$_2$O PLIF can signal increase significantly with O$_2$ addition in the exemplary system and can also increase with the increase of O$_2$ mole fraction afterwards, owing to the increase of atomic O production from the plasma. The results in FIG. 48 can indicate that atomic O production can be very important to promote the low temperature oxidation of DME therefore the production of CH$_2$O.

Figure 49:
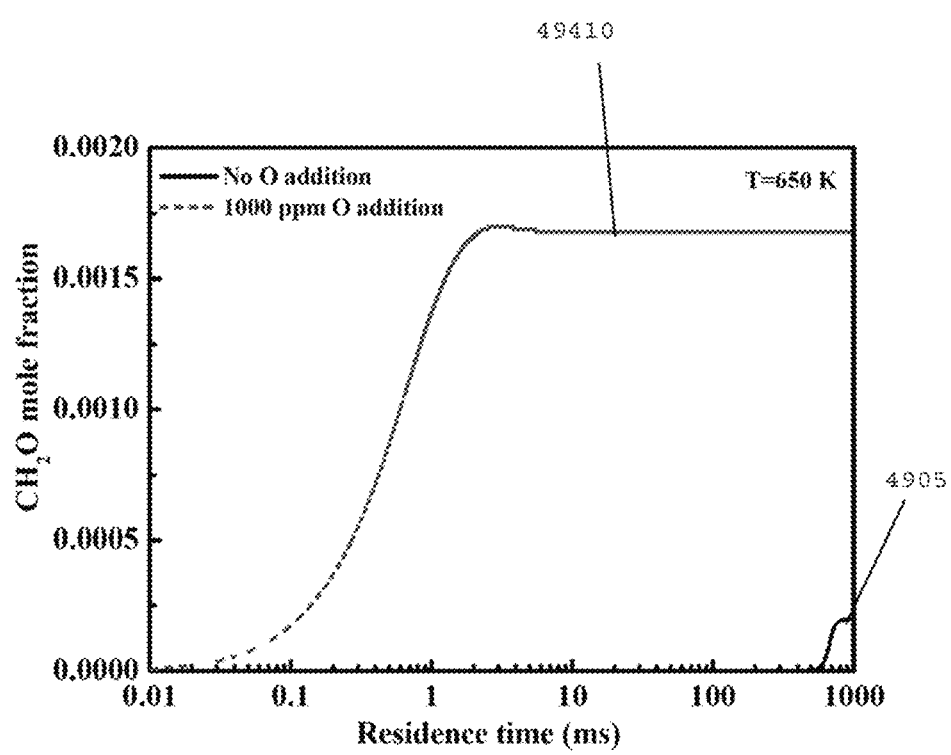
FIG. 49 is a graph illustrating a homogeneous ignition calculation with DME/$O_2$/He (0.3%/10%/89.7%) at P=72 Torr with and without 1000 ppm atomic O addition at 650 K according to an exemplary embodiment of the present disclosure.

In order to further examine the effect of atomic O production on the PA-LTC, homogeneous ignitions calculations can be conducted by SENKIN (see, e.g., Reference 137) employing a DME kinetic mechanism (see, e.g., Reference 127) with DME/O2/He (e.g., 0.003/0.1/0.897 in mole fraction) mixture and investigated at about 72 Torr, about 650 K with and without about 1000 ppm atomic O addition, respectively. The exemplary simulation can be conducted at constant temperature condition to avoid further complicated kinetic temperature dependence and very low DME concentration can be chosen to prevent excessive heat release. The results are shown in FIG. 49. Without atomic O addition (e.g., element 4905), the low temperature chemistry can be very slow at a low pressure condition. The characteristic time can be approximately 1 s for the formation of CH$_2$O. However, with about 1000 ppm atomic O addition (e.g., element 4910), the low temperature chemistry can be significantly accelerated and the characteristic time for CH$_2$O formation can be approximately 1 ms, which can be three orders of magnitude faster. Further, path flux analysis can show that atomic O addition can significantly accelerate the reaction of H abstraction reaction of DME through CH$_3$OCH$_3$ +O =CH$_3$OCH$_2$ +OH reaction. The subsequent formation and isomerization of CH$_3$OCH$_2$O$_2$, decomposition of CH$_2$OCH$_2$O$_2$H to form CH$_2$O can be extremely fast. In addition, approximately 90% of CH$_2$O formation can be through the low temperature chemistry channel (e.g., formation of CH$_3$OCH$_2$O$_2$) as demonstrated in FIG. 47A. Therefore, radical addition (e.g., atomic O production from the plasma) can activate the low temperature chemistry by initiating the H abstraction reaction of DME, and can modify the global characteristic time scale of low temperature oxidation of DME. O addition can increase the total enthalpy of the mixture, and can cause approximately 9 K temperature rise if the same amount of enthalpy increase can be used for thermal heating. In order to compare the thermal effect and kinetic effect, SENKIN simulation can also be conducted at about 660 K, about 72 Torr with DME/O$_2$/He (e.g., 0.003/0.1/0.897 in mole fraction) mixture without O addition. No reaction can happen within about 1 sec because the thermal heating to the mixture to about 660 K can move the temperature condition out of the LTC window. However, with the same initial enthalpy, O addition not only accelerates the LTC kinetics, but also enlarges the LTC window.

Figure 50:
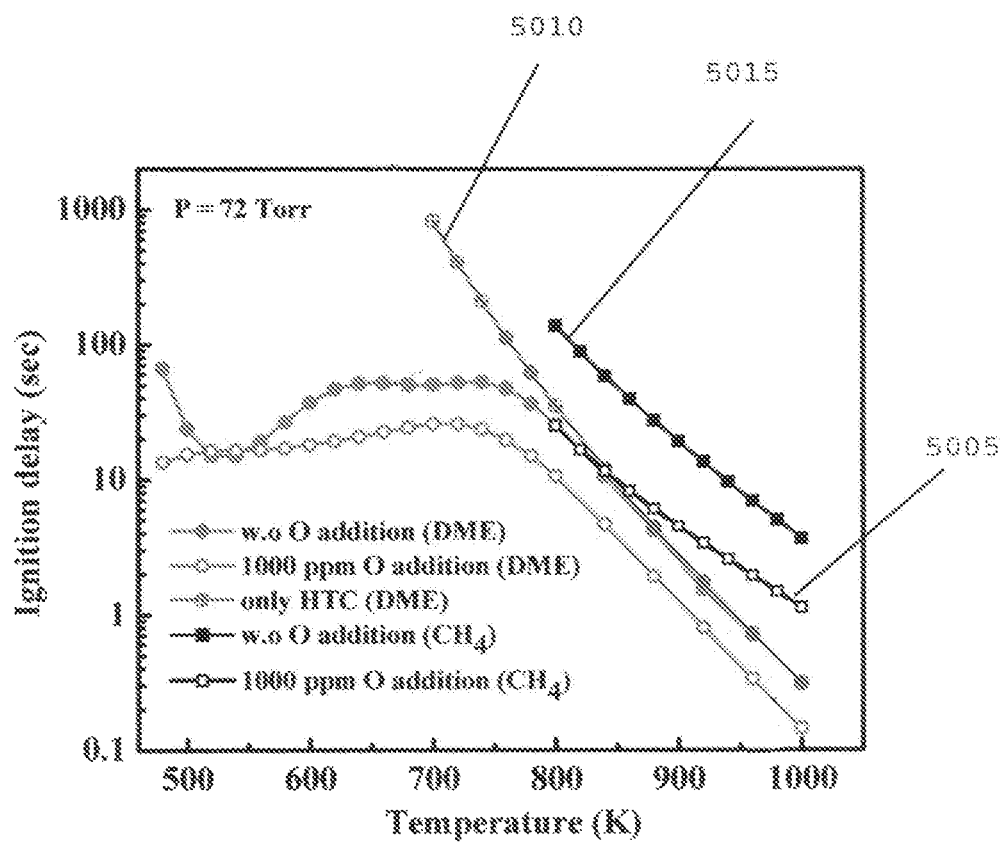
FIG. 50 is a graph illustrating the relationship between ignition delays and temperatures for DME/$O_2$/He (6.54%/19.63%/73.82%) and $CH_4$/$O_2$/He (9.51%/19.01%/71.48%) at P=72 Torr with and without 1000 ppm atomic O addition according to an exemplary embodiment of the present disclosure.

The effect of radical addition can be further analyzed through SENKIN (see, e.g., Reference 137) calculation with stoichiometric DME/O$_2$/He (e.g., 0.0654/0.1963/0.7382 in mole fraction, equivalence ratio=1) mixture at about 72 Torr, from about 480 K to about 1000 K with and without about 1000 ppm atomic O addition, respectively. The relationships between ignition delays and temperature are shown in FIG. 50. It can be seen that 1000 ppm atomic O addition (e.g., element 5005) can shorten the ignition delays significantly and also shift the LTC window. At 72 Torr, the ignition delays decrease and then increase with the temperatures increased from about 480 K to about 740 K. Then, the ignition delays can monotonically decrease with the increase of temperature above about 760 K, which means it can be in the high temperature region. The atomic O addition can stabilize the ignition delay (e.g., approximately 20 s with slightly increasing trend) below 740 K. In high temperature region, the ignition delays decrease with the increase of temperature.

FIG. 51A shows the evolution of ignitions from SENKIN (137) calculation at initial temperature $T_o$=480 K, 600 K, and about 800 K at about 72 Torr. At about 480 K, the ignition may not exhibit two-stage ignitions without atomic O addition. This can be because the temperature can be too low, and the time scale of LTC can be so long that LTC happened first but immediately followed by the high temperature chemistry ("HTC") ignition. However, with the addition of atomic O, the time scale of LTC can be shortened by orders of magnitudes, and two-stage ignition behavior can be clearly observed at about 480 K. Note that about 1000 ppm atomic O may only cause approximately 9 K temperature rise based on total enthalpy addition. The change of the ignition delays can be through the subsequent LTC reactions activated by the atomic O addition. Detailed path flux analysis can show the heat release before the first stage ignition with the atomic O addition can be owing to the low temperature chemistry reactions (e.g., $RO_2$ related reactions). At about 600 K, with the decrease of time scale of LTC, LTC and HTC start to distinguish with each other. The ignitions exhibit two-stage ignitions with and without atomic O addition.

However, atomic O addition can significantly accelerate the first stage ignition and subsequent second stage ignition. At about 800 K, HTC can dominate the ignition process. Two-stage ignition behavior can disappear with and without O addition. With O addition, temperature rise (e.g., heat release) can be observed before ignition, and it can be found this can be completely due to the high temperature chemistry. Similar conclusions can also be reached from calculations conducted at about 760 Torr. FIG. 51B shows the Perfect Stirred Reactor ("PSR") (138) calculation with $DME/O_2/He$ (e.g., 0.03/0.9/0.88 in mole fraction, equivalence ratio=1) mixture at about 72 Torr with different amount of O additions with $T_o$=650 K. DME mole fraction can be decreased for the purpose of demonstration of the effect on upper branches. It can be seen that the time scales for LTC can be significantly modified to introduce subsequent heat release therefore affect the ignition characteristics. The mixing effect in the PSR model can diminish the effect of atomic O addition comparing to the results of homogeneous ignition calculation shown in FIG. 51A.

From the above exemplary analysis, the plasma can introduce radical production that can activate the LTC, and therefore can significantly enhance ignition. As a demonstration, the ignition delays can be calculated without the LTC (e.g., by simply remove the low temperature RO2 related reactions), the results of which are shown in FIG. 50. Here, the HTC (e.g., element 5010) can control ignition in the high temperature region, but LTC can be very critical for ignition below about 760 K at about 72 Torr. Without LTC, ignition delay at low temperature conditions can deviate dramatically from that predicted with LTC, and ignition with LTC cannot occur below about 700 K, which can be very similar to the behavior of CH4 ignition. As a comparison, the relationships between ignition delays and temperature for $CH_4/O_2/He$ (e.g., 0.0951/0.1901/0.7148 in mole fraction, equivalence ratio=1) mixture at about 72 Torr with and without 1000 ppm O addition, respectively, are also shown in FIG. 50. (See, e.g., elements 5005 and 5015 of FIG. 50). For example, 1000 ppm O can be added at the beginning of the ignition event as initial condition. Thus, the effect on the first stage ignition can be significant. The effect of O addition on the second stage ignition can be much smaller than that on the first stage ignition. Table 3 below summarizes all the simulation conditions from FIG. 49 to FIG. 51B.

TABLE 3

Summary of simulation conditions for SENKIN and PSR

| Temperature (K) | Mixture composition | Modeling |
|---|---|---|
| 650 | DME/O2/He (0.300%/10.000%/89.700%) | SENKIN |
| 650 | DME/O2/He/O (0.300%/9.945%/89.655%/0.100%) | SENKIN |
| 480-1000 | DME/O2/He (6.540%/19.630%/73.820%) | SENKIN |
| 480-1000 | DME/O2/He/O (6.537%/19.570%/73.790%/0.100%) | SENKIN |
| 480-1000 | CH4/O2/He (9.510%/19.010%/71.480%) | SENKIN |
| 480-1000 | CH4/O2/He/O (9.505%/18.951%/71.444%/0.100%) | SENKIN |
| 650 | DME/O2/He (3%/9%/88%) | PSR |
| 650 | DME/O2/He/O (2.999%/8.946%/87.956%/0.100%) | PSR |
| 650 | DME/O2/He/O (2.996%/8.837%/87.868%/0.300%) | PSR |
| 650 | DME/O2/He/O (2.985%/8.458%/87.562%/1.000%) | PSR |

Figure 53A:
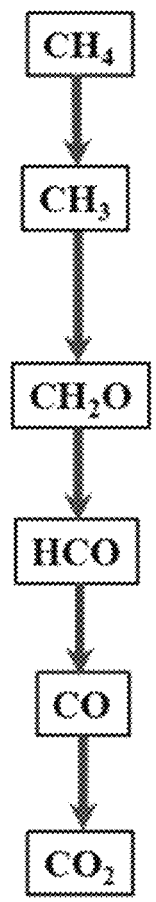
FIG. 53A is a block diagram of reaction pathways for oxidation of $CH_4$ according to an exemplary embodiment of the present disclosure.
Figure 53B:
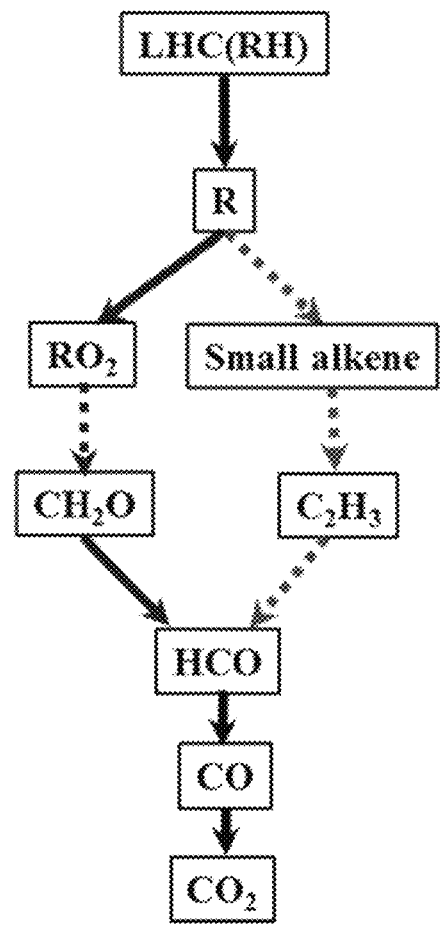
FIG. 53B is a block diagram of reaction pathways for oxidation of large hydrocarbon fuels according to an exemplary embodiment of the present disclosure.

Exemplary Counterflow Flame System with In Situ Nano-Second Pulsed Discharge Modification of the Ignition and Extinction S-Curve By PA-LTC The low temperature oxidation of DME can be controlled by radical production. The difference between $CH_4$ and DME can be that DME can have strong low temperature kinetic whereas $CH_4$ may not. So with the increase of $CH_4$ mole fraction, the increased radical production may only enhance the high temperature reaction pathway. (See, e.g., Reference 107). Using DME as the fuel, there can be two reaction pathways competing for the radicals produced from the plasma. Another feature of the exemplary DME experiments can be that the fuel stream can be highly diluted due to the high reactivity of DME. Therefore, in order to achieve the smooth transition between ignition and extinction, the radical concentrations generated from the plasma must be high enough. Thus, the reaction fluxes for the low temperature pathway and the high temperature pathway can be comparable at low temperature conditions. With an attempt to increase the productivity of radicals, the discharge frequency can be increased to about 34 kHz, the results of which are shown in FIG. 52. As shown in FIG. 52, a monotonic S-curve without hysteresis between ignition and extinction can be successfully achieved by increasing the production of radicals. Therefore, a smooth transition between low temperature chemistry and high temperature chemistry can be realized. This observation can be generalized to other larger hydrocarbon fuels (e.g., such as n-heptane, jet fuel) with two-stage ignition behaviors. The different reaction pathways between $CH_4$ and larger hydrocarbon fuels ("LHC") are illustrated in FIGS. 53A and 53B. As shown in FIG. 53A, there can be only one dominant oxidation pathway for $CH_4$. With the increase of radical production, the reactions can be enhanced without change of reaction pathways, regardless of the temperature. However, as shown in FIG. 53B, with the increase of radical production, both low temperature and high temperature reaction pathways can be enhanced and the increase of reaction flux depends on temperature. At low temperature conditions, the production of radicals can initiate the reaction to form alkyl radical (R), then R reacts with $O_2$ to form $RO_2$ starting the low temperature reaction chain which can be very fast after the initiation reaction. The following formations of $H_2O_2$, $HO_2$ and $CH_2O$ from $RO_2$ can lead to the avalanche of radicals to ignite the system at low temperature conditions. Further analysis shows that the reaction flux can be choked by the initiation reaction (e.g., formation of R). Therefore, the radical productivity can determine the reaction flux of low temperature reaction pathways. At high temperature conditions, high temperature reaction pathway can be favored, and the decomposition of alkane radical to small alkanes can dominate the reaction pathway.

Figure 19:
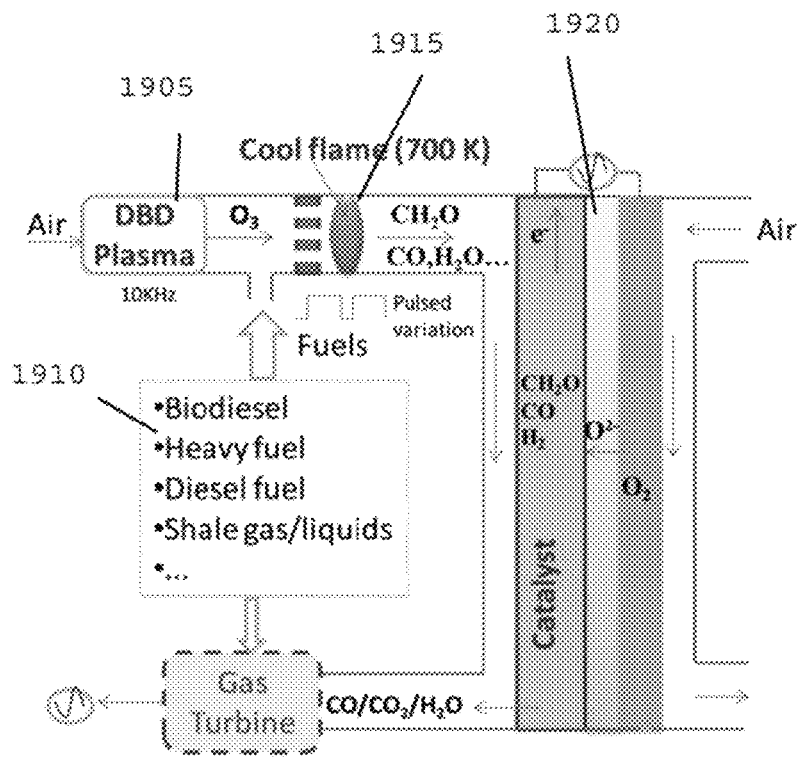
FIG. 19 is a diagram of a plasma activated cool flame fuel reformer for SOFC.

A diagram of a system for a plasma activated cool flame fuel reformer for SOFCs according to an exemplary embodiment of the present disclosure is shown in FIG. 19. The exemplary system can include a plasma dielectric barrier discharge ("DBD") system 1905 for ozone generation, a fuel supply system 1910; an ozone activated cool flame 1915, and a SOFC cell 1920. The plasma activated cool flame 1925 (e.g., approximately 700 K) can be used to directly oxidize heavy fuel into a small hydrocarbon mixture such as $CH_2O/CO/H_2/CH_4/CH_3CHO_2$) coke oxidation by $O_3$ via pulsed fuel control; and a $CH_2O$ decomposition catalyst. While a cool flame may not generally exist at atmospheric pressure, plasma can activate cool flame at atmospheric pressure. (See, e.g., References 8 and 9). Specifically, a short pulse (e.g., about 15 ns, about 0.7 mJ/pulse), high voltage (e.g., about 3-7 kV), repetitive (e.g., about 10 kHz) plasma DBD for an air stream can produce $O_3$ (e.g., approximately 1%) at room temperature via reactions:

$$e^- + O_2 = O + O + e^- \quad (19)$$

$$O + O_2 + M = O_3 + M \quad (20)$$

Large hydrocarbon fuels (e.g., biodiesel, diesel, gasoline, and shale gas liquids) can be vaporized (e.g., about 400-450 K) and mixed with the $O_3$-containing air stream. At about 450-500 K, $O_3$ can decompose and release O radicals, and produce fuel radicals (R) and initiate sequential low temperature fuel oxidation via the following exemplary reactions in a cool flame, (see, e.g., Reference 9):

$$O_3 = O_2 + O \quad (21)$$

$$O + RH = R + OH \quad (22)$$

$$O_2R = RO_2 \quad (23)$$

$$RO_2 \rightarrow QOOH \rightarrow O_2QOOH \rightarrow CH_2O, CO, H_2, H_2O, CH_3CHO \quad (24)$$

The plasma activated cool flame temperature can be around 700 K depending on fuel concentration. (See, e.g., Reference 9). A standard hot flame can produce significant soot emissions, but the cool flame can produce no soot, and can form mainly formaldehyde/acetaldehyde (e.g., $CH_2O/CH_3CHO$) and $CO/H_2O$ in addition to $H_2$ and methane (e.g., $CH_4$). Therefore, the plasma activated cool flame can be an effective way to oxidize heavy fuel into small hydrocarbons with low energy loss.

Nevertheless, to remove the inevitable coke formation due to small hydrocarbons, the fuel stream can be pulsed to generate short $O_3$ spikes to oxidize coke via an exemplary reaction:

$$O_3 + C_{solid} = O_2 + CO \quad (25)$$

Exemplary Formaldehyde Reforming Catalyst

Although the plasma activated cool flame can oxidize large hydrocarbons to small hydrocarbons, and pulsed ozone can help to remove coke, it can still be necessary to decompose/reform formaldehyde (e.g., $CH_2O$) into syngas (e.g., $CO/H_2$) via an exemplary reaction:

$$CH_2O + \text{catalyst} = H_2 + CO + \text{catalyst} \quad (26)$$

Metal oxide-supported noble transition metals, such as Pt, Rh, Pd, Au and Ag on $TiO_2$ (see, e.g., Reference 10) and $CeO_2$ (see, e.g., Reference 11) can catalyze the oxidative decomposition of formaldehyde to $CO_2/H_2O$ at about 300 K or $CO/H_2$ at about 473 K.

Exemplary Coke and Fuel Oxidation

To evaluate the performance of the exemplary cool flame process/apparatus with a SOFC, a test SOFC can be fabricated and integrated with the cool flame system (e.g., FIG. 19). A formaldehyde feed and a pulsed ozone flow can be used to test the catalyst for resistance to coke formation. Coke and catalytic fuel oxidation in the SOFC can be analyzed by using microscopy and microGC. Electricity production and cell efficiency as a function of fuel concentration and cell temperature can be characterized. The exemplary cool flame process/apparatus with a SOFC can be evaluated using n-decane as fuel. Species concentrations of the cool flame and SOFC oxidation can be quantified. Coke and SOFC cell system performance can be analyzed at different cell temperature (e.g., 600-900° C.) and fuel concentrations (e.g., with air-fuel equivalence ratios between 2 and 4).

EXEMPLARY CONCLUSION

A further exemplary process to establish self-sustaining diffusion cool flames and premixed cool flames with well-defined boundary conditions has been demonstrated with n-heptane and dimethyl ether as an exemplary fuel by adding the ozone into the oxidizer or fuel/oxidizer mixture stream in a counterflow configuration. For example, it can be shown that ozone decomposition to atomic oxygen can significantly reduce the induction time of low temperature chemistry, and can enable the observation of cool flames. Three different flame regimes were observed; 1) a hot diffusion flame, 2) a cool flame, and 3) an unstable cool flame (e.g., repetitive ignition and extinction), depending on the fuel mole fraction and the strain rate. Extinction limits and the cool diffusion flame regime diagram can be measured. Numerical simulations show that cool diffusion flames can be governed by ozone sensitized low temperature chemistry and species transport. Comparisons between measured and predicted cool diffusion flame structures show that the existing n-heptane model can over predict the rate of n-heptane oxidation, the heat release rate and flame temperature. In addition, the exemplary model can over predict the QOOH decomposition pathways to form olefins, resulting in substantial over-predicted $C_2H_4$, and $CH_4$ concentrations. The new exemplary cool flame process to establish a self-sustaining cool flame can provide an unprecedented platform enabling fundamental studies on chemical kinetics and flame dynamics associated with complex low temperature chemistry, which can be the essential combustion processes in the recent advanced engine designs.

Figure 54:
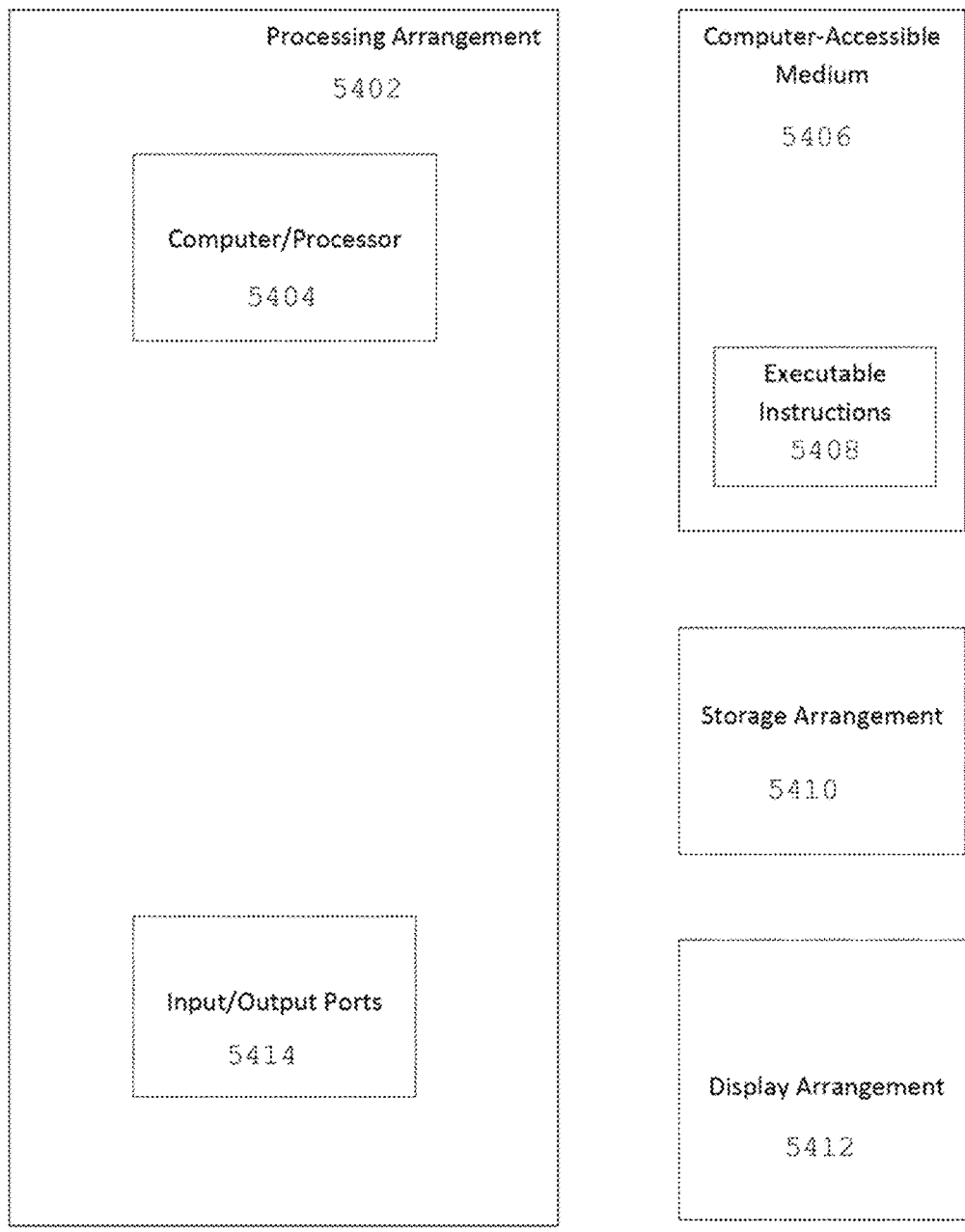
FIG. 54 is an illustration of an exemplary block diagram of an exemplary system in accordance with certain exemplary embodiments of the present disclosure.

FIG. 54 shows a block diagram of an exemplary embodiment of a system according to the present disclosure. For example, exemplary procedures in accordance with the present disclosure described herein can be performed by a processing arrangement and/or a computing arrangement 5402. Such processing/computing arrangement 5402 can be, for example entirely or a part of, or include, but not limited to, a computer/processor 5404 that can include, for example one or more microprocessors, and use instructions stored on a computer-accessible medium (e.g., RAM, ROM, hard drive, or other storage device).

As shown in FIG. 54, for example a computer-accessible medium 5406 (e.g., as described herein above, a storage device such as a hard disk, floppy disk, memory stick, CD-ROM, RAM, ROM, etc., or a collection thereof) can be provided (e.g., in communication with the processing arrangement 5402). The computer-accessible medium 5406 can contain executable instructions 5408 thereon. In addition or alternatively, a storage arrangement 5410 can be provided separately from the computer-accessible medium 5406, which can provide the instructions to the processing arrangement 5402 so as to configure the processing arrangement to execute certain exemplary procedures, processes and methods, as described herein above, for example.

Further, the exemplary processing arrangement 5402 can be provided with or include an input/output arrangement 5414, which can include, for example a wired network, a wireless network, the internet, an intranet, a data collection probe, a sensor, etc. As shown in FIG. 54, the exemplary processing arrangement 5402 can be in communication with an exemplary display arrangement 5412, which, according to certain exemplary embodiments of the present disclosure, can be a touch-screen configured for inputting information to the processing arrangement in addition to outputting information from the processing arrangement, for example. Further, the exemplary display 5412 and/or a storage arrangement 5410 can be used to display and/or store data in a user-accessible format and/or user-readable format.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures which, although not explicitly shown or described herein, embody the principles of the disclosure and can be thus within the spirit and scope of the disclosure. Various different exemplary embodiments can be used together with one another, as well as interchangeably therewith, as should be understood by those having ordinary skill in the art. In addition, certain terms used in the present disclosure, including the specification, drawings and claims thereof, can be used synonymously in certain instances, including, but not limited to, for example, data and information. It should be understood that, while these words, and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

EXEMPLARY REFERENCES

The following references are hereby incorporated by reference in their entirety.

[1] Ashley, S., Scientific American, Nov. 18, 2011.
[2] Zhan, Z., Barnett S. A., J. Power Sources 155 (2006) 353-357.
[3] McIntosh, S. and Gorte, R. J., Chem. Reviews 104 (10), 4845-4866.
[4] Hanna, J.; Lee, W. Y.; Shi, Y.; Ghoniem, A. F., Prog. Energy Combust. Sci. 2014, 40, 74-111.
[5] Wincewicz, K. C.; Cooper, J. S., J. Power Sources 2005, 140, (2), 280-296.
[6] Kee, R. J.; Zhu, H. Y.; Sukeshini, A. M.; Jackson, G. S., Combust. Sci. Tech. 2008, 180, 1207-1244.
[7] Brett, D. J. L.; Atkinson, A.; Brandon, N. P.; Skinner, S., J. Chem. Soc. Rev. 2008, 37 (8), 1568-1578.
[8] Sun, W., Won, S. H., Ju, Y., In Situ Plasma Activated Low Temperature Chemistry and the S-Curve Transition in DME/Oxygen/Helium Mixture, Combustion and Flame, 2014, in press.
[9] Won, S. H.; Jiang, B.; Dievart, P.; Sohn, C. H.; and Ju, Y., Self-Sustaining n-Heptane Cool Diffusion Flames Activated by Ozone, Submitted to Proc. Combust. Institute, Vol. 35. in review. 2014.
[10] Zhang, C.; He, H.; Tanaka, K.-I., Appl. Catal. B: Environ. 2006, 65 (1-2), 37-43.
[11] Imamura, S.; Uchihori, D.; Utani, K.; Ito, T., Catal. Lett. 1994, 24 (3-4), 377-384.
[12] Jeroro, E.; Vohs, J. M., .J. Amer. Chem. Soc. 2008, 130 (31), 10199-10207.
[13] W. H. Perkin, J. Chem. Soc. (1882), p. 363.
[14] H. J. Curran, P. Gaffuri, W. J. Pitz, C. K. Westbrook, Combust. Flame 114 (1998) 149-177.
[15] M. Mehl, W. J. Pitz, C. K. Westbrook, H. J. Curran, Proc. Combust. Inst. 33 (2011) 193-200.
[16] P. G. Lignola, E. Reverchon, Prog. Energy Combust. Sci. 13 (1987) 75-96.
[17] S. Dooley, S. H. Won, M. Chaos, J. Heyne, Y. Ju, F. L. Dryer, K. Kumar, C.-J. Sung, H. Wang, M. A. Oehlschlaeger, R. J. Santoro, T. A. Litzinger, Combust. Flame 157 (2010) 2333-2339.
[18] S. Dooley, S. H. Won, J. Heyne, T. I. Farouk, Y. Ju, F. L. Dryer, K. Kamar, X. Hui, C.-J. Sung, H. Wang, M. A. Oehlschlaeger, V. Iyer, S. Iyer, T. A. Litzinger, R. J. Santoro, T. Malewecki, K. Brezinsky, Combust. Flame, 159 (2012) 1444-1466.
[19] S. Dooley, S. H. Won, S. Jahangirian, Y. Ju, F. L. Dryer, H. Wang, M. A. Oehlschlaeger, Combust. Flame, 159 (2012) 3014-3020.
[20] S. Jahangirian, S. Dooley, F. M. Haas, F. L. Dryer, Combust. Flame 159 (2012) 30-43.
[21] H. Oshibe, H. Nakamura, T. Tezuka, S. Hasegawa, K. Maruta, Combust. Flame 157 (2010) 1572-1580.
[22] V. Nayagam, D. L. Dietrich, P. V. Ferkul, M. C. Hicks, F. A. Williams, Combust. Flame 159 (2012) 3583-3588.
[23] T. I. Farouk, F. L. Dryer, "Isolated n-heptane droplet combustion in microgravity: "Cool Flames"—Two-stage combustion," Combust. Flame (2013) in Press. http://dx.doi.org/10.1016/j.combustflame.2013.09.011.
[24] P. Zhao, C. K. Law, Combust. Flame 160 (2013) 2352-2358.

[25] W. Sun, S. H. Won, T. Ombrello, C. Carter, Y. Ju, Proc. Combust. Inst. 34 (2013) 847-855.

[26] W. Sun, S. H. Won, Y. Ju, "In Situ Activated Low Temperature Chemistry and the S-Curve Transition in DME/Oxygen/Helium Mmixture, Combust. Flame, submitted (2013).

[27] T. Ombrello, S. H. Won, Y. Ju, S. Williams, Combust. Flame 157 (2010) 1906-1915.

[28] T. M. Vu, S. H. Won, T. Ombrello, M. S. Cha, Combust. Flame (2013) in Press, http://dx.doi.org/10.1016/j.combustflame.2013.09.023.

[29] V. J. Dardin, Jr., L. F. Albright, Ind. Eng. Chem. Process Design Develop. 4 (1965) 61-66.

[30] V. Caprio, A. Insola, P. G. Lignola, Combust. Sci. Technol. 35 (1984) 215-224.

[31] Basic Research Needs for Clean and Efficient Combustion of 21st Century Transportation Fuels, 2007, Office of Science, U.S. Department of Energy. Report of the Basic Energy Sciences Workshop on Basic Research Needs for Clean and Efficient Combustion of 21st Century Transportation Fuels, 29 Oct.-1 Nov. 2006.

[32] J. E. Dec, Proc. Combust. Inst. 32 (2) (2009) 2727-2742.

[33] R. D. Reitz, Combust. Flame 160 (2013) 1-8.

[34] S. H. Won, W. Sun, Y. Ju, Combust. Flame 157 (2010) 411-420.

[35] S. H. Won, S. Dooley, F. L. Dryer, Y. Ju, Proc. Combust. Inst. 33 (2011) 1163-1170.

[36] S. H. Won, S. Dooley, F. L. Dryer, Y. Ju, Combust. Flame 159 (2012) 541-551.

[37] J. K. Lefkowitz, S. H. Won, Y. Fenard, Y. Ju, Proc. Combust. Inst. 34 (2013) 813-820.

[38] R. J. Kee, F. M. Rupley, J. A. Miller, M. E. Coltrin, J. F. Grcar, E. Meeks, H. K. Moffat, A. E. Lutz, G. Dixon-Lewis, M. D. Smooke, J. Warnatz, G. H. Evans, R. S. Larson, R. E. Mitchell, L. R. Petzold, W. C. Reynolds, M. Caracotsios, W. E. Stewart, P. Glarborg, C. Wang, O. Adigun, W. G. Houf, C. P. Chou, S. F. Miller, Chemkin Collection, Release 3.7.1, Reaction Design, Inc., San Diego, Calif., 2003.

[39] Y. Ju, H. Guo, K. Maruta, J. Fluid Mech. 23 (1997) 315-334.

[40] C. H. Sohn, S. H. Chung, S. R. Lee, J. S. Kim, Combust. Flame 115 (1998) 299-312.

[41] Y. Ju, W. Sun, M. P. Burke, X. Gou, Z. Chen, Proc. Combust. Inst. 33 (2011) 1245-1251.

[42] W. Sun, Z. Chen, X. Gou, Y. Ju, Combust. Flame 157(7) (2010) 1298-1307.

[43] S. Dooley, F. L. Dryer, T. I. Farouk, Y. Ju, S. H. Won, 51st AIAA Aerospace Science Meeting, 7-10 Jan. 2013, Grapevine, Tex., AIAA 2013-0158.

[44] S. Dooley, M. Uddi, S. H. Won, F. L. Dryer, Y. Ju, Combust. Flame 159 (2012) 1371-1384.

[45] P. Diévart, S. H. Won, S. Dooley, F. L Dryer, Y. Ju, Combust. Flame 159 (2012) 1793-1805.

[46] Davy, H., "Some New Experiments and Observations on the Combustion of Gaseous Mixtures, with an Account of a Method Preserving a Continued Light in Mixtures of Inflammable Gases and Air without Flame," Philisophical Transactions of the Royal Society, Vol. 107, 1817, pp. 77-82.

[47] Perkin, W. H., "Some Observations on the Luminous Incomplete Combustion of Ether and Other Organic Bodies," Journal of the Chemical Society, Vol. 41, 1882, pp. 363-367.

[48] Curran, H. J., Gaffuri, P., Pitz, W. J., and Westbrook, C. K., "A Comprehensive Modeling Study of n-Heptane Oxidation," Combustion and Flame, Vol. 114, 1998, pp. 149-177.

[49] Mehl, M., Pitz, W. J., Westbrook, C. K., and Curran, H. J., "Kinetic Modeling of Gasoline Surrogate Components and Mixtures under Engine Conditions," Proceedings of the Combustion Institute, Vol. 33, 2011, pp. 193-200.

[50] Lignola, P. G., and Reverchon, E., "Cool Flames," Progress in Energy and Combustion Science, Vol. 13, 1987, pp. 75-96.

[51] Zhao, P., and Law, C. K., "The Role of Global and Detailed Kinetics in the First-Stage Ignition Delay in NTC-Affected Phenomena," Combustion and Flame, Vol. 160, pp. 2352-2358.

[52] Won, S. H., Jiang, B., Dievart, P., Sohn, C. H., and Ju, Y., "Self-Sustaining n-Heptane Cool Diffusion Flames Activated by Ozone," Proceedings of the Combustion Institute, Vol. 35, 2014, in press.

[53] Won, S. H., Sun, W., and Ju, Y., "Kinetic Effects of Toluene Blending on the Extinction Limit of n-Decane Diffusion Flames," Combustion and Flame, Vol. 157, 2010, pp. 411-420.

[54] Won, S. H., Dooley, S., Dryer, F. L., and Ju, Y., "Kinetic Effects of Aromatic Molecular Structures on Diffusion Flame Extinction," Proceedings of the Combustion Institute, Vol. 33, 2011, pp. 1163-1170.

[55] Won, S. H., Dooley, S., Dryer, F. L., and Ju, Y., "A Radical Index for the Determination of the Chemical Kinetic Contribution to Diffusion Flame Exinction of Large Hydrocarbon Fuels," Combustion and Flame, Vol. 159, 2012, pp. 541-551.

[56] Lefkowitz, J. K., Won, S. H., Fenard, Y., and Ju, Y., "Uncertainty Assessment of Species Measurements in Acetone Counterflow Diffusion Flames," Proceedings of the Combustion Institute, Vol. 34, 2013, pp. 813-820.

[57] Ombrello, T., Won, S. H., Ju, Y., and Williams, S., "Flame Propagation Enhancement by Plasma Excitation of Oxygen. Part I: Effects of O3," Combustion and Flame, Vol. 157, 2010, pp. 1906-1915.

[58] Molina, L. T., and Molina, M. J., "Absolute Absorption Cross Sections of Ozone in the 185- to 35-nm Wavelength Range," Journal of Geophysical Research, Vol. 91, 1986, pp. 14501-14508.

[59] Cavaliere, A. and de Joannon, M., "Mild Combustion" Progress in Energy and Combustion Science, Vol. 30, Issue 4, 2004, pp. 329-366.

[60] Katsuki, M., and Hasegawa, T., "The Science and Technology of Combustion in Highly Preheated Air" Proceedings of Combustion Institute, Vol. 27, No. 2, 1998, pp. 3135-3146.

[61] Ju, Y., Guo, H., Maruta, K., and Liu, F., "On the Extinction Limit and Flammability Limit of Non-adiabatic Stretched Methane-air Premixed Flames", Journal of Fluid Mechanics, Vol. 342, 1997, pp. 315-334.

[62] Fuse, R., Kobayashi, H., Ju, Y., Maruta, K., and Niioka, T., "NOx Emission from High-temperature Air/methane Counterflow Diffusion Flame", International journal of thermal sciences, Vol. 41, No. 7, 2002, pp. 693-698.

[63] Wada, T., Jarmolowitz, F., Abel, D., and Peters, N., "An Instability of Diluted Lean Methane/air Combustion: Modeling and Control" Combustion Science and Technology, Vol. 183, No. 1, 2011, pp. 1-19.

[64] Kosarev, I. N., Aleksandrov, N. L., Kindysheva, S. V., Starikovskaia, S. M., and Yu Starikovskii, A., "Kinetics of Ignition of Saturated Hydrocarbons by Nonequilibrium Plasma: CH4-containing Mixtures" Combustion and Flame, Vol., 154, Issue 3, 2008, pp. 569-586.

[65] Ombrello, T., Won, S. H., Ju Y., and Williams, S., "Flame Propagation Enhancement by Plasma Extinction of Oxygen Part I: Effect of O3" Combustion and Flame, Vol. 157, Issue 10, 2010, pp. 1906-1915.

[66] Ombrello, T., Won, S. H., Ju Y., and Williams, S., "Flame Propagation Enhancement by Plasma Extinction of Oxygen Part II: Effects of O2(a1□g)" Combustion and Flame, Vol. 157, Issue 10, 2010, pp. 1916-1928.

[67] Sun, W., Won, S. H., Ombrello, T., Carter, C., Ju, Y., "Direct Ignition and S-curve Transition by In Situ Nanosecond Pulsed Discharge in Methane/oxygen/helium Counterflow Flame" Proceedings of the Combustion Institute, Vol. 34, Issue 1, 2013, pp. 847-855.

[68] Sun, W., Won, S. H., and Ju, Y., "In Situ Plasma Activated Low Temperature Chemistry and the S-curve Transition in DME/oxygen/helium Mixture", Combustion and Flame, 2014, in press.

[69] Won, S. H., Jiang, B., Diévart, P., Sohn, C. H., and Ju, Y., "Self-Sustaining N-Heptane Cool Diffusion Flames Activated by Ozone", Proceedings of Combustion Institute, Vol. 35, 2014 in revision.

[70] Lefkowitz, J. K., Uddi, M., Windowm, B., Lou, G. F., Ju, Y., "In Situ Species Diagnostics and Kinetic Study of Plasma Activated Ethylene Pyrolysis and Oxidation in a Low Temperature Flow Rector" Proceedings of Combustion Institute, Vol. 35, 2014, in revision.

[71] Goodwin, D. "Cantera: An Object-oriented Software Toolkit for Chemical Kinetics, Thermodynamics, and Transport Processes" (2009), http://cantera.github.com/docs/sphinx/html/index.html.

[72] Bowman, C. T. et al., The Gas Research Insitute, 1989, http://www.me.berkeley.edu/gri_mech/.

[73] Fluent Inc., "Fluent 15.07 User's Guide" (2014).

[74] Aleksandrov, N. L., Kindysheva, S. V., Kosarev, I. N., Starikovskaia, S. M., Starikovskii, A. Yu, "Mechanism of Ignition by Non-equilibrium Plasma", Proceedings of Combustion Institute, Vol. 32, 2009, pp. 205-212.

[75] Correale, G., Michelis, T. Ragni, D., Kotsonis, M., and Scarano, F., "Nanosecond-pulsed Plasma Actuation in Quiescent Air and Laminar Boundary Layer", J. Phys. D: Appl. Phys, 47, 2014, 105201.

[76] Michelis, T., Coreale, G., Popov, L B., Kotsonis, M., Ragni, D., Hulshoff, S. J., Veldhuis, L. L. M., "Disturbance Introduced into a Laminar Boundary Layer by a NS-DBD Plasma Actuator", AIAA 2013-0752.

[77] Curran, H., Gaffuri, P., Pitz, W., and Westbrook, C., "A comprehensive modeling study of iso-octane oxidation," Combustion and flame, vol. 2180, 2002.

[78] Dooley, S., Won, S. H., Heyne, J., Farouk, T. I., Ju, Y., Dryer, F. L., Kumar, K., Hui, X., Sung, C.-J., Wang, H., Oehlschlaeger, M. a., Iyer, V., Iyer, S., Litzinger, T. a., Santoro, R. J., Malewicki, T., and Brezinsky, K., "The experimental evaluation of a methodology for surrogate fuel formulation to emulate gas phase combustion kinetic phenomena," Combustion and Flame, vol. 159, April 2012, pp. 1444-1466.

[79] Brown, P., Byrne, G., and Hindmarsh, A., "VODE: A variable-coefficient ODE solver," SIAM journal on scientific and statistical . . . , vol. 10, 1989, pp. 1038-1051.

[80] Lam, S. H., "Model reductions with special CSP data," Combustion and Flame, vol. 160, December 2013, pp. 2707-2711.

[81] Maas, U., and Pope, S. B., "Simplifying chemical kinetics: Intrinsic low-dimensional manifolds in composition space," Combustion and Flame, vol. 88, March 1992, pp. 239-264.

[82] Gou, X., Sun, W., Chen, Z., and Ju, Y., "A dynamic multi-timescale method for combustion modeling with detailed and reduced chemical kinetic mechanisms," Combustion and Flame, vol. 157, June 2010, pp. 1111-1121.

[83] Lu, T., Law, C. K., Yoo, C. S., and Chen, J. H., "Dynamic stiffness removal for direct numerical simulations," Combustion and Flame, vol. 156, August 2009, pp. 1542-1551.

[84] Bendtsen, A. B., Glarborg, P., and Dam-Johansen, K., "Visualization methods in analysis of detailed chemical kinetics modelling," Computers & Chemistry, vol. 25, March 2001, pp. 161-170.

[85] Sun, W., Chen, Z., Gou, X., and Ju, Y., "A path flux analysis method for the reduction of detailed chemical kinetic mechanisms," Combustion and Flame, vol. 157, July 2010, pp. 1298-1307.

[86] Lu, T., and Law, C. K., "A directed relation graph method for mechanism reduction," Proceedings of the Combustion Institute, vol. 30, January 2005, pp. 1333-1341.

[87] Pepiotdesjardins, P., and Pitsch, H., "An efficient error-propagation-based reduction method for large chemical kinetic mechanisms," Combustion and Flame, vol. 154, July 2008, pp. 67-81.

[88] Sun, W., Won, S. H., Gou, X., and Ju, Y., "Multi-scale modeling of dynamics and ignition to flame transitions of high pressure stratified n-heptane/toluene mixtures," Proceedings of the Combustion Institute, September 2014.

[89] J. O. Hirschfelder, C. F. Curtiss, R. B. B., Molecular Theory of Gases and Liquids, John Wiley and Sons, New York, 1954.

[90] Iliams, F. a., "Elementary Derivation of the Multicomponent Diffusion Equation," American Journal of Physics, vol. 26, 1958, p. 467.

[91] Curtiss, C. F., and Hirschfelder, J. O., "Transport Properties of Multicomponent Gas Mixtures," The Journal of Chemical Physics, vol. 17, 1949, p. 550.

[92] Lam, S. H., "Multicomponent diffusion revisited," Physics of Fluids, vol. 18, 2006, p. 073101.

[93] R. Byron Bird, Warren E. Stewart, E. N. L., Transport phenomena, John Wiley and Sons, New York, 1960.

[94] Mathur, S., Tondon, P. K., and Saxena, S. C., "Thermal conductivity of binary, ternary and quaternary mixtures of rare gases," Molecular Physics, vol. 12, January 1967, pp. 569-579.

[95] Wilke, C. R., "A Viscosity Equation for Gas Mixtures," The Journal of Chemical Physics, vol. 18, 1950, p. 517.

[96] Smooke, M. D., "The computation of laminar flames," Proceedings of the Combustion Institute, vol. 34, January 2013, pp. 65-98.

[97] Xin, Y., Liang, W., Liu, W., Lu, T., and Law, C. K., "A reduced multicomponent diffusion model," Combustion and Flame, vol. 162, January 2015, pp. 68-74.

[98] Kee, R., Grcar, J. F., Smooke, M. D., and Miller, J. A., Sandia National Laboratory Report SAND85-8240, 1985.

[99] Kee, R., "Transport: a software package for the evaluation of gas-phase, multicomponent transport properties," Chemkin . . . , 1999, pp. 1-51.

[100] Chen, Z., "Studies on the initiation, propagation, and extinction of premixed flames," 2009.

[101] Chen, Z., Burke, M. P., and Ju, Y., "Effects of Lewis number and ignition energy on the determination of laminar flame speed using propagating spherical flames," Proceedings of the Combustion Institute, vol. 32, 2009, pp. 1253-1260.

[102] Burke, M. P., Chen, Z., Ju, Y., and Dryer, F. L., "Effect of cylindrical confinement on the determination of laminar flame speeds using outwardly propagating flames," Combustion and Flame, vol. 156, April 2009, pp. 771-779.

[103] Chen, Z., "On the extraction of laminar flame speed and Markstein length from outwardly propagating spherical flames," Combustion and Flame, vol. 158, February 2011, pp. 291-300.

[104] Qin, X., and Ju, Y., "Measurements of burning velocities of dimethyl ether and air premixed flames at elevated pressures," Proceedings of the Combustion Institute, vol. 30, January 2005, pp. 233-240.

[105] G. Pilla, D. Galley, D. A. Lacoste, F. Lacas, D. Veynante, C. O. Laux, IEEE Trans. Plasma Sci., (34) 2006, 2471-2477.

[106] T. Ombrello, S. H. Won, Y. Ju, S. Williams, Combustion and Flame, (157) 2010, 1916-1928.

[107] W. Sun, T. Ombrello, S. H. Won, C. Carter, Y. Ju, Proceedings of the Combustion Institute, (34) 2013, 847-855.

[108] I. Kosarev, N. Aleksandrov, S. Kindysheva, S. Starikovskaia, A. Starikovskii, Combustion and Flame, (154) 2008, 569-586.

[109] E. Mintusov, A. Serdyuchenko, I. Choi, W. R. Lempert, I. V. Adamovich, Proceedings of the Combustion Institute, (32) 2009, 3181-3188.

[110] T. Ombrello, Y. Ju, IEEE Trans. Plasma Sci., (36) 2008, 2924-2932.

[111] S. A. Bozhenkov, S. M. Starikovskaia, A. Y. Starikovskii, Combustion and Flame, (133) 2003, 133-146.

[112] M. Uddi, N. Jiang, E. Mintusov, I. Adamovich, W. Lempert, Proceedings of the Combustion Institute, (32) 2009, 929-936.

[113 W. Kim, M. G. Mungal, M. A. Cappelli, Combustion and Flame, (157) 2010, 374-383.

[114] W. Sun, M. Uddi, T. Ombrello, S. H. Won, C. Carter, Y. Ju, Proceedings of the Combustion Institute, (33) 2011, 3211-3218.

[115] Z. Yin, I. V. Adamovich, 49th AIAA Aerospace Sciences Meeting including The New Horizons Forum and Aerospace Exposition, 2011, AIAA-2011-1212.

[116] T. Ombrello, S. H. Won, Y. Ju, S. Williams, Combustion and Flame, (157) 2010, 1906-1915.

[117] W. Sun, M. Uddi, S. H. Won, T. Ombrello, C. Carter, Y. Ju, Combustion and Flame, (159) 2012, 221-229.

[118] N. Aleksandrov, S. Kindysheva, I. Kosarev, S. Star.ikovskaia, A. Starikovskii, Proceedings of the Combustion Institute, (32) 2009, 205-212.

[119] A. M. Starik, V. E. Kozlov, N. S. Titova, Combustion and Flame, (157) 2010, 317-327

[120] X. Rao, K. Hemawan, I. Wichman, C. Carter, T. Grotjohn, J. Asmussen, T. Lee, Proceedings of the Combustion Institute, (33) 2011, 3233-3240.

[121] A. Bao, Y. G. Utkin, K. Saurabh, G. Lou, I. V. Adamovich, IEEE Trans. Plasma Sci., (35) 2007, 1628-1638.

[122] L. Wu, J. Lane, N. P. Cernansky, D. L. Miller, A. A. Fridman, A. Y. Starikovskiy, Proceedings of the Combustion Institute, (33) 2011, 3219-3224.

[123] S. V. Pancheshnyi, D. A. Lacoste, A. Bourdon, C. O. Laux, IEEE Trans. Plasma Sci., (34) 2006, 2478-2487.

[124] Y. Ju, W. Sun, M. P. Burke, X. Gou, Z. Chen, Proceedings of the Combustion Institute, (33) 2011, 1245-1251.

[125] H. J. Curran, P. Gaffuri, W. J. Pitz, C. K. Westbrook, Combustion and Flame, (114) 1998, 149-177.

[126] H. Guo, W. Sun, F. M. Haas, T. Farouk, F. L. Dryer, Y. Ju, Proceedings of the Combustion Institute, (34) 2013, 578-581.

[127] Z. Zhao, M. Chaos. A. Kazakov, F. L. Dryer, Int. J. Chem. Kinet., (40) 2008, 1-18.

[128] S. H. Won, W. Sun, Y. Ju, Combustion and Flame, (157) 2010, 411-420.

[129] T. Meta, X. Bai, F. Ossler, M. Alden, Spectrochimica Acta part A, 60 (2004), 1043-1053.

[130] J. E. Harrington, K. C. Smyth, Chemical Physics Letters, 202 (1993), 196-202.

[131] F. Liu, Y. Ju, H. Guo, K. Maruta, J. Fluid Mech., (342) 1997, 315-334.

[132] R. J. Kee, J. F. Grcar, M. D. Smooke, J. A. Miller, A FORTRAN program for modeling steady laminar one-dimensional premixed flames, Sandia National Laboratory Report SAND85-8240, 1985.

[133] R. K. Janev, D. Reiter, Physics of Plasmas, (11) 2004, 780-829.

[134] T. Farouk, B. Farouk, A. Gutsol, A. Fridman, Plasma Sources Science and Technology, (17) 2008, 035015.

[135] T. Farouk, B. Farouk, A Gutsol, A. Fridman, Journal of Physics D: Applied Physics, (41) 2008, 175202.

[136] A. Bao, "Ignition of Hydrocarbon Fuels by A Repetitively Pulsed Nanosecond Pulse Duration Plasma", Ph.D dissertation, Department of Mechanical Engineering, Ohio State University, 2008.

[137] A. E. Lutz, R.J. Kee, J. A. Miller, "SENKIN: A FORTRAN Program for Predicting Homogeneous Gas Phase Chemical Kinetics with Sensitivity Analysis", 1997.

[138] P. Glarborg, R. J. Kee, J. F. Grcar, J. A. Miller, "PSR: A FORTRAN program for modeling well-stirred reactors", 1986.

What is claimed is:

1. A method, comprising:
generating at least one chemically active species in at least one of air, oxygen or a fuel-lean mixture using a plasma generator;
mixing the at least one chemically active species with at least one fuel to produce a species-fuel mixture;
generating at least one burner stabilized cool flame at a temperature of between about 500 Kelvin and about 1050 Kelvin using the species-fuel mixture; and
maintaining the at least one burner stabilized cool flame at the temperature of between about 500 Kelvin and about 1050 Kelvin,
wherein the at last one burner stabilized cool flame is a self-sustaining cool flame that is stable between about 500 Kelvin and about 1050 Kelvin, and
wherein the at least one burner stabilized cool flame is further generated using a heated counterflow flame arrangement.

2. The method of claim 1, wherein the generating the at least one burner stabilized cool flame at the temperature of between about 500 Kelvin and about 1050 Kelvin includes generating the at least one burner stabilized cool flame at about 700 Kelvin.

3. The method of claim 1, wherein the plasma generator is an ozone generating arrangement.

4. The method of claim 1, wherein the heated counterflow flame arrangement includes a liquid fuel vaporization arrangement.

5. The method of claim 3, wherein the ozone generating arrangement includes a micro plasma dielectric barrier discharge arrangement.

6. The method of claim 1, further comprising generating the burner stabilized cool flame using (i) liquid normal alkane, (ii) heated nitrogen, (iii) ozone, (iv) at least one ether, (v) at least one fuel, or (vi) air.

7. The method of claim 6, wherein the ozone is between about 0.1% and about 5%.

8. The method of claim 6, wherein at least one of the heated nitrogen or the air has a temperature between about 400 Kelvin and about 850 Kelvin.

9. The method of claim 6, further comprising decomposing the ozone using at least one of the heated nitrogen or the air.

10. The method of claim 6, further comprising generating the ozone using at least one of at least one stream of oxygen or the air.

11. The method of claim 6, further comprising diluting at least one of the liquid normal alkane or the ozone using a dilution gas.

12. The method of claim 11, wherein the dilution gas includes at least one of helium, argon or nitrogen.

13. The method of claim 1, wherein the plasma-assisted combustion is plasma-assisted moderate or intense low-oxygen dilution combustion (MILD).

14. The method of claim 1, wherein the maintaining the at least one cool flame between about 500 Kelvin and about 1050 Kelvin is performed after an ignition of the at least one burner stabilized cool flame.

15. The method of claim 1, wherein the plasma generator is a low-temperature plasma generator.

16. The method of claim 1, wherein the mixture includes accelerated cool flame chemistry including at least one hydroperoxyl radical.

17. An apparatus, comprising:
a plasma generator configured to generate at least one chemically active species in at least one of air, oxygen or a fuel-lean mixture;
a fuel generator configured to generate at least one fuel; and
a cool flame burner configured to generate at least one stable cool flame at a temperature of between about 500 Kelvin and about 1050 Kelvin by mixing the at least one chemically active species and the at least one fuel in a plasma-assisted combustion;
wherein the at least one cool flame is a self-sustaining cool flame.

18. The apparatus of claim 17, further comprising a pressure chamber, wherein the plasma generator, the fuel generator, and the cool flame burner are located inside of the pressure chamber.

19. The apparatus of claim 17, wherein the fuel generator includes a liquid fuel vaporization arrangement which is configured to burn liquid n-heptane.

20. The apparatus of claim 17, wherein the plasma generator includes an ozone generator, which includes a micro plasma dielectric barrier discharge arrangement.

21. The apparatus of claim 19, wherein the ozone generator generates the ozone using oxygen.

22. The apparatus of claim 17, further comprising a plurality of electrodes, wherein at least one of the electrodes is electrically coupled to the plasma generator and at least one other of the electrodes is electrically coupled to the fuel generator.

23. The apparatus of claim 17, wherein the cool flame arrangement is configured to maintain the at least one cool flame between about 500 Kelvin and about 1050 Kelvin after an ignition of the at least one cool flame.

24. The apparatus of claim 17, wherein the plasma generator is a low-temperature plasma generator.

* * * * *